US012779878B2

(12) United States Patent
Nishizawa

(10) Patent No.: US 12,779,878 B2
(45) Date of Patent: Nov. 3, 2026

(54) SCANNING METHOD, AND PRINTING APPARATUS, PROCESSING APPARATUS AND OUTPUT APPARATUS

(71) Applicant: Katsuya Nishizawa, Nagano (JP)

(72) Inventor: Katsuya Nishizawa, Nagano (JP)

( * ) Notice: Subject to any disclaimer, the term of this patent is extended or adjusted under 35 U.S.C. 154(b) by 201 days.

(21) Appl. No.: 18/426,345

(22) Filed: Jan. 30, 2024

(65) Prior Publication Data

US 2024/0165965 A1 May 23, 2024

Related U.S. Application Data

(63) Continuation-in-part of application No. PCT/JP2022/000462, filed on Jan. 11, 2022.

(30) Foreign Application Priority Data

Aug. 2, 2021 (JP) ................................ 2021-127019

(51) Int. Cl.
*B41J 3/54* (2006.01)
*B33Y 10/00* (2015.01)
(Continued)

(52) U.S. Cl.
CPC ............ *B41J 3/546* (2013.01); *B41J 2/1652* (2013.01); *B41J 2/435* (2013.01); *B41J 25/34* (2013.01); *B33Y 10/00* (2014.12); *B33Y 40/20* (2020.01)

(58) Field of Classification Search
CPC .......... B41J 3/546; B41J 2/1652; B41J 2/435; B41J 25/34; B41J 2/16517; B41J 2/442;
(Continued)

(56) References Cited

U.S. PATENT DOCUMENTS

2018/0136633 A1* 5/2018 Small ................ G06Q 20/4014

FOREIGN PATENT DOCUMENTS

JP 2002273878 A 9/2002
JP 2002321345 A * 11/2002 ........... B41J 2/2125
(Continued)

OTHER PUBLICATIONS

English machine translated version of Masato (JP_2010167619_A) (Year: 2010).*
(Continued)

*Primary Examiner* — Ricardo I Magallanes
*Assistant Examiner* — Natasha Dephenia Quinn

(57) ABSTRACT

Intended applications are for two-dimensional and three-dimensional printers. In the printing process, nozzles are arranged across the page width and moved in a loop to scan the recording surface in a circular or oval shape, facilitating simultaneous printing and nozzle cleaning. The discharged substance then flows from the nozzle. Notably, non-contact communication between the print head and printer body eliminates the need for a slip ring. The identified problem with line printers, such as difficulty in moving, cleaning, and recovering from missing nozzles, prompted the development of a solution. This involves arranging discharge nozzles or processing nozzles on a looped trajectory that crosses the cleaning portion and recording surface, facilitating efficient cleaning while aligning nozzles across the page width, akin to a line printer.

4 Claims, 33 Drawing Sheets

(51) Int. Cl.

| | |
|---|---|
| ***B33Y 40/20*** | (2020.01) |
| ***B41J 2/165*** | (2006.01) |
| ***B41J 2/435*** | (2006.01) |
| ***B41J 25/34*** | (2006.01) |

(58) Field of Classification Search
CPC ........... B41J 19/207; B41J 2/01; B33Y 10/00; B33Y 40/20; B33Y 30/00; B33Y 40/00; B33Y 50/02; B29C 64/112; B29C 64/241; B29C 64/268; B29C 64/209; B29C 64/245; B29C 64/35; B29C 64/393
See application file for complete search history.

(56) References Cited

FOREIGN PATENT DOCUMENTS

| | | | | | |
|---|---|---|---|---|---|
| JP | 2010167619 A | * | 8/2010 | | |
| JP | 2011016316 A | | 1/2011 | | |
| JP | 2013176900 A | * | 9/2013 | ............. | C09D 11/12 |
| JP | 5857205 B2 | | 3/2014 | | |

OTHER PUBLICATIONS

English machine translated version of Masako et al. (JP_2013176900_A) (Year: 2013).*
English machine translation of Kobayashi et al. (JP_2002321345_A) (Year: 2002).*

* cited by examiner 120 recording surface after ink landing
100 nozzle array
100A ink jet nozzle arranged in a circle
100B FDM nozzle arranged in a circle by AM method nozzle
12 Ejected Ink
30 Cleaning Element 120 recording surface after ink landing
100A ink jet nozzle arranged in a circle Here, the 100A and 100 nozzle arrays including 100A are not necessarily arranged in one circular row, but may be a plurality of nozzle rows arranged in a circle at a certain pitch P.

120 recording surface after ink landing
100C Trajectory when a single nozzle rotates
100NZ single nozzle
*If the head has one nozzle When printing multiple 9s, the 9s aligned in the sub-scanning direction move and pass under the print head 1 and are printed.

<Explanatory diagram of printer with one nozzle using on-carriage method>

When there is one nozzle that operates on an oval track rail using the on-carriage method

SCANNING METHOD, AND PRINTING APPARATUS, PROCESSING APPARATUS AND OUTPUT APPARATUS

TECHNICAL FIELD

The present invention relates to a method of scanning a print head of a printer. The present invention also relates to an output apparatus such as a printing apparatus or a processing apparatus using the scanning method.

BACKGROUND OF THE INVENTION

To provide a printing device and a coating device for processing a medium (recording paper or a recording material) by discharging ink or a material to a desired position of recording paper, a medium or a recording surface on demand in an output device of a computer.

There are a discharging device, a laser beam machining device, etc. The apparatus is controlled by a computer terminal and performs processing or treatment with an ink material, a laser, or the like on a two dimensional or three dimensional place to form a two dimensional image or text as an image, thereby forming a three dimensional solid. An output machine such as a printer, a plotter, or a machining center is a machine that places a material at a desired position in two dimensions or three dimensions or performs processing on the material.

In an inkjet printer, ink is discharged from a nozzle of an inkjet print head, the ink is attached to a medium to be printed, and the ink is fixed by being dried, reacted, cured, or adhered. An inkjet printer is provided with a nozzle of a print head corresponding to a material and a type of an ink, so that a plurality of types of inks can be discharged and arranged on a recording surface, and is suitable for printing of a color image, and is practically used as a printer for printing of a text or a color image.

In addition, it is also possible to form a three dimensional solid by further printing and depositing an image in a height direction on an ink material of a recording surface which is two dimensionally printed and deposited, and an inkjet type three dimensional printer (3D printer) is put into practical use. To provide a three dimensional printer (2D printer, conventional printer) by applying a two dimensional printer (3D printer, conventional printer).

The Present Invention has been Made in View of the Above Problems

When printing and laminating ink, the three dimensional printer compresses and accumulates the ink by a roller or the like after fixing the ink, or performs lamination in a height direction through a process of supplying powder or paper instead of recording paper, fixing the ink, and smoothing the ink by a roller or the like, thereby performing modeling.

On the other hand, two dimensional printers are used not only for three dimensional applications but also for recording on special inks or media and for high-speed printing. In addition to the use of printing on paper such as a text book or a poster for on-demand printing, printing is performed on a film made of a fire-resistant material using a dedicated ink to be used for a signboard or an advertisement, and the printing is used for coloring or textile printing of a fiber product, printing or printing on a product, on-demand printing for a prototype of a product, and prototyping. In the field of printed electronics, it is used in the manufacture of electronic components and also in the application of liquid materials to substrates in coating processes. Studies have been made on applications for coating and fixing functional materials such as organic semiconductors, inorganic semiconductors, hybrid materials, synthetic metal materials, conductive polymers, electrode materials, metal particle materials, ink jet printer element electronic component materials, and resists. In each of the above-mentioned fields, a high printing speed is preferable.

One known approach to increasing printing speed in the field of inkjet printers is the development of line printers as opposed to serial printers. Many practical inkjet printers are serial printers (Commentary Example, https://www.jfpi-.or.jp/webyogo/index.php?term=1165). To solve the problem of a multi-pass system in which a recording head is repeatedly moved in a direction (lateral direction) perpendicular to a feeding direction (longitudinal direction) of a recording sheet to perform recording, so that it is necessary to repeatedly move the recording head to perform printing, and time is required for printing.

In the serial printer, a method of increasing the processing power of the head and increasing the printing speed by increasing the size of the recording head (increasing the number of nozzles Nz) and increasing the speed of the recording head (increasing the nozzle driving speed f) is employed. For example, the number of nozzles mounted on a recording head may be increased, and in order to increase the number of nozzles There is a known method in which a plurality of recording head elements in which nozzles are formed are connected in a staggered arrangement or the like and mounted on a recording head of a serial printer to increase the size of the recording head and improve the printing speed.

When the recording head is increased in size and mass, a mechanism for supporting and driving the head is also increased in size. There is a limit to the speed at which the enlarged head can be moved.

In addition, as the number of head elements to be mounted on the print head increases, it becomes necessary to adjust the position and level of the elements and adjust ejection. When a large number of elements are assembled in the head, it sometimes takes labor to mount a failed head element and adjust element and adjust ejection. According to the personal opinion of the inventor, the footprint of the cleaning portion (also serving as the capping portion) also becomes very large when the staggered array head which has become large becomes very large.

To manufacture a thermal ink jet type head element of a serial printer which is manufactured by a semiconductor manufacturing technique in many cases or a print head in which the element is formed in an industrial printer using a thermal ink jet among ink jet systems in relation to the attachment of the head. When an unrecoverable nozzle omission occurs, the entire print head may be replaced to reduce maintenance labor, maintenance cost, and downtime for head adjustment.

In order to improve the printing speed of the serial printer, a line head (https://www.epson.jp/osirase/2017/170202_4.htm) of a line printer in which nozzles of a plurality of recording head elements are linearly (one dimensionally) arranged in a direction (lateral direction) perpendicular to a feeding direction (longitudinal direction, sub-scanning direction) of a recording sheet is used as a recording head.

Patent Documents 1 to 4 are examples of previously reported line printers. The line printer is a single-pass type in which a recording head moves only once (the recording head is fixed and the recording surface moves) when the recording surface or recording paper is supplied at the time of printing. In a line printer, a recording sheet is fed, and at the same time, printing is performed by a recording head disposed in a recording width of the recording sheet.

Since printing is performed only by passing the recording paper under the recording head, it is possible to feed the medium without stopping and perform printing, as in offset printing.

Here, similarly to the recording head of the serial printer, the line head also needs to have ejection performance by, for example, increasing the number of nozzles to achieve desired processing capability, and it may be necessary to pay attention to the fact that a consumer may use a high-speed serial head rather than a low-speed line head. The line head and the system shown in the present invention may be preferably used in an application in which a printer is always operated for business use rather than for home use in view of problems such as a head cleaning mechanism when printing is not performed, a capping mechanism, and maintenance of a large head.

In a practical line head, there is a problem that a cleaning mechanism for an ink jet head nozzle portion which can be used in a serial printer cannot be used or the use of the cleaning mechanism is limited.

In the line head, it is difficult to clean the recording head which operates at the time of printing. When cleaning is performed, it is necessary to interrupt printing at the time of printing and perform cleaning by, for example, retracting the line head from the recording surface, and the interruption extends the printing time. This increases the maintenance time Tm and the other time X from the viewpoint of the speed factor SF. Therefore, in order not to interrupt printing, there is also a system in which two or more sets of line heads are provided and a head not used for printing is cleaned. As described above, in the line head, a cleaning countermeasure is a known problem.

In addition, in a case where the head elements are connected in a line shape and fixed at a certain position to be used for printing, the position of the nozzle is fixed, and there is a problem in that a nozzle which cannot be recovered by cleaning is generated (nozzle omission occurs). In a serial printer, printing is performed by a multi-pass method, and a defect in ejection of a print head or deviation of each nozzle can be made less noticeable on an image by dividing the printing into a plurality of scans. However, in the single pass method of the line head, nozzle omission or the like is noticeable. This leads to a partial image defect in the case of an image, a forming failure in the case of a 3D printer, and a manufacturing failure in the case of an electronic part, and thus needs to be avoided. When printing a three dimensional object, it takes time to laminate, and if a missing nozzle caused by not being able to clean the nozzle causes the modeling to fail, the material and "time" are wasted. Therefore, the inventor of the present invention has sought a system capable of printing like a line printer while performing cleaning.

PRIOR ART DOCUMENTS

Patent Document

[Patent document 1] JP 2002-273878A
[Patent document 2] JP 2011-016316A
[Patent document 3] Japanese Patent No. 5857205
[Patent document 4] International Publication No. 2017/013847

SUMMARY OF THE INVENTION

Problem to be Solved by the Invention

To solve the problem that a line head or a recording head corresponding to the line head capable of intermittently cleaning a nozzle for two dimensional and three-dimensional printing cannot be used. In addition, there is no recording head which performs printing in a single pass as in a line printer and is easily cleaned at the time of printing as in a serial printer. In particular, when a line head is used in a printer that operates for a long time such as a three-dimensional printer, there is no mechanism that can perform cleaning during printing. Since the same problem as 3D printer may be produced when working a nozzle also in a two-dimensional printer for a long time at the time of manufacture of an industrial product on demand, it is preferable when the mechanism which can be cleaned during print operation is in the printer which operates like a line printer.

Means for Solving the Problem

As means for solving the problems, the present invention will be described with reference to FIGS. 1, 1AA,1AB,1AC, and 2C, which are schematic views of a scanning method of a printer, FIGS. 5A and 5A, which are explanatory views of a printer including a nozzle of an inkjet or additive manufacturing method, and FIG. 5E, which is an explanatory view of a laser processing machine. As shown in FIG. 1AA and an explanatory diagram described in FIG. 2C, the present invention is directed to solving the problem of the prior art by using a rotating or looping orbit (100 or 100A when the orbit is a circular orbit) crossing a recording sheet 2 or a recording surface 2, passing through a cleaning part 3, and crossing the recording surface 2 again. The oval track-like track draws a 100R or a 4R (nozzles 10, 100NZ) or the nozzle array 100 is provided in the recording head 1, and the recording surface 2 and the cleaning mechanism 3 are arranged in the track (100,100A,100R,4R) in which the nozzles of the recording head 1 rotate or loop. They are a material discharge nozzle (an ink jet nozzle, a dispenser nozzle, a vapor deposition gas irradiation nozzle, the nozzle using an addition manufacturing method), or a laser nozzle (** using the laser-processing nozzle and removal-processing method which heat wood, resin, and an electrode layer with laser processing, are deleted, and are removed) to the aforementioned nozzle.

As shown in FIG. 5A and FIG. 5D, the nozzle passes through the cleaning unit 3 after traversing the recording surface 2, and again traverses the recording surface 2 and passes through the cleaning unit 3, thereby alternately performing printing, processing, and cleaning. As described in FIG. 2AA and FIG. 2A, the trajectory drawn by the nozzle of the recording head crosses and passes through the recording surface, and one or more cleaning units may be provided on both sides of the recording surface or in the vicinity of the recording surface through which the trajectory of the recording head passes, and one or more cleaning units 3 are provided in the printer. FIG. 1, FIG. 1A, FIG. 2A, FIG. 2AA, FIG. 2C, FIG. 3B, FIG. 5A, FIG. 5B and FIG. 5D are typical explanatory views of the present invention. The invention may be used in an apparatus comprising inkjet nozzles or nozzles of the FDM or additive manufacturing (Additive manufacturing, AM) type, the apparatus comprising one or more nozzles in a print head. The nozzle is used for 3D printing by an AM method similar to an FDM method and two dimensional and three dimensional printing by an ink jet method.

Electronic Component Manufacture

It means using for the purpose which makes material deposit using the method and equipment of this application also in manufacturing processes, such as an electronic component, and produces a film. In relation to an electronic component process, it is intended that a nozzle for performing cutting and removal processing such as a laser nozzle is provided instead of a method of using a nozzle in an AM method, and a portion where a film is formed at the time of manufacturing an electronic component is cut and removed by laser processing and used for patterning of an electrode. In particular, the present invention is intended to be applied to a component requiring film formation and patterning over a large area, such as a solar cell manufacturing process.

The trajectories which the nozzle of a recording head draws are a circle, an ellipse, and an ellipse as an example, In particular, in the case of a circle, nozzles are arranged and fixed so as to be arranged in a circle, a print head having the fixed circular nozzle array is rotated by a motor provided outside or in the print head, and ink is discharged from the nozzle array drawing a circular orbit crossing a recording surface to perform printing. In addition to discharging a material such as ink, processing can also be performed by disposing a processing element in place of the nozzle. In the present invention, as shown in FIG. 1AC and FIG. 5A, if there is one nozzle, the nozzle is singly provided on the circumferential side of the circular head 1, the head 1 is rotated (or moved), and the ink 12 is discharged from the nozzle 100C drawing a circular orbit 100NZ crossing the recording surface to the recording surface 2 to perform printing. Then, the nozzles pass through the cleaning unit 3 after the ejection operation to be cleaned, and are moved onto the recording surface again to perform ejection and a cleaning operation are repeated. In the present invention, as shown in FIG. 1A, FIG. 1AA, and FIG. 1AB, when the head 1 is provided with a plurality of nozzles exceeding two or three nozzles (in the case of 100NZ) like the nozzle row 100, the print head 1 is rotated by a motor provided outside or in the print head. Ink 12 is discharged to a recording surface 2 from a plurality of nozzles (nozzle arrays 100) drawing a circular orbit crossing the recording surface to perform printing, the nozzles pass through a cleaning part 3 to perform cleaning even during printing, and the discharge and the cleaning operation are repeated.

As illustrated in FIGS. 2C and 5D, the trajectory of the storage head may have an oval shape (an elliptical shape or an oval track shape) in addition to a circular shape, and one or more nozzles are disposed on the trajectory (4R or 100R) to be movable.

A nozzle 100NZ is arranged on a track such as a rail so that trains (cars, carriers, carriages) are arranged in an elliptic shape. A car provided with a nozzle is moved so as to cross a recording surface from a certain origin position, pass through a cleaning part cross the origin and the recording surface again and continuously perform printing, and the nozzle performs printing or processing when crossing the recording surface. Also in this case, in the nozzle, the discharge operation and the cleaning operation are alternately executed by continuing the main scanning.

The system (an addition manufacturing method, a FDM system) which extrudes the material looked at by not only an inkjet system but 3D printer on the head of the present invention, and it discharges from a nozzle, and the laser radiation system provided with the irradiation part (laser nozzle part for an exposure) which processes the material in a laser beam machine may be used.

The recording head may include a plurality of nozzles of an inkjet method or a plurality of nozzles for discharging a material of a Fused Deposition Modeling/fused deposition modeling (FDM) method. Any nozzle may be used as long as it extrudes a material from a nozzle used in a known additive manufacturing method. The material which has not carried out the heat dissolution (material which has mobility in an ordinary temperature region), for example, food paste, (paste state confectionery materials, such as cookie dough and a chocolate paste, --) The scan method of the present invention may be used for the items which can be manufactured with non-element material/organic material pastes, such as earthenware, such as bread-making material and a dough material, earthenware, and building materials. The scanning method of the present invention may be used to eject bio-based material onto a recording surface, for example from a nozzle having a nozzle diameter capable of ejecting seeds in an agricultural machine application. The print head may be provided with an ink jet nozzle and an extrusion nozzle for a food material, the food paste may be laminated by the extrusion nozzle, and the food may be printed with a food coloring agent to output an on-demand food. In the present application, a mechanical component or an electronic component may be output. In the present invention, the operation may be performed not only under atmospheric pressure but also under vacuum.

The material of the electronic component may be deposited on the substrate of the recording surface by scanning the head having the material discharge nozzle by the scanning method of the present invention under vacuum or in a vacuum outer space.

Use in Outer Space and Output of Electronic Component and Building Structure in Outer Space The system of the present invention may be operated not only under atmospheric pressure but also under zero gravity and vacuum in outer space. When it is used in outer space, a mechanism for stopping or canceling the rotation of the head 1 may be provided. There is much movement rotated although there is little movement which shakes mass at right and left like a serial printer in this application.

Solar Cell Manufactured Using Material or Substrate Launched in Outer Space Since the outer space has a higher vacuum than the ground (since the outer space is in a vacuum without using a turbo-molecular pump or the like as on the ground), there may be a merit in the outer space that manufacturing of some solar cells and metal components (output of outer space components and products) involving a vacuum process is performed on the spot of a base such as a space station.

If the case where a solar cell is manufactured on the spot of space using the vacuum with which the universe is provided is compared after launching a film material and raw materials, such as an electrode and a semiconductor, from the ground to the universe in the universe, when manufacturing the solar cell of a film mold on the ground and launching to space as an inventor individual's opinion, There is a possibility that the use of the vacuum pump is less or unnecessary in the latter case where the solar cell is manufactured by using the vacuum of the outer space on the spot in the outer space after launching the raw material. In the case of the latter, the vacuum with which space is provided is used and a solar cell manufacturing installation with the vacuum process which makes a substrate discharge, spout, irradiate with, form and deposit materials, such as vacuum evaporation, is needed.

Production of Solar Cell by Vacuum Process without Vacuum Pump in Outer Space

He would sometimes like for solar cells, such as a space station and an artificial satellite, and the solar cell for space-based solar power to carry out failure etc., and to manufacture and carry out local procurement of the solar cell from raw materials, such as a semiconductor and an electrode material, a substrate, etc. in the space station of space. An atom and a molecule are steam-ized by the principle of an evaporation apparatus and an evaporation apparatus which uses for solar cell manufacture as an example raw materials, parts, and substrate which were launched from the ground in space to manufacture a solar cell to on demand ones using the vacuum environment of space, vacuum evaporation and sublimation are performed, and they are a metal electrode and a transparent electrode, An apparatus (here, an output apparatus for manufacturing) for performing discharge and implantation processing of impurities such as film formation of an inorganic semiconductor/organic semiconductor film and doping to a semiconductor film includes: The solar cell may be manufactured by using a vacuum provided in outer space for manufacturing the solar cell without using a pump (a vacuum pump such as a turbo-molecular pump or an oil diffusion pump) that evacuates a vacuum chamber used for a vacuum process in manufacturing the solar cell on the ground.

Even if the vacuum chamber on the ground and the outer space can have the same degree of vacuum, there is a possibility that particles adversely affecting the production of semiconductor components are present or flying in the outer space. Therefore, a device for blocking the influence of the particles may be provided in the production process. For example, the manufacturing installation using the vacuum of space may be equipped with the mechanism which lowers the influence on the organic semiconductor film by the particles etc. which may arise from the ionization vacuum gauge etc. which measure the degree of vacuum of a vacuum chamber by vacuum evaporation of the electrode of an organic solar cell, etc.

When the particles to be removed in vacuum are charged particles, removal of the particles by an electric field or a magnetic field can be used. When there is minute debris that physically collides with the manufacturing apparatus, a barrier or the like is provided to prevent the debris from colliding with the manufacturing apparatus. In the case of photons, such as a gamma ray and X-rays, it shields with the barrier of high-density metal.

On-Demand Output Device in Outer Space

In outer space, the space and mass available for such manufacturing devices may be limited. Therefore, in the present application, a printer 8 having the features claimed in the present application may be used in the manufacturing apparatus. A feature of the present application is to have a characteristic of being able to perform nozzle cleaning even during an ejection operation when ejecting a material onto the recording surface 2, ejecting a material, or ejecting a material fluid or a material gas fluid (particles evaporated in a vapor deposition process or a sublimation process). It can be used to shape electronic components such as solar cells in outer space (film-type solar cells to which vacuum in outer space is applied and which are intended to perform roll-to-roll manufacturing similar to a printing process by the printer 8), structures for outer space, or three dimensional products and components. The film-shaped (film-type) solar cell manufactured by the apparatus and the method may be used for a space structure such as a space station or space photovoltaic power generation.

Description of the Related Art

A capacitor (electrolytic capacitor, roll-to-roll process) having a manufacturing process similar to a printing process (inkjet printing, roll-to-roll process), such as a solar cell for a film, under atmospheric pressure or vacuum is known. The printer 8 of the present application may be used for manufacturing an electronic component in which a substrate such as a film or an electrode foil having a large area is input and processed when an element such as a ceramic capacitor, a piezoelectric actuator, or a secondary battery (electrolytic solution type or solid electrolyte type lithium ion battery) is manufactured.

Since oxygen and nitrogen do not substantially exist under vacuum as compared with under the atmosphere, it can be expected that oxidation or the like does not occur at the time of sintering the metal. In the present application, the head 1 of the printer 8 is provided with a laser nozzle and a discharge nozzle for discharging a fluid containing metal particles (including titanium), and while discharging and depositing metal powder on the recording surface 2, the metal particles are sequentially sintered by the laser nozzle under a vacuum provided in space, so that a metal part or the like can be shaped. Instead of the discharge nozzle, metal powder may be supplied to the recording surface 2, and the metal powder may be leveled by a roller or the like for each lamination thickness, and may be irradiated with a laser by a laser nozzle to be sintered. The same applies to the resin powder regardless of the metal powder.

Connection Example of Printer of Present Invention

The present invention is mainly characterized in that a recording surface 2 and a cleaning mechanism 3 are provided on a rotating or looping track (100,100C,100R,4R) drawn by nozzles (a plurality of nozzle arrays 100 and a single nozzle 100NZ) of a recording head 1. A discharge material to be supplied to the head 1 and a material supplying path (the ink sub-tank 11, the ink supplying path 111, the ink supplying path 112, the ink tank 113, the material extruding pump 110PP, and the pump driving circuit 1FDP); It is necessary to provide paths (100NZ and 100VA) for transmitting and receiving signals for controlling the discharge of the material mounted on the head 1 by the nozzles (10 and 6WL), the actuators 1PU of the nozzles, and the nozzle drive circuits, and paths (and) for supplying power and electric power for operating the head 1. 1FDN 1WL 6PAs a simple configuration, FIG. 5A to FIG. 5F are explanatory views in the case where one nozzle is provided.

Power and Data Storage Unit

Since the application of the present invention is close to business use, even in the case of power failure, it may be required to operate up to a good break before the printer is temporarily stopped. Therefore, it is strongly desirable to provide the print head 1 with a power storage device 1PUC (secondary battery, capacitor) to provide a means for smoothing the power fluctuation due to a temporary power failure or the like. In addition to the 1PUC of the head 1, the power storage device may be provided in the printer main body 8.

It is highly desirable that the head 1 includes a storage device 1CU0 (memory, for example, a volatile memory such as SRAM or DRAM, or a nonvolatile memory such as flash memory) for recording, storing, and pooling print-data, control-data, and the like sent from the printer main body by communication. As shown in FIG. 5C, communication is performed between the controllers. In the case of the non-volatile memory, after the print data is stored in the head 1, the data can be recorded even if there is no power supply. After the data recorded in the non-volatile memory of the head 1 is outputted as a prototype by the printer, if there is no problem, the data is not loaded again as it is (the communication, movement and duplication time of the printing data between the controllers are reduced), and it is possible to shift to the product manufacturing on demand. To provide a nonvolatile memory which is high in speed, large in capacity and not low in the number of rewritable times. In general, a flash memory is available as a non-volatile memory in the market in 2021. (The storage cell which excels [others] a flash memory in writing speeds, such as a ferroelectric memory, or the number of times which can be read and written also exists) As the main memory of the balance of cost, or working speed and a storage capacity to a computer There may be a case where a DRAM to be used or a high-speed SRAM incorporated as a cache memory of a central processing unit CPU is mounted on the head 1.

Transport of Discharge Material to Head

When a discharge material is supplied to the rotating head 1, the fluid joint 111 (including liquid, gas, and plasma) may be used. When a single material (single color) is supplied, a rotary joint corresponding to a single color is used. In the case of a plurality of materials (multicolor), a corresponding rotary joint 111 is used. To supply a single or a plurality of materials to a head 1 even when a rotary joint 111 is not used. As shown in FIG. 1BE, opposing ink supplying mechanisms are provided. The ink may be supplied under atmospheric pressure or under vacuum in a corresponding manner. Under vacuum, it is also possible to use a rotary joint with a pipe. In the case of operation under zero gravity and vacuum in outer space, it is also necessary to change pumps and joints for transporting the fluid.

Discharge Signal Communication to Head

The ejection signal may be transmitted to the head 1 by using non-contact wireless communication and contact wired communication. An important feature of the present invention is that a non-contact communication method can be used. When data is transmitted to the rotating head 1 by a contact-type method using a slip ring or the like, it is necessary to consider the operating life and cost of the slip ring and the stability of communication. Therefore, in the present invention, it is preferable to use non-contact communication instead of contact communication as a communication system between the rotating or moving print head 1 and the printer main body. Specific examples of non-contact communication in the present invention are wireless communication and optical communication. In FIGS. 5A and 5D, 1WL and 6WL correspond to the non-contact communication unit. The wireless communication includes radio wave communication and sound wave communication. In the present invention, it is sufficient that the communication capacity is sufficient for the print data amount. In the existing technology, a radio wave can be used in wireless communication.

Supplement

As described above, in the case where the present invention is applied to a large-area, high-resolution 3D printer using an inkjet method, the number of dots required for modeling increases, and thus the amount of information increases. As a result, it may be necessary to transfer the large amount of information using a slip ring. It is not impossible to make a printer using a slip ring for the scanning method and data communication as claimed in the present invention. However, since the slip ring has a lifetime due to wear (wear of the brush due to contact), it is preferable to use non-contact communication in the present invention. If the life, price, and communication speed and stability of the slip ring are improved, the slip ring can be used in the present invention. The invention does not exclude the use of slip rings for communication and power supply, in particular power supply, between the printer and the head 1. A non-contact system is used for communication between the printer and the head, but a contact system in which a slip ring or a terminal is brought into contact with the head can be used for power supply from the printer to the head. When contact-type communication is used, there are points to be considered. In the present invention, the head is operated by a combination of wireless data transfer and contact-based power supply. When contact-type power supply from a printer body (printer controller 6) to a print head 1 is performed, a power storage device 1PUC for smoothing power is provided.

In the present invention, with respect to the communication system between the print head and the printer main body In order to perform data output of a three dimensional printer or a large-area and high-speed two dimensional image, it is desirable to take a large-capacity data communication form, and the radio includes radio waves in a high-frequency direction having a wavelength smaller than that of an ultra-high frequency or a microwave, and optical communication using infrared to visible light and ultraviolet light. When using an electric wave, the main part of a print head and a printer is equipped with an antenna, respectively. In the case of optical communication, an element for emitting a photon and a detector for receiving a photon and generating a signal are provided in the print head and the main body of the printer, respectively, so that photons can be exchanged. As a specific example, an LED or a laser diode is used to emit light, and a photodiode is used to detect light. (Radio waves in the present invention are in the following bands: ultra-long wave, long wave, medium wave, short wave, ultra-high wave, ultra-high wave, microwave, millimeter wave, and sub-millimeter wave.)

Effect of the Invention

A printer 8 provided with a recording head 1 and a printing system has an advantage of a line printer and has many nozzles. The nozzle (10,100,100A,100B,100NZ) of the recording head 1 can alternately perform printing and cleaning by circulating the recording surface 2 and the cleaning part 3 while scanning and recording the recording surface like a multi-pass by rotating the nozzle so as to cross the recording surface. There is an advantage in that it is possible to achieve both high speed printing and maintenance of the nozzles. In FIG. 1A, printing is performed by the nozzle row 100 in the arc of the lower half of the circular print head 1. As shown in FIG. 2AA, the nozzle arrays in both the lower half and the upper half of the nozzle array 100 may be used, and the cleaning units 3 may be provided on both the left and right sides of the recording surface 2 (the cleaning units may be provided on the left and right sides as shown in the lower part of FIG. 2A or as shown in FIG. 2AA). According to the personal opinion of the inventor, by using two upper and lower nozzle rows (as shown in the right side view of FIG. 2AA), the number of carriage operations Cr of the speed factor SF can be reduced from 2 in one direction to 1 in both directions, and the speed can be doubled.

Since printing is continuously performed when a shaped object is shaped in the three dimensional printer, it is possible to prevent a defect of the shaped object due to a nozzle defect during printing by performing nozzle cleaning according to the method of the present invention. This contributes to suppression of a nozzle failure and a printing failure at the time of manufacturing a product related to a shaped object, on-demand printing, a textile product, an industrial product, and an electronic component product by a three dimensional printer. To simultaneously perform printing and cleaning and to contribute to the reduction of a printing time by stopping printing at the time of executing nozzle cleaning in a three dimensional printer so as not to take time for cleaning.

Notes

The present invention is intended to increase the speed of printing by mounting a large number of nozzles as in a line printer, but when nozzle cleaning is performed in association with this, the nozzles are cleaned as needed. To perform cleaning during a printing operation so as to prevent a forming error and a printing error due to a nozzle failure when nozzle cleaning is insufficient.

BRIEF DESCRIPTION OF THE DRAWINGS

FIG. 1AA is a diagram showing a relationship between Lm and Dh and a scanning direction and a cleaning portion including an ink jet nozzle.

FIG. 1AB is a diagram showing a relationship between Lm and Dh and a scanning direction and a cleaning portion including an ink jet nozzle.

FIG. 1AC is an explanatory diagram of a case where the number of nozzles Nz operated by a single additive manufacturing method or an ink jet method is one.

FIG. 1 B The ink supplying system explanatory view of an off-carriage system.

FIG. 1BB Ink supplying system using off-carriage type joint.

FIG. 1BC Off-carriage type multiple ink supplying system.

FIG. 1BD Off-carriage two color ink supplying method.

FIG. 1BE Off-carriage type opposed multi-color ink supply system.

FIG. 1 CA Ink supplying system explanatory view of an on-carriage system.

FIG. 1CB Ink supplying system using on-carriage type multi-color cartridge and nozzle FIG. 2 A The cleaning mimetic diagram in the case of equipping one side or the both sides of a recording surface with the explanatory view and cleaning part of ink impact.

FIG. 5 C The explanatory view of a printer controller and a head controller.

FIG. 5 E The explanatory view of 1 nozzle laser beam machine.

FIG. 5 F The explanatory view of the head of 1 nozzle laser beam machine.

MODE FOR CARRYING OUT THE INVENTION

Figure 1:
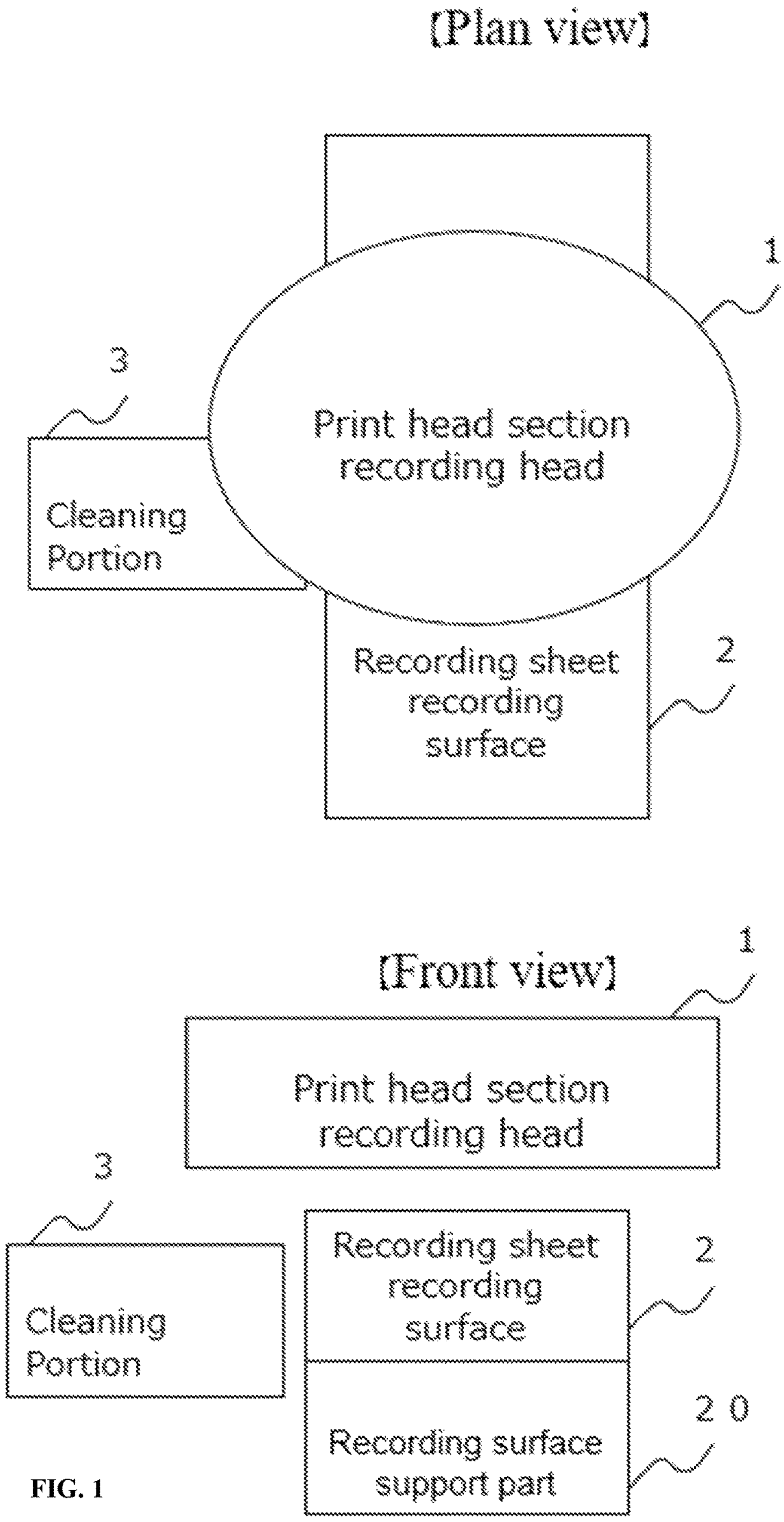
FIG. 1 is an illustration of a printer having a recording head which rotates or loops across a recording surface. (Example 1)

In order to provide a cleaning mechanism while maintaining the high-speed performance of the line head, the recording head 1 may be provided with a loop track (circular, oval track, elliptical It realized by arranging one or more nozzles (10,100,100NZ,100LD) which can draw elliptic form, rotating or moving the aforementioned nozzle in accordance with a loop, and making the recording surface 2 and the cleaning part 3 scan (scan).

It should be noted that the present invention is applicable to industrial printed electronics and three dimensional printers. The present invention is devised to increase the size and speed of a print head for the purpose of printing newspapers, magazines, books, textile products, and on-demand mass printing, and does not take into consideration the small size and economic efficiency of a serial printer for home use. An application in which the time for stopping and pausing the head and capping is short is assumed.

Print Head

A motion sensor 1CS may be mounted on the head 1. A motion sensor 1CS may be employed in the recording head elements incorporated in the head 1 to detect the inclination of the head elements. The measurement information of the motion sensor 1CS incorporated in the head may be used for adjustment when the head 1 or the nozzle is attached. The motion sensor 1CS may have a function of acting as a level gauge that detects the inclination and level of the head 1. In the present invention, a plurality of recording head elements 10 are arranged so as to form a loop across the recording surface. In consideration of replacement and maintenance of the head element 10 assembled in the print head 1 of the printer 8, it is preferable to provide means for supporting element assembly at the time of replacement of the element of the head. Therefore, a motion sensor 1CS is incorporated in the head device 10 or the head 1 to detect the inclination of each device, thereby making it easy to adjust the alignment of the device at the time of replacing the device of the head. In the present invention, it is preferable that the inclination and position information of the nozzle surface of the head 1 or the head element 10 can be detected. The information of the motion sensor 1CS incorporated in the print head 1 may be used when the printer 8 scans the head 1 in the main scanning direction to perform ejection and processing operations. The information of the motion sensor 1CS of the head 1 may be used to ensure the safety of persons involved in the operation and maintenance of the apparatus. The entrepreneur who collected to the print server 8U and the user terminal 8U for a print, and introduced the printer with discharge information, including information, ink, etc. of a printer body, machining information, etc. may share the system operating status of equipment in a place of business via a network, and may utilize the information on motion sensor 1CS of the head 1.

In the case of an inkjet system, the printing method of the element of the head 1 is, Alternatively, a valve opening/closing method (valve jet method) may be used in which ink is pressurized by a pump (for example, the 110PP of 5A in FIG. 1) to open/close a valve (the 100VA of 5A in FIG. 1). The 100VA is a valve in the valve-jet system, but is a piezo-actuator in the piezo-ink-jet system, and is a heater in the thermal-ink-jet system, and the 100VA is an actuator for discharging ink or fluid material. At the time of opening and closing the valve, the ink may be discharged from the nozzle in the case of an ink jet system, or may be extruded, discharged or applied from the nozzle like a dispenser, or may be discharged, jetted, injected or sprayed from the nozzle like a spray. The head may be provided with a temperature adjusting mechanism so that the temperature and viscosity of the fluid to be discharged or injected can be changed. The solid material may be capable of undergoing a phase transition to a fluid, such as a liquid or a gas, upon heating. According to the previous report, there is a style which is made to carry out heat melting of the solid wax material, and is printed with an inkjet system, and it may use for ink the liquid to which melting also of the present invention was carried out from the solid. In a manner similar to a known vacuum deposition method, a solid organic material (such as a color material) may be sublimated by a filament or the like, or a solid metal material or a solid semiconductor material may be melted and evaporated, and discharge of the vapor from a nozzle may be controlled by valve opening/closing and actuator operation.

Atmospheric Pressure in which the Head Operates

The printer of the present invention may be used in the atmosphere or in a vacuum. In the atmosphere, a known ink such as an aqueous ink or a print head system used in an FDM method or an AM method in which a paste-like material is fed from a nozzle to form a film is used. When operating under vacuum, the fluid ejected from the nozzle may be a fluid material in the atmosphere (such as a metal, resin, or ceramic material intended for the construction of space structures), as well as a molten liquid, a gas, or elemental particles including molecules, atoms, charged particles, and photons. Applications including a space field and a manufacturing process under vacuum are assumed as a field in which vacuum is assumed. In space, it is intended to be used for the production of products and parts outside the ship. When manufacturing a solar cell isoelectronic device under a vacuum, the printer of this application containing a head section and a head section is arranged under a vacuum, and they are sublimation, vacuum evaporation, and a collision from a nozzle to a substrate about an organic semiconductor material, an electrode material, and transparent electrode material. It may be deposited and formed into a film. In a known method, an organic semiconductor is heated under vacuum, and the organic semiconductor in the form of a flow of gas or molecules is applied to a substrate (a substrate on which film formation is to be performed, a recording surface) to form a film. In the present invention, a head is provided with a heating part, or a gas obtained by heating a material is stored instead of an ink tank. The vaporized material is sent to a nozzle portion of the print head by applying a pressure with a pump, and the nozzle portion performs a valve jet method (a discharge control method by opening and closing a valve) in which opening and closing are performed with a valve to discharge and eject the material to a desired position on a recording surface. Alternatively, in a film forming method under vacuum or reduced pressure such as a proximity sublimation method used for manufacturing a compound-based solar cell such as a cadmium tellurium solar cell The present invention may be used as means for forming a film at a desired position of a substrate which is a recording surface. Even in a field in which a film of an inorganic semiconductor material is formed in a vacuum, an inorganic material is heated and vaporized (gasified or gasified) in a vacuum, and A semiconductor film may be formed by spraying a material gas discharged or jetted from a nozzle onto a substrate as a recording surface by a method similar to a valve jet method (a discharge control method by opening and closing a valve) in which opening and closing are performed by a valve.

The printing method of the head is, in addition to the inkjet method, a Fused Deposition Modeling printer of FDM (Fused filament fabrication/Fused Deposition Modeling) or FFF (Additive Manufacturing) Additive Manufacturing (3D). A nozzle for ejecting a fluid material, a molten resin, or the like used in the recording head may be used in the portion of the plurality of nozzle arrays 100. The printhead of the present invention may be utilized in additive manufacturing processes. In this case, an extruder for discharging a fluid material from a nozzle may be provided. In the AM method and the FDM method, molten plastic is mainly discharged. In addition, a paste, a slurry, a gel, or a material having fluidity may be used as a material to be discharged by the additive manufacturing method in the present invention. (In the drawing, 110PP in 5B may be an extruder for extruding a fluid material such as a paste.) The paste may contain fibers or particles to such an extent that there is no problem in discharging from the nozzle (to such an extent that the fibers or particles do not pass through the nozzle and are smaller than the nozzle diameter). In the present invention, a nozzle used in an additive manufacturing method is provided, and a paste material having fluidity and containing water or oil, which includes dough such as cookie or chocolate, or a dissolved protein material used for artificial meat or the like can be discharged. When recording is performed by scanning a head device (10,100,100A,100B, 100NZ) so as to loop across a recording surface and adding a material to the recording surface 2 A nozzle for injecting a resin or a fluid material in an additive manufacturing method (AM method) is cleaned by a cleaning part 3 to keep the nozzle in a clean state, thereby contributing to stable lamination of the material.

An electrostatic ink jet method may be used as a method of discharging ink. The material may be ejected by electrostatic force.

A method of using a centrifugal force generated by a loop or rotation of the head 1 as a force for discharging a fluid material such as ink may be used.

In the case material is pressurized by the centrifugal force, a valve or a gate actuator for preventing the discharge material from jumping out of the nozzle may be provided. One or more valves or gate actuators may be provided for each nozzle, and may be digitally opened and closed by a circuit.

In the present invention, when the head 1 loops, a centrifugal force can be generated in the nozzle portion of the head 1 or in the ejected ink droplets (fluid material). Therefore, it is necessary to consider the behavior and trajectory of an ink droplet (or additive manufacturing material) before and during ejection and during flight in the nozzle part. In FIG. 1 [when rotating so that the head 1 may cross a recording form with a circle type] A, they are mass [of an ink drop] m [kg], and the rotational angular speed of a head. The turning radius r (r=Dh/2) [m] of Vomg[rad/sec] and the head 1 is used, It is clear that the centrifugal force F=mr (Vomg) 2, and it is necessary to determine the Vomg so that the ink droplet lands at a desired position on the recording surface and the nozzle of the head 1 is continuously cleaned. The present invention is characterized in that the Vomg is not 0.

When the Vomg is close to 0, the present invention approaches a single pass line head system in which the position of the nozzle array is fixed and the nozzles do not move (Vomg=0). When the Vomg becomes large, a large number of nozzles cross over the recording surface in the vicinity of a certain recording surface per unit time, eject ink, receive cleaning in the cleaning unit, and perform a printing operation. Multiple nozzles can pass over the recording surface. However, since the discharged ink moves in the direction in which the centrifugal force is applied, the landing point changes. When the Vomg is too large, ink is ejected from the nozzle when centrifugal forces or centrifugal push forces break the balance of forces that tend to keep the ink near the nozzle menisci. (When the head becomes a centrifugal separator or a centrifugal pump, there is a possibility that the ink is discharged from the head 1.) In the present invention, the Vomg varies depending on the main scanning speed and the sub-scanning speed of the printer, the operating frequencies of the print head, the number of nozzles, the physical properties of the material, environmental conditions, and the like. The Vomg is at least not 0 at the time of printing or processing.

Coordinates when Recording a Dot

In a known printer or laser processing machine that scans the X-axis and the Y-axis, it is easy to two dimensional desired position from the sizes of the X axis and the Y axis. On the other hand, in FIG. 1A in which the circular head and the nozzle array of the present invention are used, in consideration of the fact that the ink or the like is applied to the discharged material by the centrifugal force, there is a feature that the nozzle irradiates the ink or the laser on the circular arc like 120 or 120B to record the dot.

Nozzle, Nozzle Row, and Nozzle Arrangement

In the present invention, the nozzle varies depending on the ejection method. A nozzle used in the additive manufacturing method and a nozzle or a discharge portion used in the ink jet method are different in shape and size. (For example, the diameters of nozzles in a method of extruding and injecting a material in a 3D printer, such as an FDM method, are generally larger than those of nozzles in an inkjet method.) In the present invention, the nozzle array of the recording head 1 (print head 1) includes The nozzle rows may be arranged in a circular shape (annular shape) like the nozzle rows 100 of FIG. 1A, FIG. 1A, FIG. 1AA, and FIG. 1B, 100A, and 100B, and the nozzle rows of 100A, 100B, and 100 are not limited to one row in a circular shape, and may be a plurality of nozzle rows arranged in a circular shape at a certain pitch P. The number of nozzles Nz may be at least one. A significant feature of the present invention is that the number of nozzles Nz is one or more. Even if there is one nozzle (100NZ), one nozzle crosses the recording surface 2 while performing printing by ink ejection in a loop. When the recording head is rotated at a high speed in the main scanning direction and the nozzles are provided with a high driving frequency f capable of following the rotational speed in the main scanning direction when the same process is repeated again after the cleaning 3, high-speed printing can be performed and the present invention can be implemented. However, in order to increase the speed of the ink jet printer as intended by the present invention, the number of nozzles is one or more because one nozzle is insufficient, and the number of nozzles actually exceeds several hundreds. In the present invention, either an ink jet method, or the FDM system or addition manufacturing method of 2 or 3 or more is preferable, and if the number of nozzles is an inkjet method, it will exceed the 4th power of 2. However, even when the number of nozzles is one, the scanning method of the present invention can be implemented. On the other hand, in the application of the present invention using a single nozzle of a piezo type or a valve jet type and using a special ink, or in the application of 3D printing by an FDM method or an AM method, there is a possibility that the number of nozzles may be 2 to 3 or 2 to 4 or less, and therefore, in the present invention, the number of nozzles Nz may be one or more.

Figure 1A:
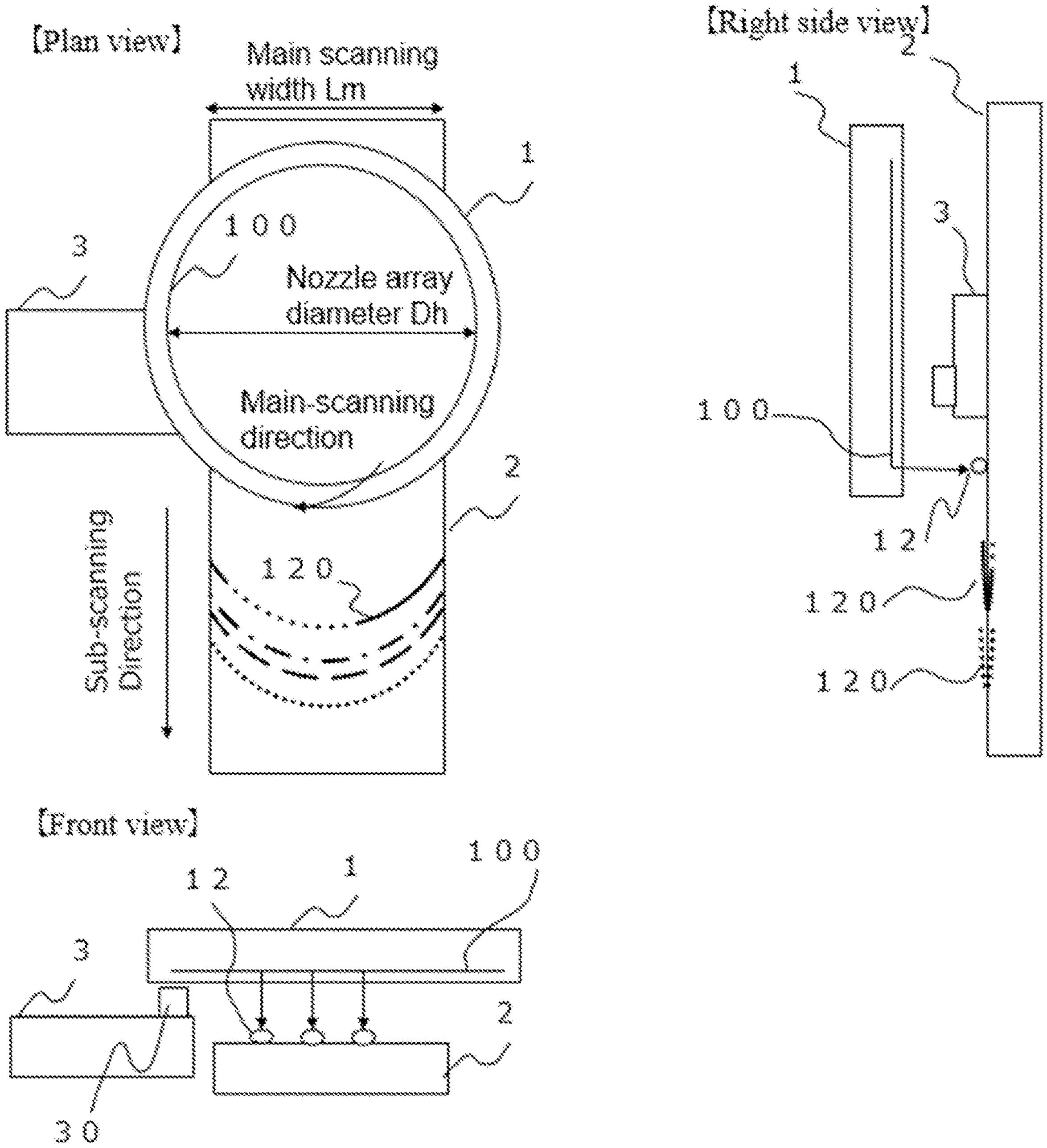
FIG. 1A is a diagram showing a relationship among a scanning direction of a head including nozzles, a cleaning unit, Lm, and DDh.
Figure 1A:
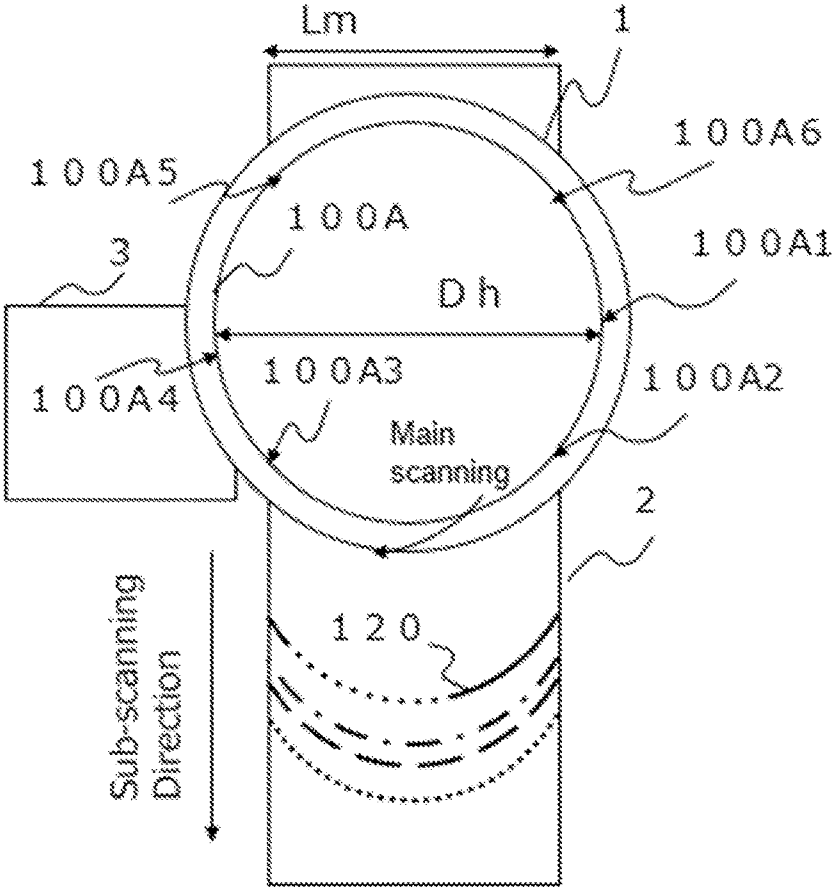
Figure 1A:
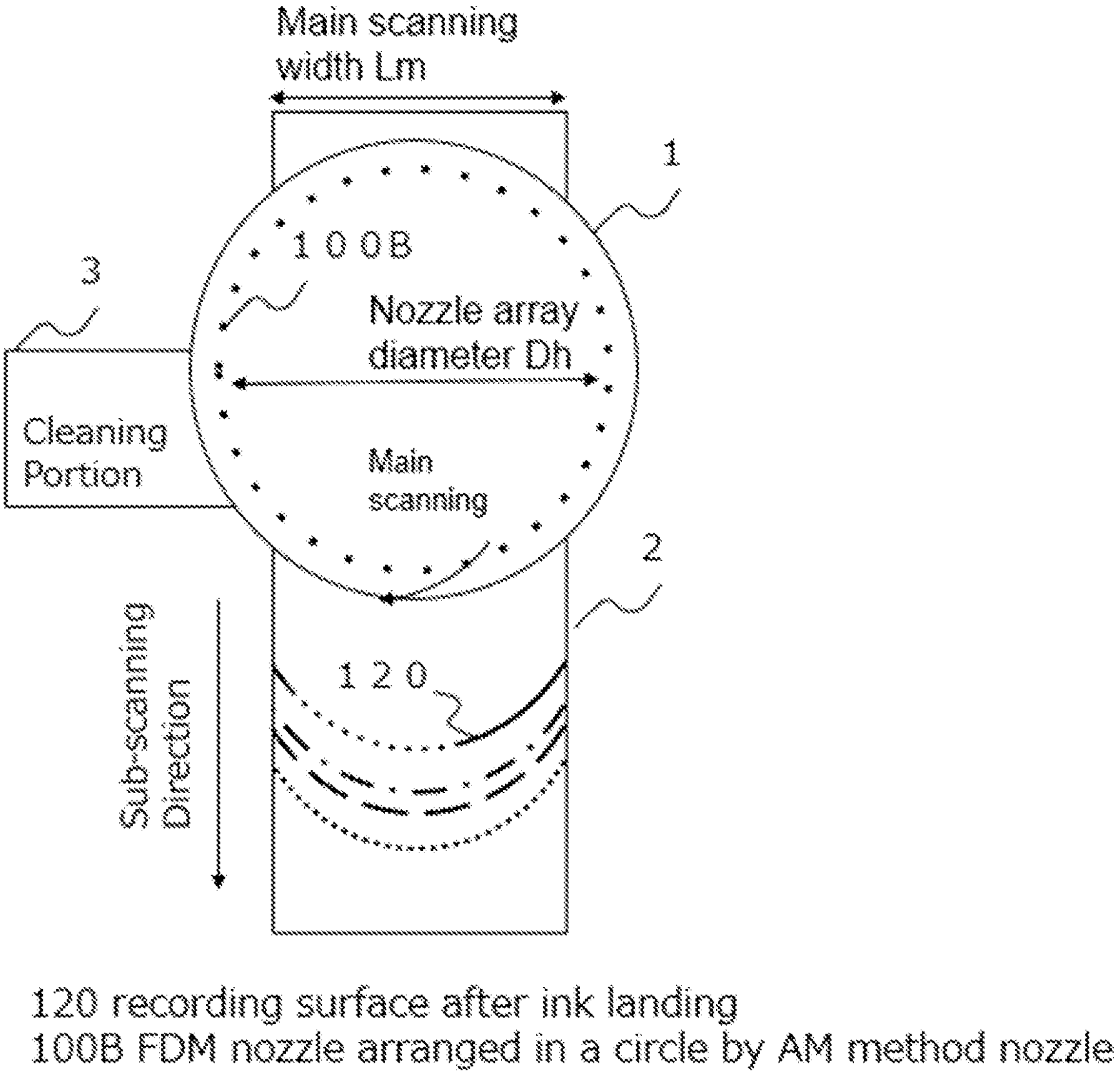
Figure 1A:
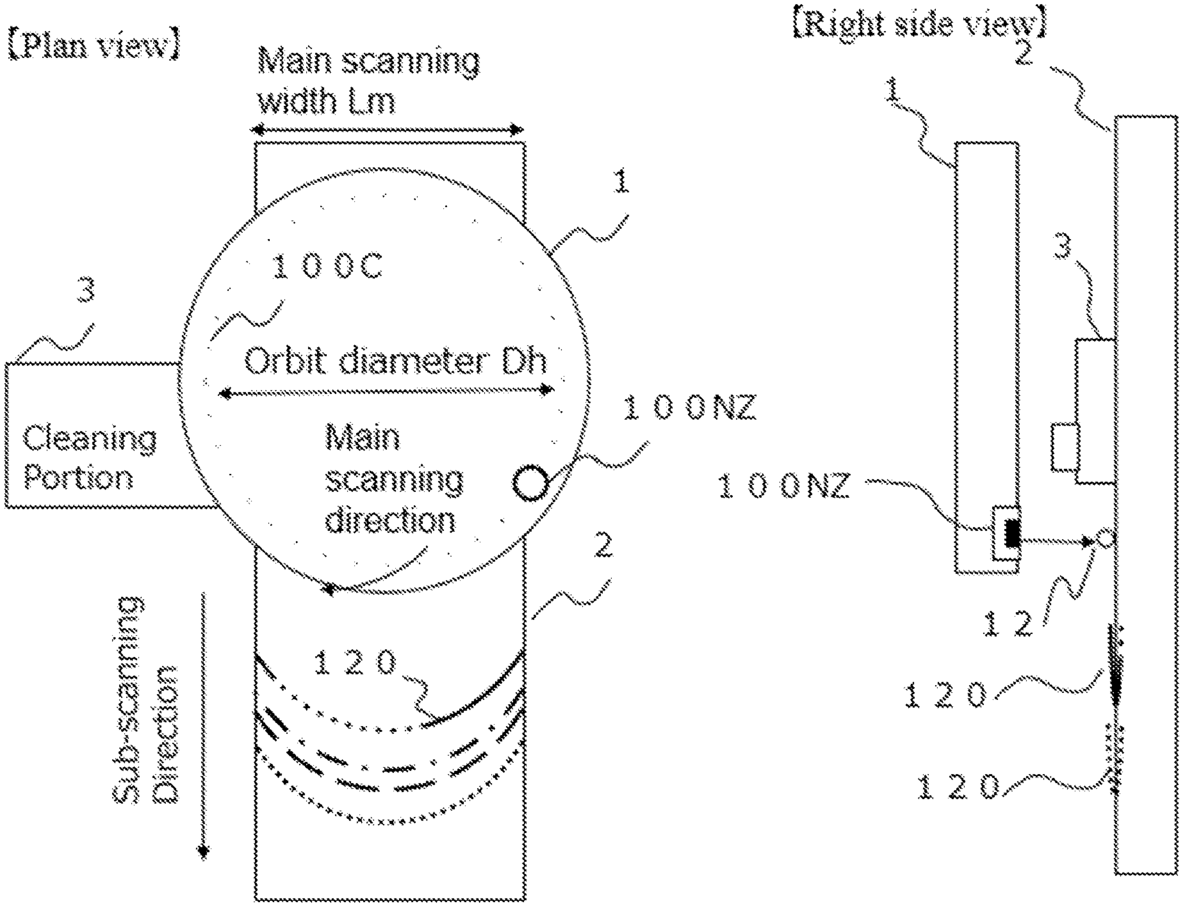

Although FIG. 1A shows the case of a nozzle for discharging a material, the same applies to the case where a laser diode is disposed as a device in place of the discharging nozzle, and the recording surface 2 filled with an ultraviolet curable material or metallic powder is scanned to perform printing, baking, fixing, and processing with the device such as the laser diode. That is, a plurality of element rows may be arranged at the pitch P in a circular shape. The device array may be a laser diode, or a laser nozzle 100LD or a nozzle array connected to a laser diode or a laser oscillator. The laser element may be pulse-driven at a certain driving frequency f to utilize the peak power. A laser irradiating nozzle 100LD for laser processing may be disposed in the print head 1 instead of the material discharging nozzle.

The nozzle, the orifice, flow path, IC circuit which the ink jet element containing a nozzle (an orifice, a flow path and a sensor, a heating element, and an actuator) was arranged by the round form at the silicon substrate for semiconductor processes, etc., and were made from MEMS technology, a photolithography, etc., In the present invention, it is preferable that the sensor elements and the like are integrated because the nozzle surface is horizontal at the level of the surface of the silicon substrate. However, in reality, in order to realize the nozzle array 100 of the head 1, a rectangular chip (inkjet chip An inkjet head element, a head element used for forming a staggered arrangement in a large printer, and a rectangular chip in which an inkjet nozzle, a flow path, and an ejection mechanism are formed may be arranged in a circular shape. In order to prevent misunderstanding of the head elements (10 11) described here a specific example of a printer head will be described.

In the off-carriage type Epson Corporation (model L1440 etc.) Konica Minolta, Inc. (model KM1024a etc.)

In the on-carriage type Canon (model PF-05, etc.), Hewlett-Packard Company (model C6602A, etc.). A head may be constructed by circularly continuing a staggered arrangement similarly to a staggered arrangement head performed in a known serial printer of an ink jet system. In the case of the example shown in FIG. 1A, head elements (rectangular chips in which inkjet nozzles, flow paths, and ejection mechanisms are formed) may be arranged alternately (in a zigzag arrangement or a staggered arrangement) along the trajectory of the inkjet nozzles 100A arranged in a circle or 100 circles. Even in this case, the head 1 may be provided with an acceleration sensor to detect the inclination of the element or the head.

A valve jet element, an electrostatic inkjet element, a piezo inkjet element, or a thermal ink jet element, each of which has only one nozzle (a single-nozzle head element or a single nozzle), may be arranged in a circle in one row or a plurality of rows at a pitch P. The ink jet chip may be provided with nozzles arranged at a pitch P, and in the present invention, a strip-shaped nozzle array having a plurality of nozzle arrays on the circumference may be arranged. (This is a description intended to form a circular and band-like nozzle array when the above-described rectangular head elements are alternately arranged.)

Figure 1B:
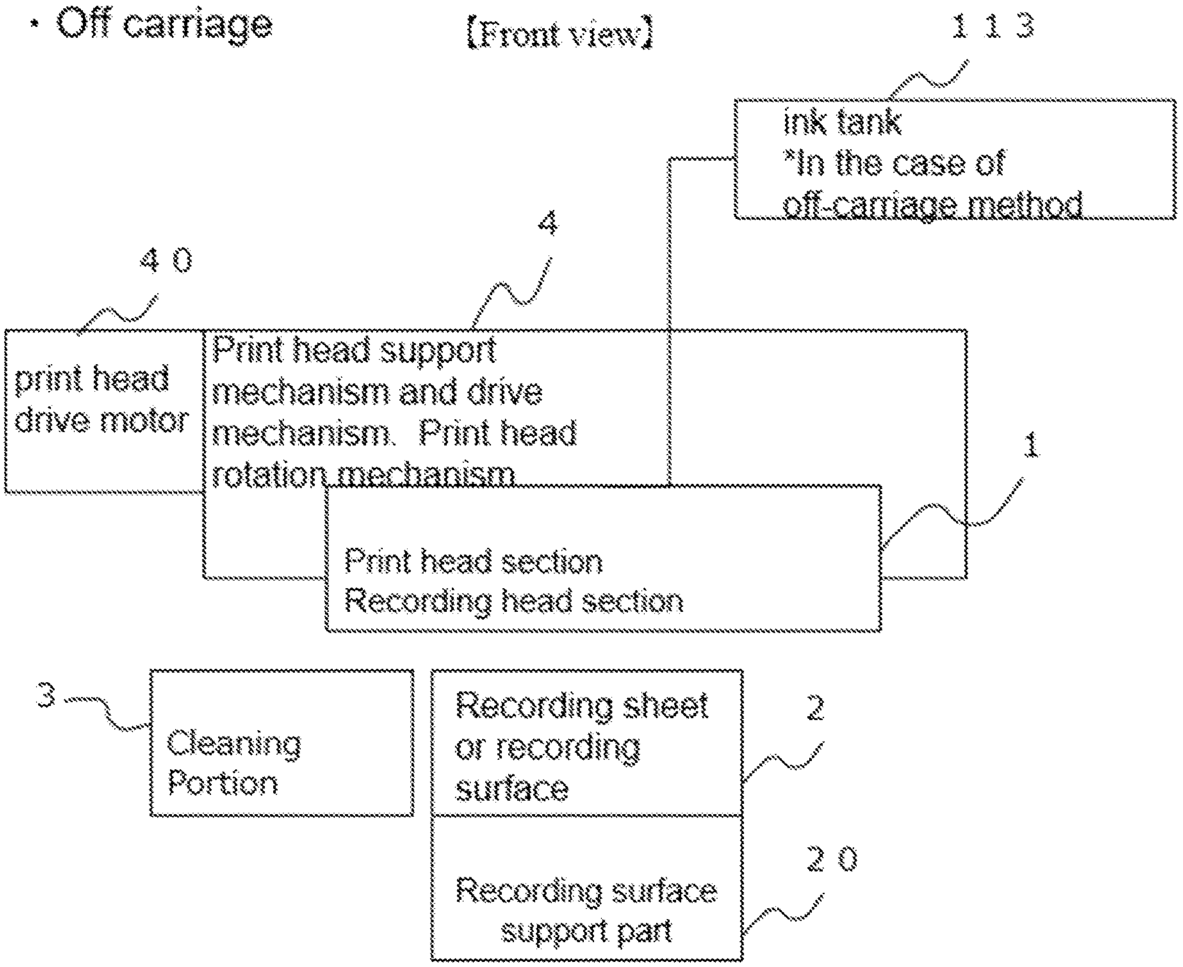
FIG. 1BA is an explanatory view (plan view) of an ink supplying system of an off-carriage system.
Figure 1B:
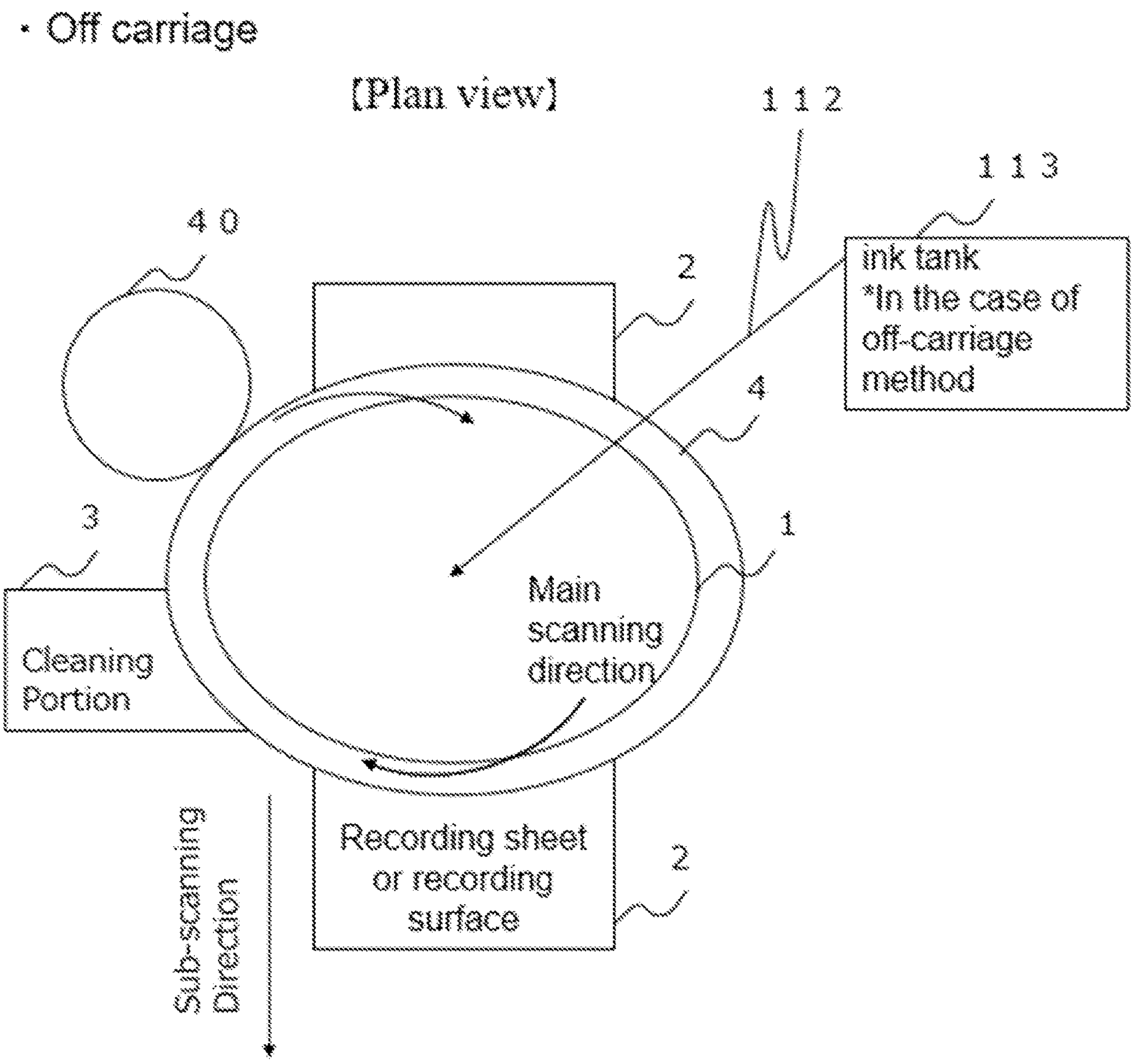
Figure 1B:
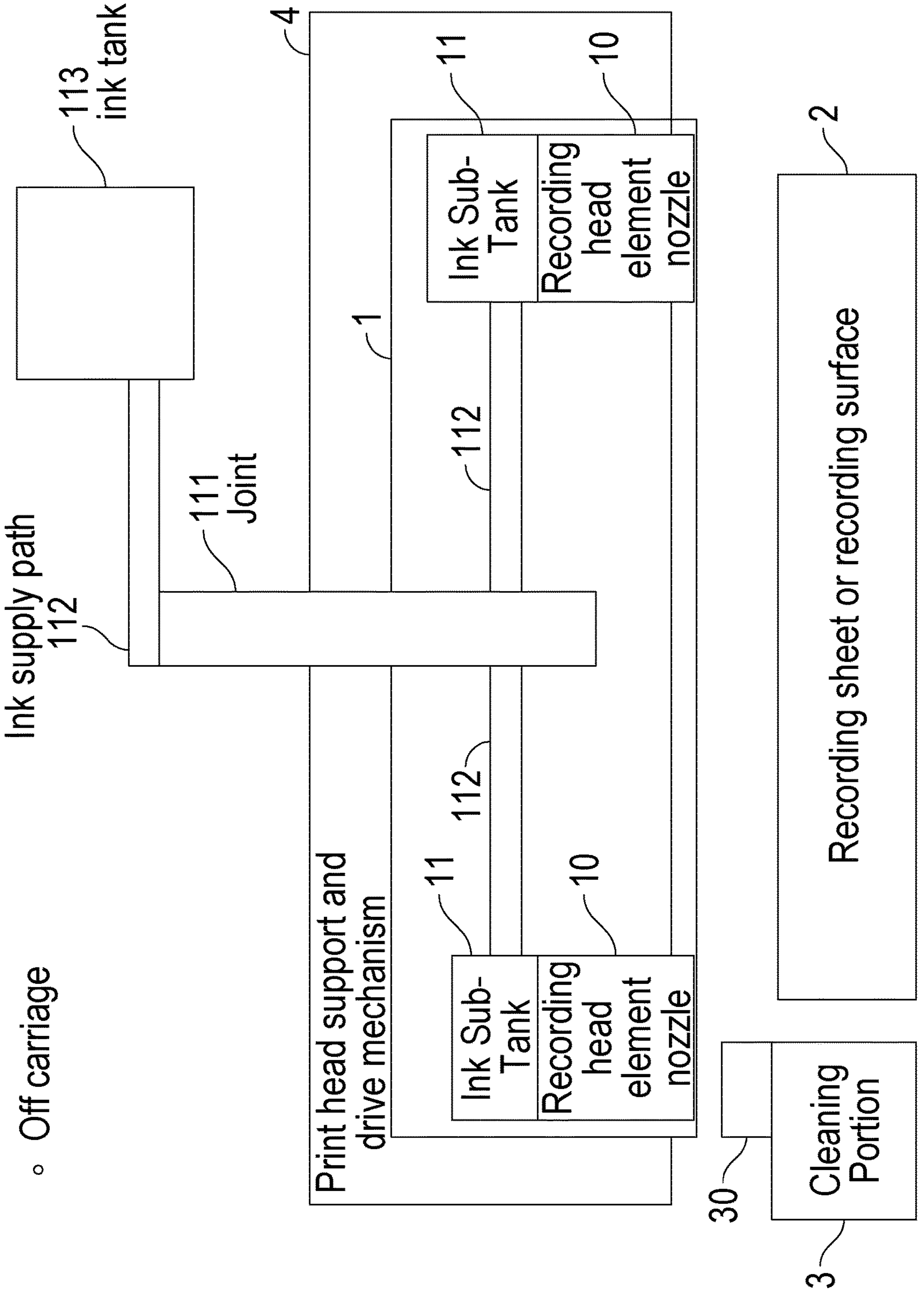
Figure 1B:
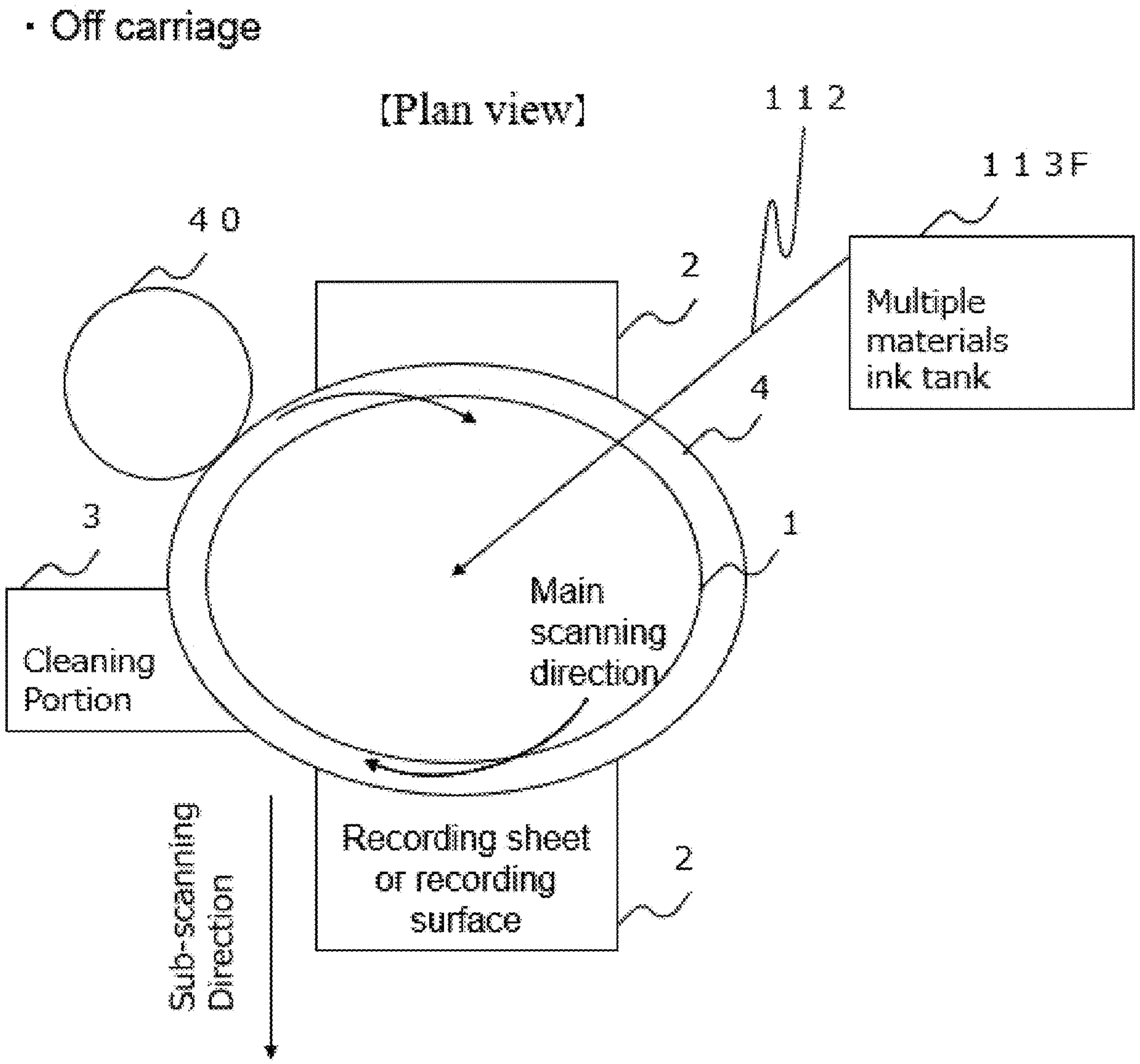
Figure 1B:
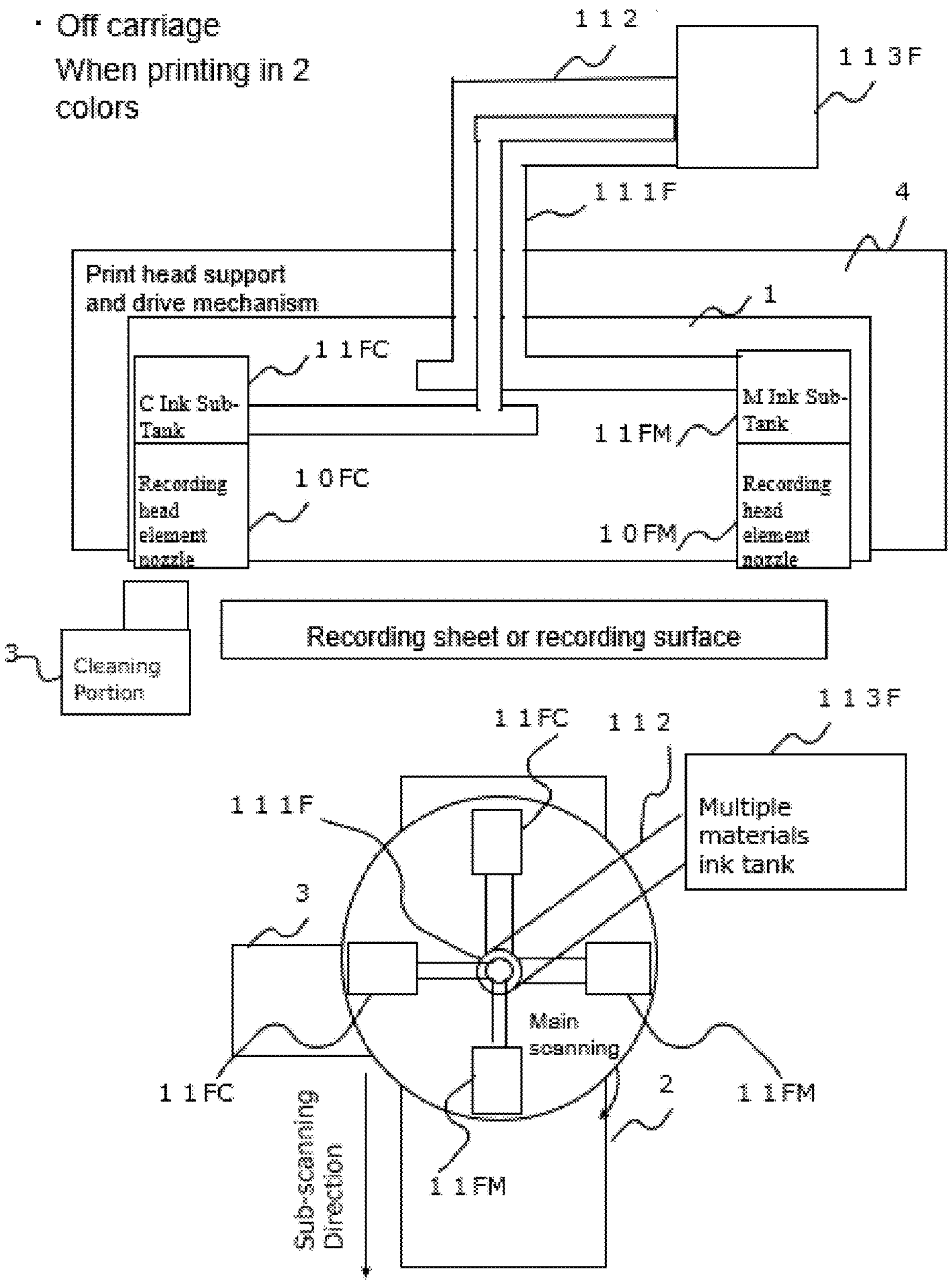
Figure 1B:
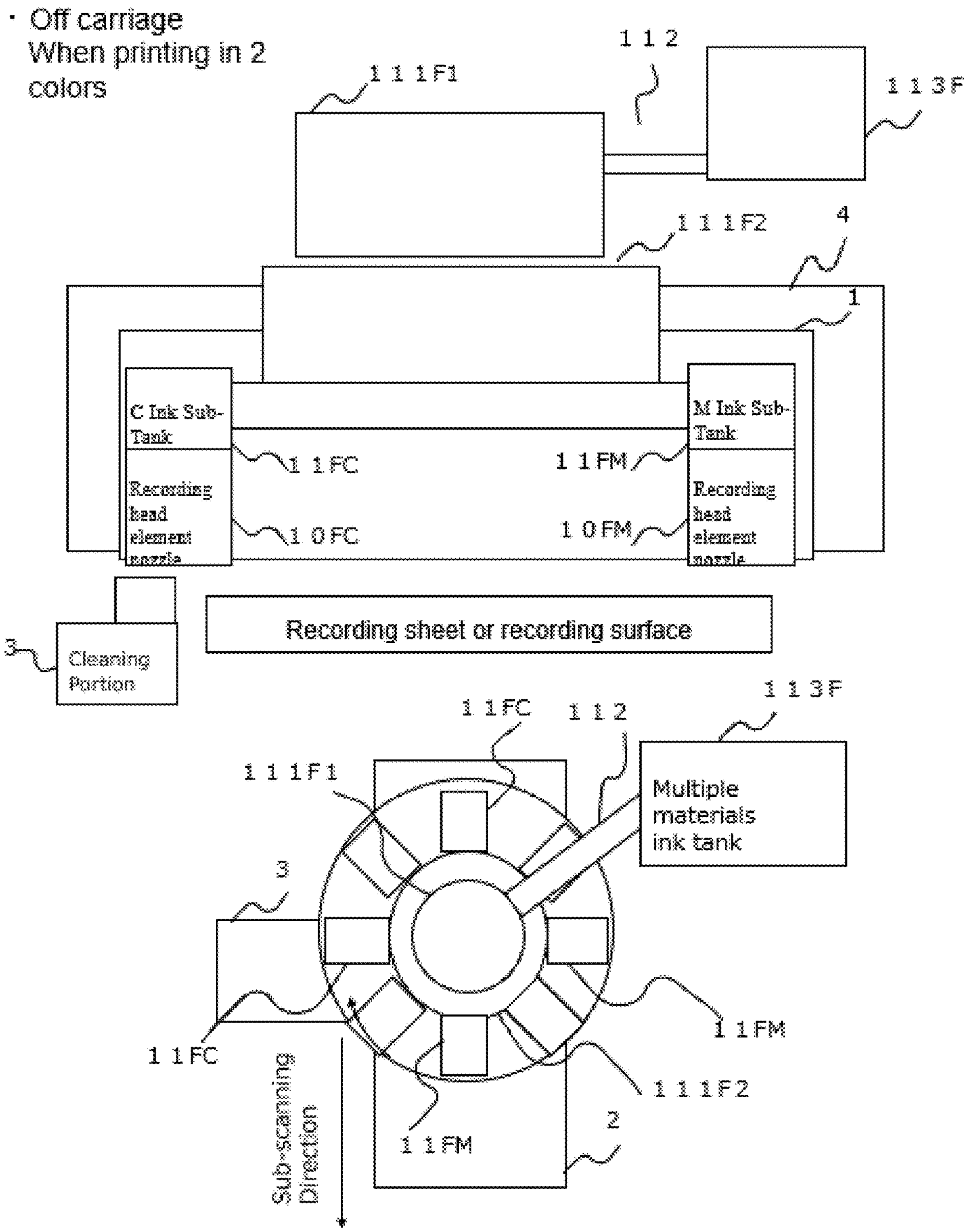
Figure 1C:
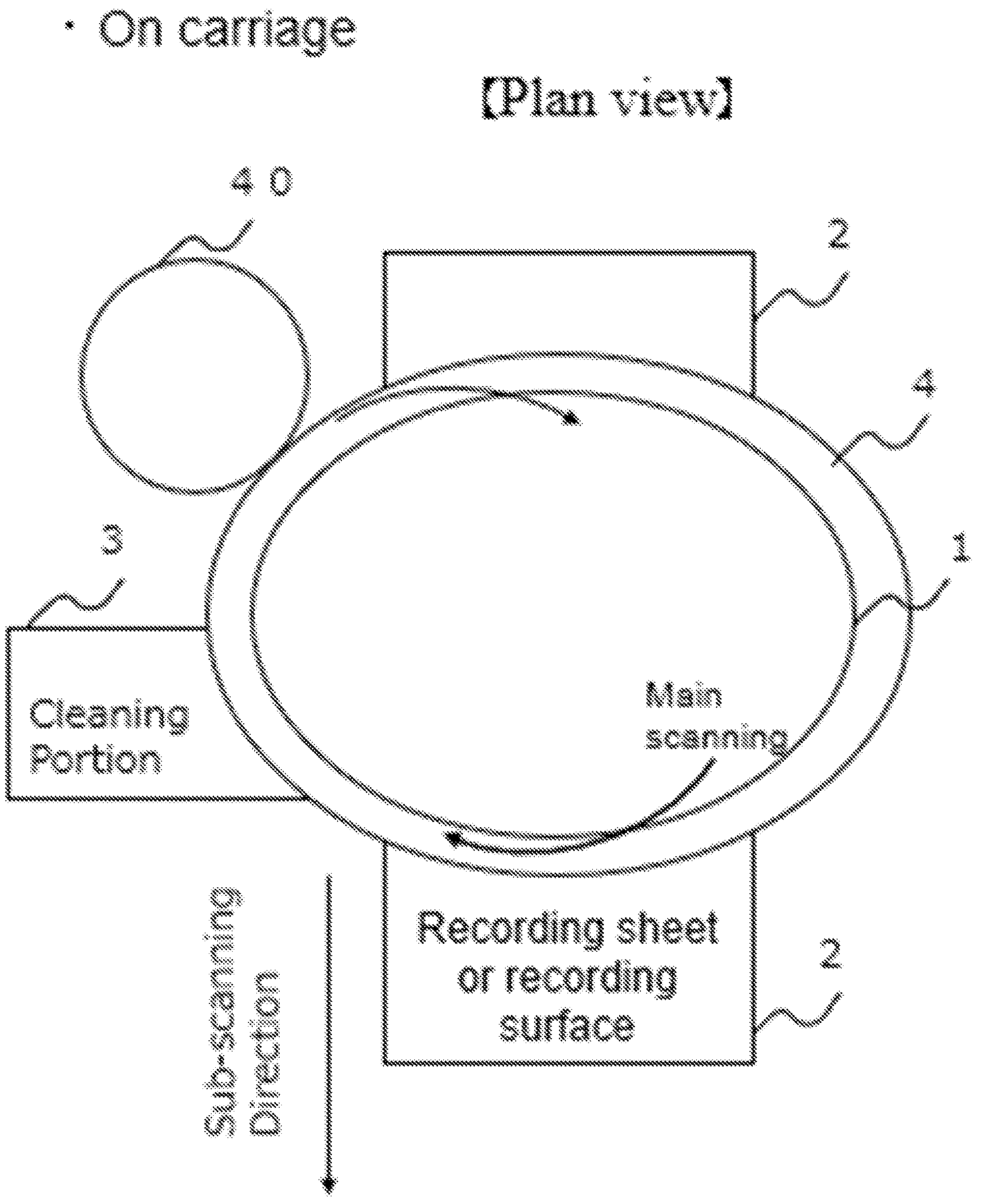
FIG. 1C Explanatory diagram of on-carriage system.
Figure 1C:
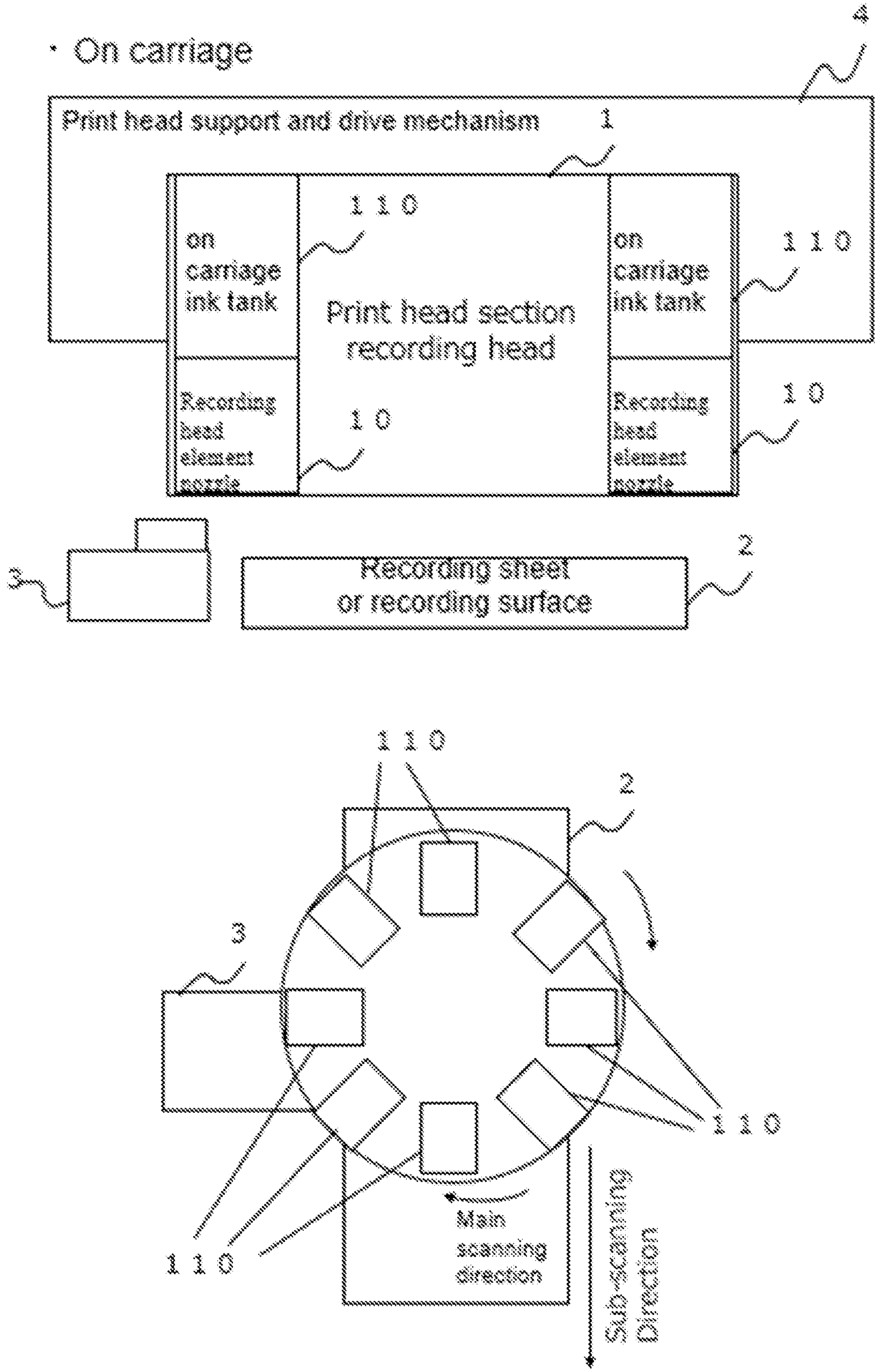
Figure 1C:
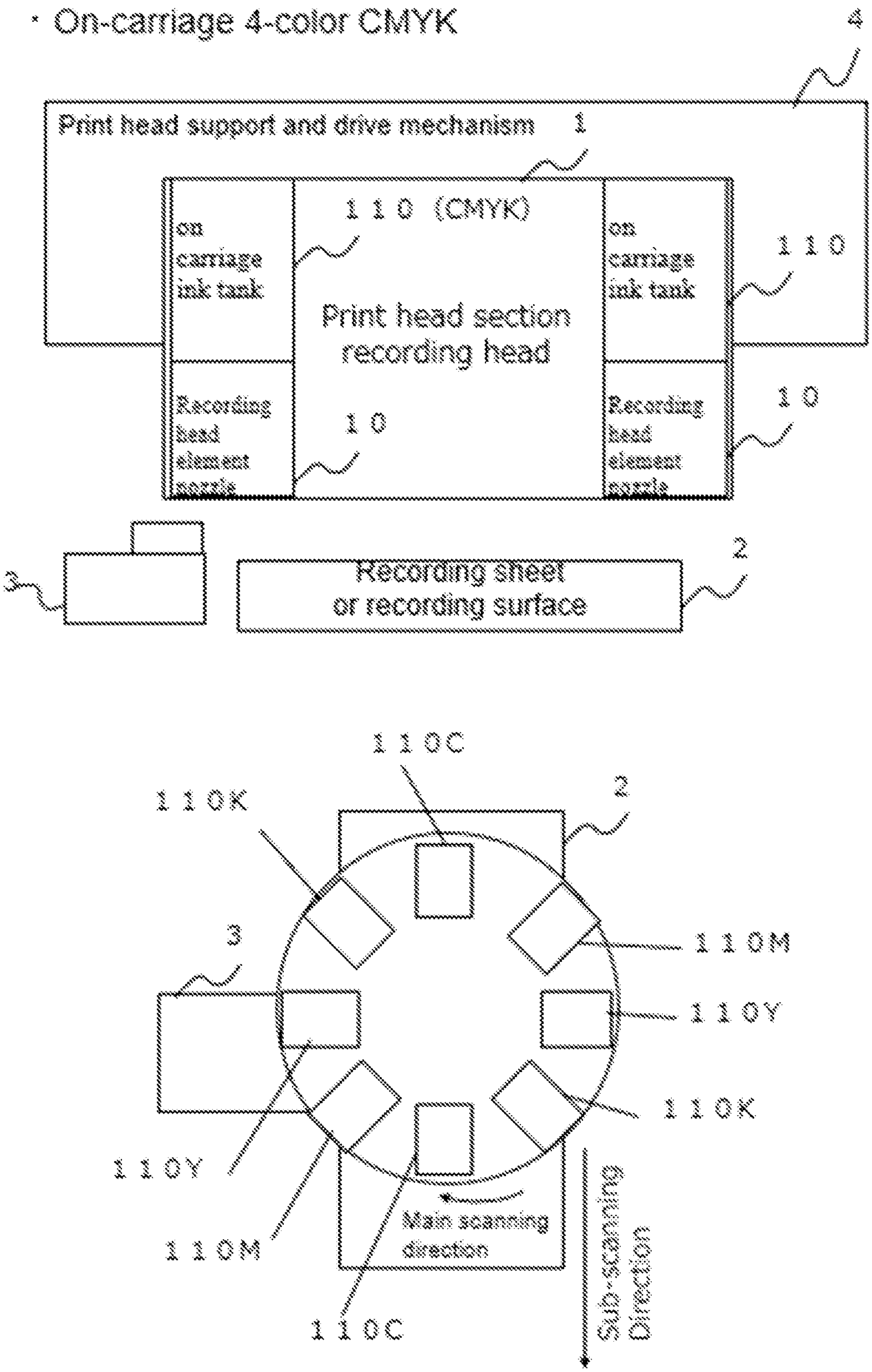
Figure 2A:
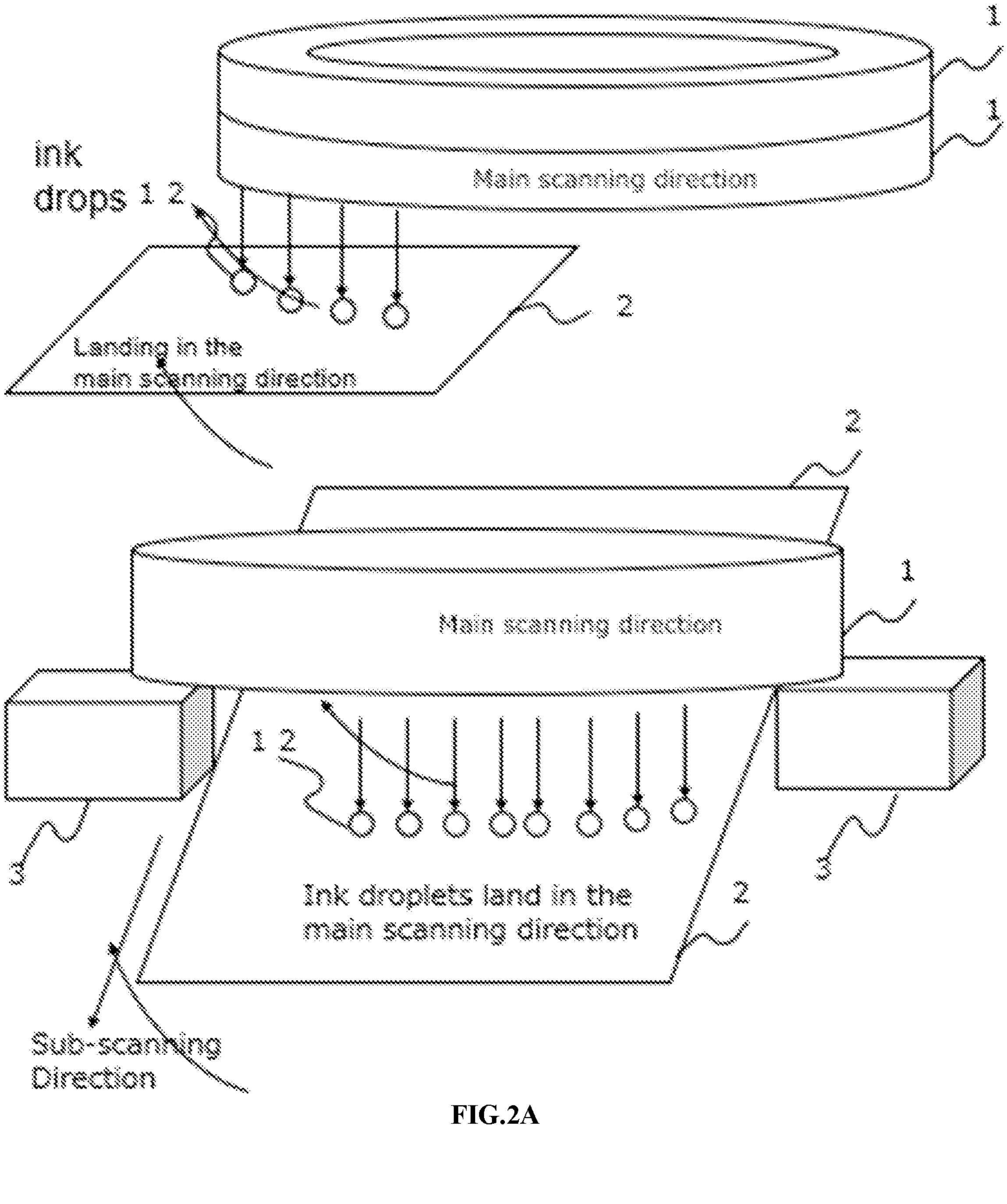
FIG. 2 AA Explanatory view in the case of equipping the both sides of a recording surface with two cleaning parts with the nozzle part which performs circular discharge to a recording surface.
FIG. 2B is an explanatory view of a case where a recording surface rotating around the center of a turntable-type recording surface 2 is used in a three dimensional printer.
FIG. 2C is an explanatory diagram of a case where nozzles are provided in a train shape on an elliptical looping track to form a nozzle row, and the nozzle row is moved along the elliptical track to cross a recording sheet, and nozzle cleaning is performed by a cleaning unit.
FIG. 2D is an explanatory diagram of a case in which a circular head including an elliptical nozzle row is rotated and printing is attempted under a condition in which cleaning is performed only in the vicinity of the major axis of the ellipse.
Figure 2A:
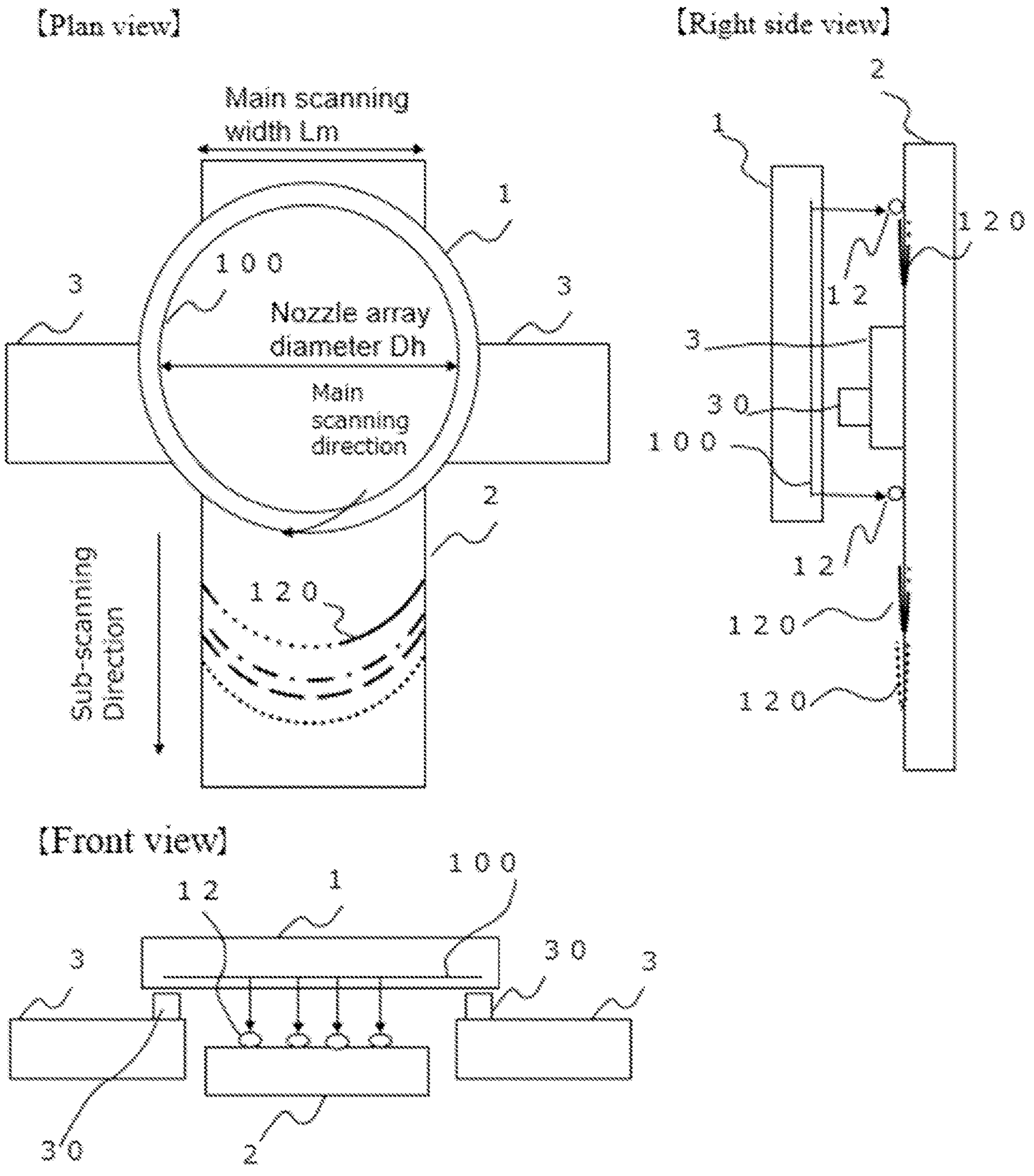
Figure 2B:
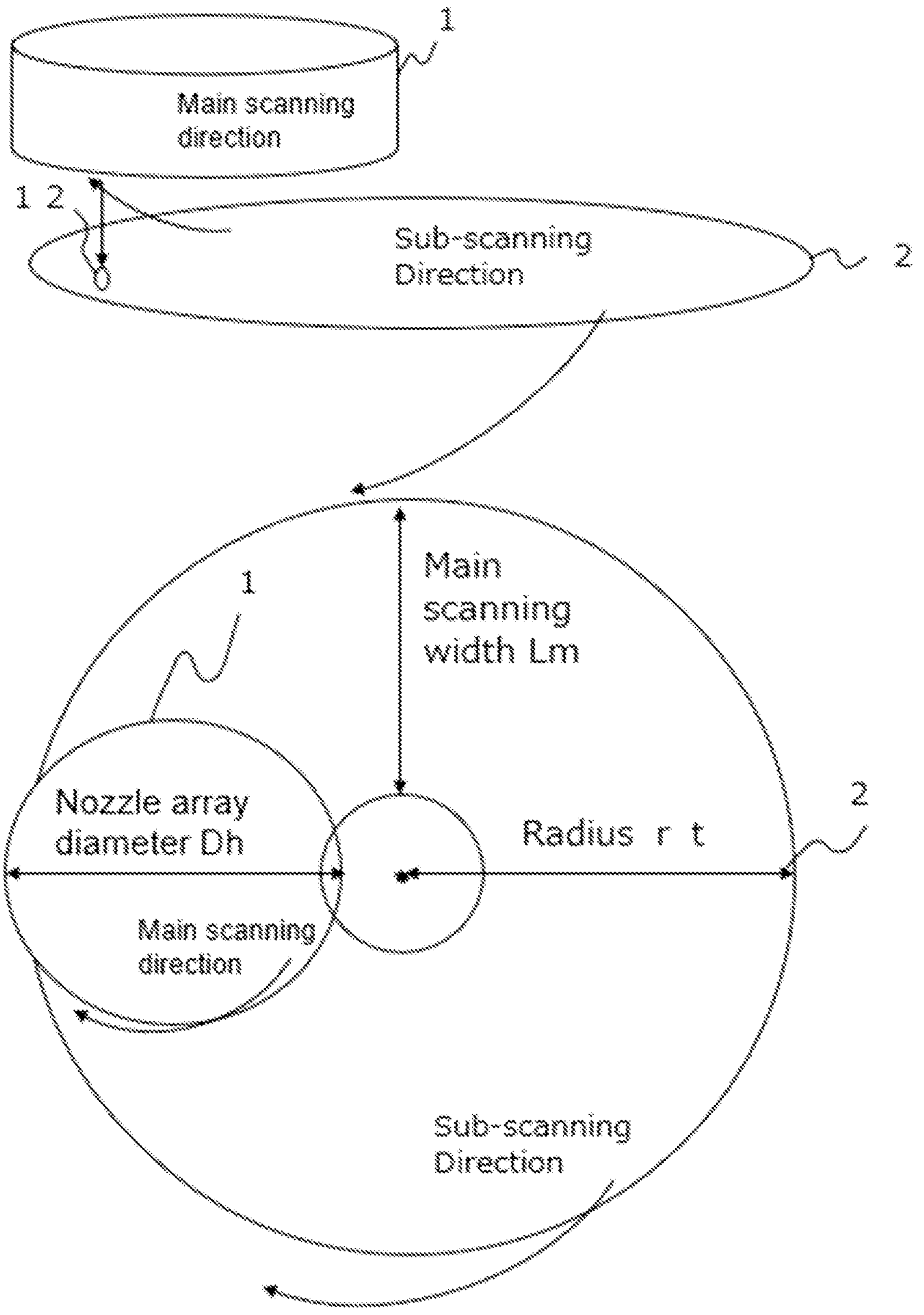
Figure 2C:
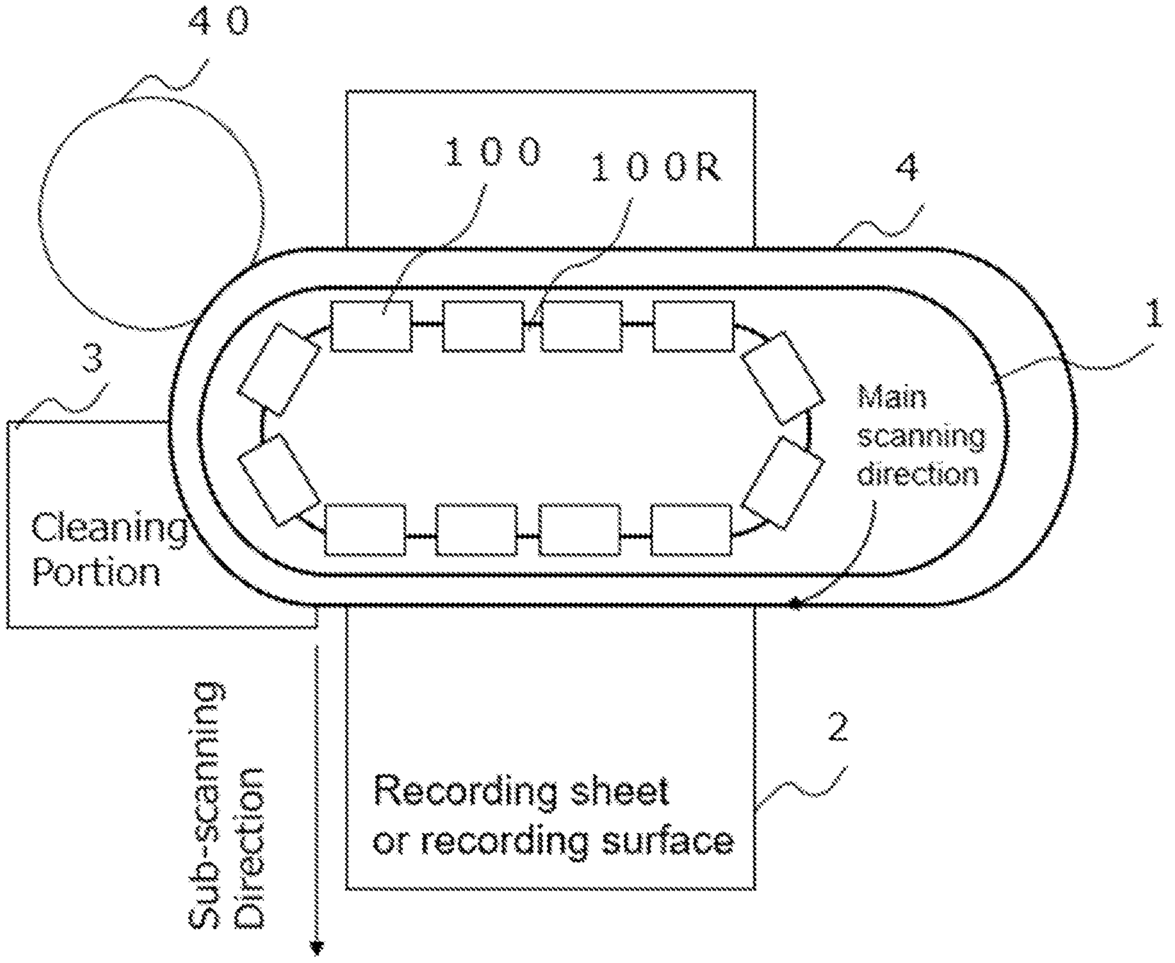

In the present invention, as shown in FIG. 2C, FIG. 1CB, FIG. 1BE, and FIG. 1A, elements that perform ejection, such as one nozzle or one ink jet chip, may be arranged on a circular, elliptical, or oval track that loops, and the elements that perform ejection may be moved along the track as if they were trains (cars, carriers, carriages). 100R in FIG. 2C is a rail track used when the nozzle array 100 is moved. 100R supplies power to the head elements, and 4 or 4R is a drive part for moving the head elements along the looped track, and is provided with a rail and a belt. The 4R is provided with a rail, a belt and the like for moving a head provided with a nozzle 100NZ as a car.

Curing/Fixing/Surface Treatment

The print head 1 may be provided with a mechanism for curing or fixing the discharged material by a known method corresponding to the material when the material reaches the recording surface. For example, when 3D printing is performed using the print head 1 of the present invention, the UV curable ink may be cured by the UV LEDs, and the print head may be provided with UV LEDs or rollers so that the cured UV curable ink can be leveled and stacked by the rollers. The same applies to a case where a powder for solid freeform fabrication is cured, fixed, and bonded while a water-soluble adhesive is sprayed by a piezoelectric or thermal inkjet method.

In order to enhance the adhesion between the laminated layers in the 3D printer, the print head may be provided with a device for UV ozone treatment or plasma irradiation in addition to the ejection device. In the case of an electronic component material, processing for the next step may be performed by the head. For example, after a semiconductor material or an electrode material that can be applied is formed into a film, UV ozone treatment may be performed to prepare for the next step. When the head 1 is used for manufacturing a printed matter or an element, the head 1 may perform a fixing/curing process or a surface treatment.

In the present invention, the recording head 1 is not limited to a discharge application such as an inkjet, and irradiation nozzles of photons or particles such as LED elements or laser elements may be arranged in a circular shape instead of discharge nozzles, and paper or a powder material supplied to the recording paper 2 or the recording portion 2 may be changed by light and used for printing or modeling.

In the case of supplying metallic powder, resinous powder, or photocurable resins when 3D printing is performed by the head 1, the materials may be irradiated with light emitted from a laser nozzle included in the recording head 1 to be reacted, heated, and changed to be bonded, fused, cured, and sintered. This is similar to a concept (an example in which a material is not directly ejected from a nozzle but is provided on a recording surface) in which printing is performed on a thermal paper by a thermal head in a thermal paper type thermal printer to obtain a printed material. The print head 1 according to the present invention cures and sinters recording paper, such as heat-sensitive paper, photocurable resins for 3D printing, and material powder, by an optical head in accordance with printing date to form a printed matter or a shaped object.

The invention includes a scanning method. Like an inkjet system or a FDM system (addition manufacturing method), directly from the recording head (print head 1) which scans the recording surface 2 top, material may be discharged and may be fixed, As in a thermal printer system, a recording material may be supplied to a recording portion, the recording head 1 may scan the recording portion, light, electromagnetic waves, plasma, accelerated particles, or the like may be emitted from the head 1, and the recording material may be reacted and fixed. The scanning method of the present invention may be used for manufacturing and processing two dimensional and three dimensional products. Specifically, also in the printer according to the present invention, the thermal paper can be heated and printed by light, and the ultraviolet curable resin can be cured by using an ultraviolet LED or an ultraviolet laser. A chemical reaction (for example, radiation polymerization) may be caused in the material by using radiation such as X-rays from the head 1 in order to cause a reaction that is difficult to be caused by photon energy of infrared rays, visible light, or ultraviolet rays. The charged particles may be accelerated from the head 1, or may be irradiated or accelerated in the atmosphere or in a vacuum to be implanted into the material. Photons may be irradiated from an element provided in the print head in the form of a laser or the like to heat the metal powder. Hot air or flame (flame, burner) may be applied to the discharged material for treatment. Similarly to a dot impact printer, the recording surface 2 may be struck by an embossing device such as a pin provided in the head 1 and used for output, or mechanical cutting may be performed by a pin or the like instead of the laser nozzle. Similarly to a laser printer, the head 1 can be used for a known application in which a photosensitive drum is irradiated with a laser by photons having a photosensitive wavelength from the head 1 to be charged, and toner or the like is attached to the photosensitive drum.

An Ink Cartridge and Ink Supply

When an ink-jet ejection mechanism is employed in the head 1, both an on-carriage system and an off-carriage system can be used as a system for supplying ink to the head 1. In the on-carriage type, since the ink tank is built in the head 1, it is not necessary to mount a mechanism for supplying the ink fluid to the head 1 which is a rotating body such as the rotary joint 111 as in the off-carriage type. In the off-carriage system, a pump and a flow path for supplying ink from the ink tank to the head may be provided. In the off-carriage system, it is necessary to mount a mechanism (for example, a 111F1, 111F2) for supplying the ink fluid to the rotary joint 111 and the rotary body, but the ink can be supplied from the ink tank 113 to the nozzle of the head. When the present invention is used in an off-carriage system, a joint mechanism 111, a 111F, and a pump 110PP for connecting ink from the ink tank 113 to the recording head elements 10 of the carriage are required. The pump may be provided in the ink flow path from the ink tank 113 to the nozzle 10. 110PP is an example. (Note that an on-carriage method and an off-carriage method can be employed not only in the inkjet method but also in an FDM method (additive manufacturing method)).

In the case of the off-carriage system, one type of material or ink may be supplied to the print head 1, or a plurality of types of ink may be supplied.

Monochrome Printing

When printing is performed with one type of ink, in the off-carriage system, when a joint is used, as shown in FIG. 1BB, the ink of the rotating head 1 is supplied from the ink tank 113 to the sub-tank 11 and the nozzle 10 via the ink tanks 112 and 111. When the joint 111 is not used, it is separated into an ink supplying side 111F1 and an ink receiving side 111F2 as shown in FIG. 1BE, and the ink supplying side of the 111F2 drops, discharges or introduces ink or material into the ink receiving flow path of the 111F1 to replenish or supply ink or material to the rotating head 1. The printer controller 6 and head controller 1CU communicate each other, and supply of ink may also determine a replenishing amount and an input from the tank capacity of an ink passage by ink tank sensor 1LVM connected to 1CU. A controller (1CU, 6, or the like) for controlling the ink flow path and actuators such as a valve and a pump may be provided. As a method of moving the ink in the ink flow path, a known method can be used. For example, there is a known method in which a pump, a valve, and a flow path are provided in an ink flow path so that a pigment dispersed in ink or functional particles having a large particle diameter and easily precipitating do not spontaneously precipitate, and the ink is circulated so that the particles in a tank or the flow path do not completely precipitate.

Process Printing

By an off-carriage formula, the print head 1 which sent two or more kinds of ink to the head from the ink tank 113F, and distributed ink by the joint part 111F of the head and in which it corresponded to each color ink is supplied, following the matter at the time of monochrome printing, when performing printing in two or more kinds of ink (discharge material). When the joint 111F is not used, as shown in FIG. 1BE, the joint 111F1 is separated into an ink supplying side 111F2 and an ink receiving side 111F2, and the ink supplying side 111F1 drops, discharges, or introduces ink or material into the ink receiving flow path of the side wall to supply a plurality of types of ink or material to the rotating head. (In the on-carriage type, the ink is mounted on the head 1 in the form of the sub ink tank 11 regardless of a single color or multiple colors.)

Negative Pressure Formation

When the head 1 and the ink tank are connected to each other, a mechanism for forming a negative pressure in the ink may be mounted on the head or the flow path. For example, a negative pressure formation system with a form object and a negative pressure formation system with a balloon and a spring may be used. The negative pressure forming portion may be mounted on the head of the carriage or the sub ink tank. The head 1 may be provided with a filter for removing foreign matters.

Movement Control Method of Carriage

When a plurality of recording head elements 10 are arranged in a loop to cross the recording surface 2 of the present invention to form a line head, the head 1 on which the plurality of recording head elements 10 are mounted may be controlled using an encoder. The control of the mechanisms, in particular, the main scanning mechanism and the sub-scanning mechanism such as the driving mechanism 4 and the recording surface conveying mechanism (20 and 5) by using an encoder such as a rotary encoder or a linear encoder is known to a printing machine including an ink jet printer or a laser printer, but will be described here. As a specific example, a recording head element is mounted so as to loop across a recording surface of the present invention, and an encoder control sensor (for example, an optical sensor for an optical encoder and a magnetic sensor for a magnetic encoder) is mounted on a recording head or an on-carriage or off-carriage head on which the recording head is mounted. A linear scale may be attached to a track that loops on the printing machine side (processing machine side), and motion information or position information of the head when the head loops so as to cross the recording surface at the time of printing may be detected and used for control of main scanning or sub-scanning at the time of printing. A rotary scale or a rotary encoder may be attached to the motor 40 of the driving mechanism 4 for performing the main scanning or the conveying mechanism 20 of the recording surface 2 for performing the sub-scanning, and may be used for motor driving control. Also in a case where the present invention is used as a 3D printer, an encoder may be used as a mechanism for performing scanning in the height direction (Z-axis direction), or an encoder may be used as a mechanism for performing main scanning (X direction) and sub-scanning (Y direction).

Method of Carriage

When a plurality of recording head elements 10 and 100NZ are arranged so as to form a loop across the recording surface, a plurality of on-carriage or off-carriage heads 1 or head type robots 1 may be arranged on the track forming the loop. Like a line trace type robot, the head type robot 1 may detect motion information or position information using an encoder provided on a track. A linear encoder may be used as the encoder. When the head 1 is driven, an encoder (rotary encoder) may be used for the motor.

For example, the recording head element 10 is mounted on the circumferential disk substrate [being circular (round shape)] side so that it may stand in a row in a round form, and a linear scale is stuck on the side surface (for example, 1PU of FIG. 5 B and the side surface of one) of a disk substrate so that it may go around a circle with winding, so that the recording surface 2 may be crossed and a loop may be carried out, While the head 1 is rotated by moving the side surface of the head 1 by the driving mechanism 4 and the motor 40, printing may be performed by reading a linear scale of the head 1 by a linear encoder attached to the driving mechanism 4 and using the read position for detection.

In a circular turntable type print head 1 shown in 1A, 1AA and 1AB, recording head elements 10 are mounted on the circumferential side so as to be circularly connected to the circumferential side of the head 1 as shown in 1BD, 1BE or 1CB. The print head 1 may be an on-carriage type print head containing ink or an off-carriage type print head connected to an ink tank by a joint. The turntable type print head 1 may perform printing by rotating the circumferential portion of the turntable by the driving mechanism 4, scanning the nozzle portion 100 so as to cross the recording surface 2, and discharging ink.

Main Scanning Trajectory

The trajectory that loops so as to cross the recording surface 2 may be circular, oval track-shaped, elliptical, oval, or circular (perfect circular). In addition to the circular or elliptical trajectory, it is also conceivable to form a trajectory in which the Arabic numeral “8” is traced with a single stroke while crossing one point, and to arrange a cleaning unit that performs nozzle cleaning while crossing the recording surface as in the oval track type. The loop path of the figure 8 of the Arabic character is an example in which there is one point of intersection at the time of looping, and there may be more than one point of intersection. However, in the embodiment of the present invention, a simple shape such as a circular shape or an oval track shape is shown.

Case where Nozzle is Fixed

When the nozzles are fixed and the head 1 (in this case, the head 1 is a disk or cylindrical turntable type head 1) is moved, the shape of the nozzle array (looping trajectory) is circular. Even if only one nozzle, not a plurality of nozzles, is mounted on the turntable type head 1, since the nozzle can perform discharge printing and processing while drawing a looped circular track crossing the recording surface claimed in the present invention by rotating the head 1, one or more nozzles may be provided on the track of the main scanning.

Case of Moving Nozzle

When the nozzle is moved and the head is fixed, the looping trajectory is preferably in the form of an oval track, an ellipse or an oval. When a car with nozzles is mounted and moved like a train connected to the looping track, the nozzle array also has an oval track shape, an oblong shape, or an elliptical shape. The FIG. 1A is circular and the FIG. 2C is oval track shaped. In FIG. 1, an elliptical shape is illustrated as the looped trajectory. As described in the previous paragraph there may be a case in which there is a trajectory that loops so as to draw the Arabic numeral 8. When the track is regarded as a track on which a train whose operation is controlled by non-contact communication and which is supplied with power by an overhead line runs, even in the case of the 8-shaped track, if the number of nozzles is small, for example, one nozzle, the track can be used as long as cars (carriers) carrying the nozzles do not collide with each other at the intersection of the 8-shape. The trajectory is not limited to the figure eight, and a trajectory including points that intersect in a looped path can be used. However, in the present invention, it is possible to use an elliptical shape, an oval track shape, and a circular shape, which do not cross each other, rather than a loop trajectory including a crossing point, from the viewpoint of simplicity of manufacture and control.

Formation of Head

When the trajectory of the loop is circular as in FIG. 1A and FIG. 1AA, in the case of manufacturing the head 1, the ink jet chip, the ink jet device plate, and the ink jet head device (which is the ink jet head device 10 provided with a plurality of nozzles and includes: For example, head elements 1 having nozzles and sub-ink tanks shown in 10FM-11FM and 10FC-11FC of FIG. 1BE 0) in the circumferential direction to form a nozzle row 100 and a 100A. A disc-shaped substrate such as a compact disc is used, and ink jet chips used for printing, sensors (ink temperature sensors, motion sensors), ICs such as a driving circuit of a discharge mechanism, non-contact communication components, ink flow paths, and the like are mounted on the disc-shaped substrate to form a print head 1 as shown in FIG. 1BE. At the time of printing, a print head 1 of a disk-like substrate is rotated from the outside by using a driving mechanism 4, ink (discharge material) and electric power are supplied, print data is transmitted from a printer body to the print head by non-contact communication, and printing is performed on a recording surface 2. (Note that the print head 1 may be provided with a motor 40 and move and rotate along the mechanism 4. The print head 1 may be provided with a secondary battery and a motor 40 and rotate by power charged on the head and motor side while using a rail, belt, guide, or linear scale of the drive mechanism 4.).

Note of Trajectory to be Scanned by Head and Nozzle

In the present invention, a head having a circular nozzle array is rotated by the driving mechanism 4. Here, in a case where a print head formed by arranging not a circular nozzle array but elliptical or oval nozzles is used for printing by fixing the nozzles and rotating the head For example, in the case shown in FIG. 2D, when the elliptical nozzle array 100 is rotated, cleaning cannot be performed except for the nozzles in the vicinity of the apex on the major axis of the ellipse reaching the cleaning unit 3 (all the nozzles other than the apex of the elliptical nozzle array cannot be cleaned), which deviates from the problem of the present invention. Therefore, in the present invention, in the design in which the head is rotated, it is preferable to rotate the head provided with the nozzles arranged in a circular shape as shown in 2D of the drawing, not the nozzles arranged in an elliptical shape as shown in 1A of the drawing.

Figure 2D:
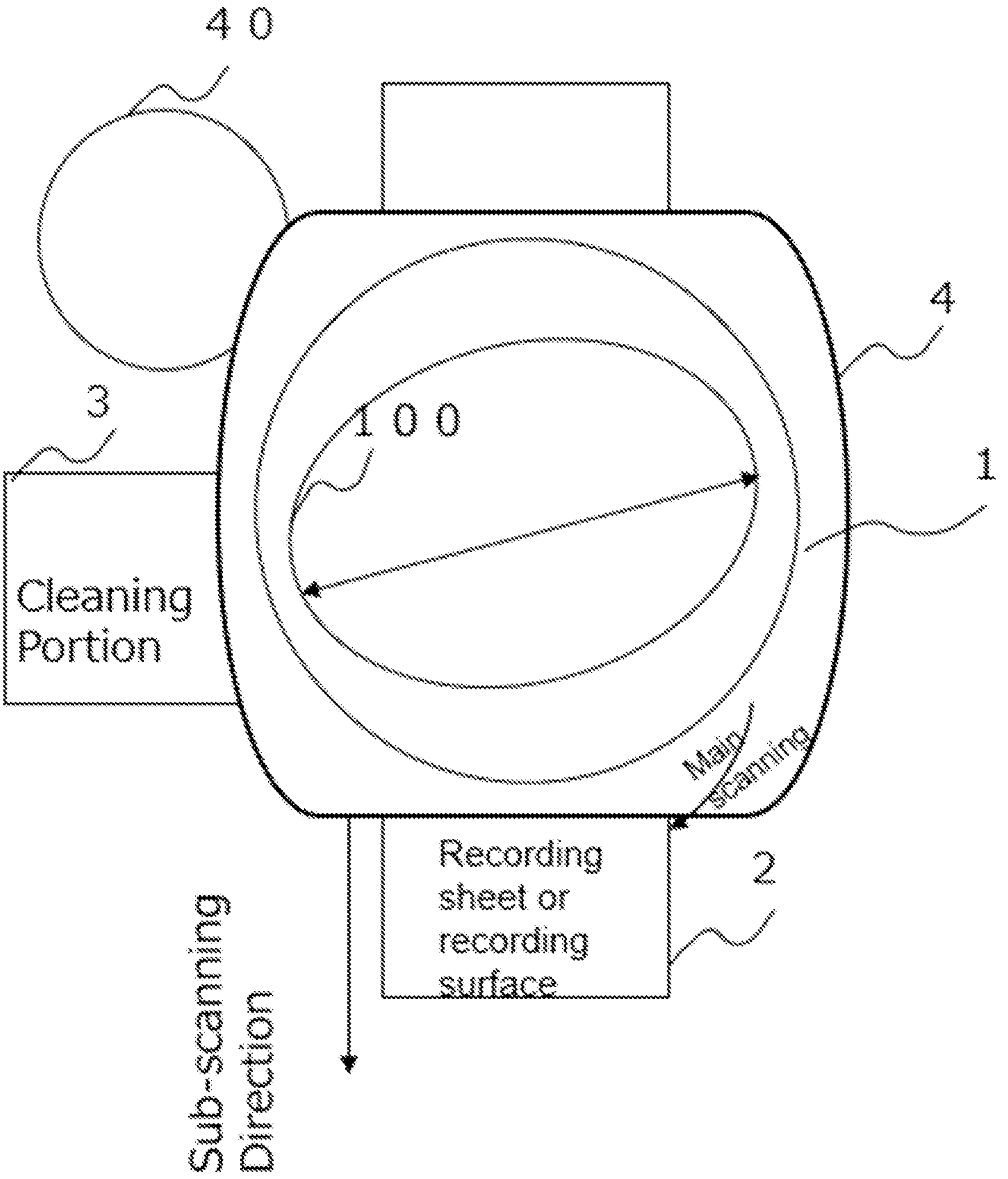

However, even in the case shown in FIG. 2D, since the two vertex portions of the elliptic nozzle row can pass on the trajectory that loops across the recording surface side 2 to perform printing, it can be used for printing of the present invention. In the above-described situation, the two vertex portions of the elliptical nozzle row are in the same state as that of a head (a head including only two nozzles) including nozzles at two positions on the circumferential side of the disk-shaped head so as to face each other with the center of the circle interposed therebetween. When a main scanning speed is higher than a sub-scanning speed (when a head 1 is rotated at a high speed many times in a unit time and a recording surface 2 can be main-scanned) even if the number of nozzles is one or two when the nozzles are arranged in a circular shape in the present invention If one nozzle is scanned at a high speed in the main scanning direction on the looped track crossing the recording surface 2 and the one nozzle has a high driving frequency f, the printing operation and the cleaning operation can be performed even if all the nozzles other than the two vertex portions of the elliptic nozzle array are not operated. In view of such circumstances, in the present invention, the number of nozzles is set to one or more (as long as the number of nozzles exceeds at least one, it is possible to perform recording on the recording surface). If improvement in the speed of printing meant by the present invention is meant, it claims passing along a cleaning part in addition to crossing the trajectory which exceeds 1 and carries out a loop with tens of or more nozzles at 2 to 8 or more, and an ink jet.

Trajectory when Nozzle Moves

Figure 5A:
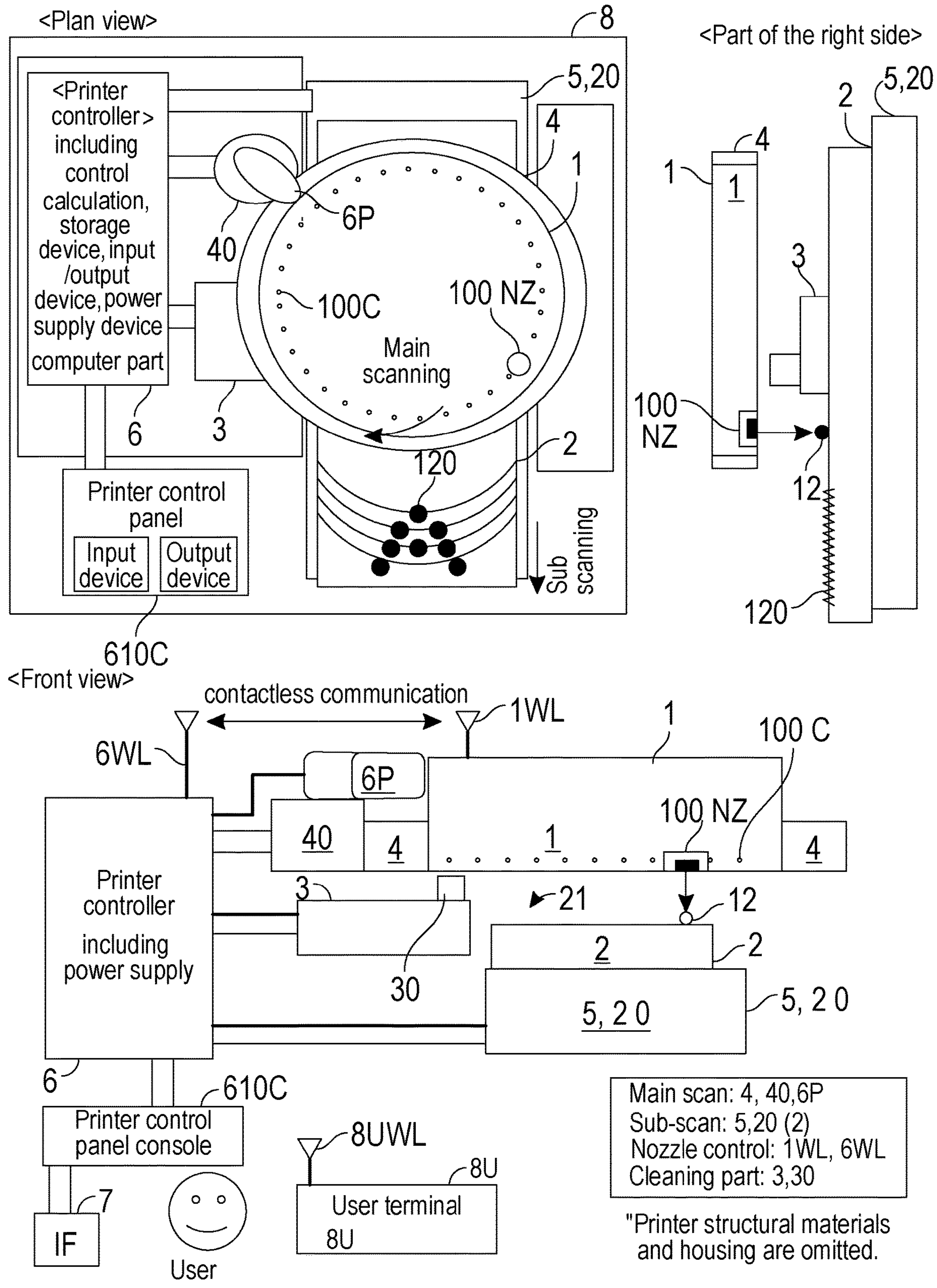
FIG. 5A is an explanatory diagram of a printer having one nozzle in an on-carriage system.
Figure 5B:
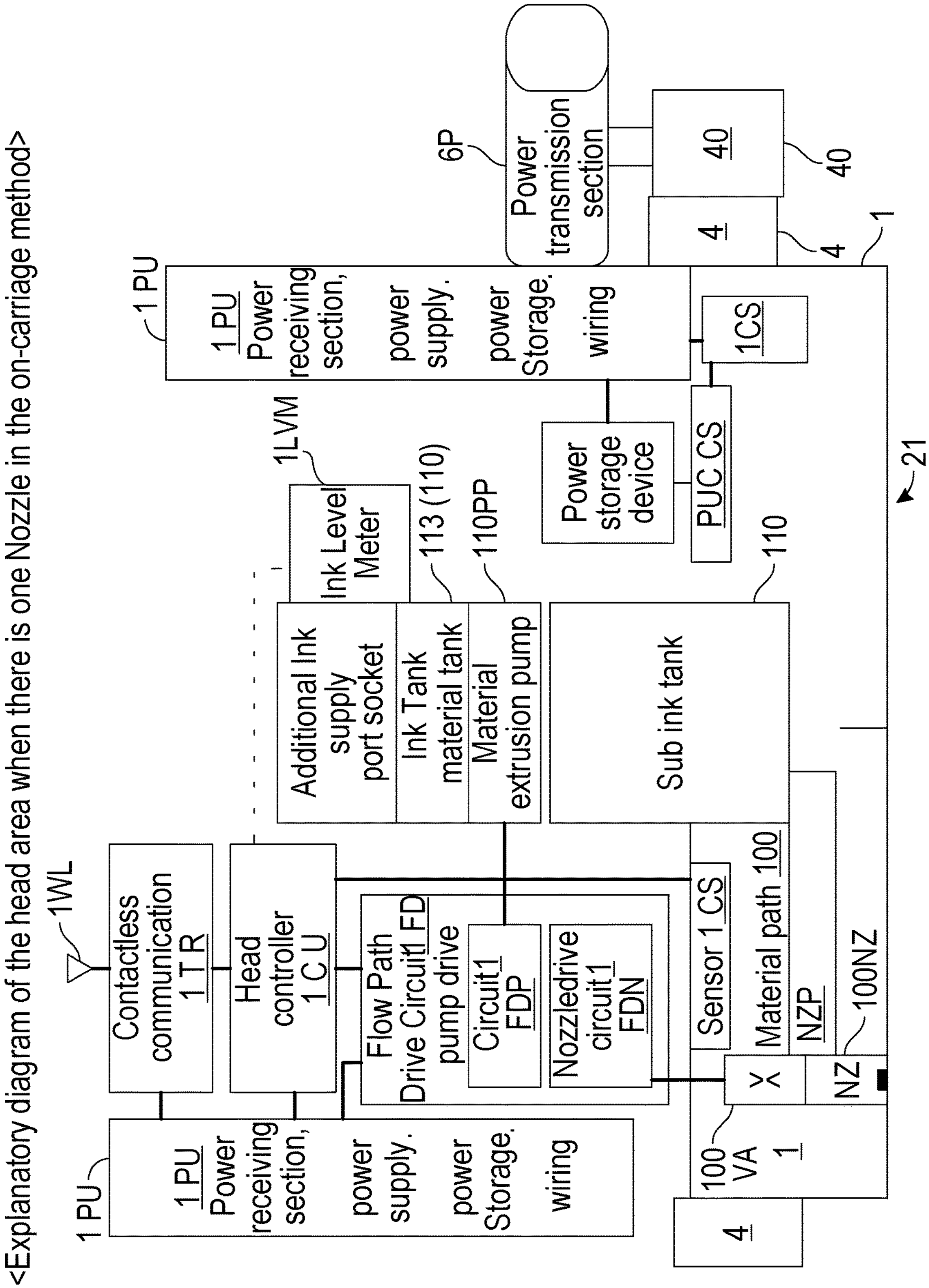
FIG. 5 B A near [a head] explanatory view in case the number of nozzles is one in an on-carriage system.
FIG. 5D is an explanatory diagram when there is one nozzle operating on an oval track-shaped rail in an on-carriage system.

There may be a case where printing is performed by moving the head 1 or the nozzles supported and mounted on the head driving mechanism 4 along a looped track (like a train) without rotating the head 1 having the nozzle rows arranged in the circular shape. As shown in FIGS. 2C and 5D, when a looping track is an oval track, a self-propelled on-carriage head 1 (a line trace type robot with ink jet functions or a robot car with ink jet functions) incorporating a recording head and an ink tank in a rail type loop is provided. A loop body 100 of an on-carriage head 1 is formed by connecting a plurality of units like a train and assembling them to a driving belt and an encoder, and printing can be performed on a recording surface 2 by an ink jet system by moving and scanning the loop body so as to cross the recording surface. Although FIG. 2C is shown as an explanatory diagram using an oval track of an elliptical orbit, when the nozzle is moved along a looped orbit, even if the looped orbit is circular or elliptical, the nozzle can be similarly moved to perform printing. When the nozzle can move on the track, the track is not limited to a track such as a circle or an ellipse as long as the nozzle is looped, and the present invention can be carried out as long as the track has a loop (as a triangle, a quadrangle, a hexagon, or a polygon. There are also trajectories that loop like a figure eight and have intersecting points.

In the case of a self-propelled on-carriage head (inkjet robot), the track may have a retraction path for retracting the head from the recording surface. The head stored in the retreat path may be capped.

In the case of an on-carriage head, the nozzles 10 mounted on the head 1 may be provided with a unique material or ink type. Specifically, cyan, magenta, yellow, and black ink tanks (110C, 110M, 110Y, and 110K) may be mounted on an on-carriage head, and nozzles capable of discharging cyan, magenta, yellow, and black inks may be mounted in combination, so that multicolor printing can be performed by one print head 1. FIG. 1CB is an explanatory view when four color inks of cyan, magenta and yellow blocks are used in the on-carriage system.

In the case of an off-carriage head, means for supplying a plurality of materials or inks may be provided. Specifically, cyan, magenta, yellow, and black inks may be mounted on an on-carriage head, and the heads may be arranged in the order of cyan, magenta, yellow, and black so that multicolor printing can be performed by one print head. FIG. 1BD and FIG. 1BE are explanatory views in the case of the off-carriage system and two color inks.

The head of the present invention is not necessarily a self-propelled on-carriage head. Either an on-carriage head that does not run by itself or an off-carriage head that does not run by itself may be moved by the motor 40 that drives the head on the printer side. The trajectory which can patrol a head may be sufficient as the trajectory which carries out a loop. In the off-carriage head, the print head 1 including the joint 111 capable of supplying various types of ink when the ink is supplied from the ink tank, the flow path (111F1, 111F2) capable of inputting and injecting the ink from the upper portion of the print head, and the like is necessary.

Conditions in Circular Looping Trajectory

As an example of the track which is looped so as to cross the recording surface of the present invention, there is a circle (perfect circle) shown in the above-mentioned FIG. 1A. When there is a nozzle row 100 provided in a circular shape in the outer peripheral portion of the head 1 in a perfect circular head, the nozzle row 100 is considered to be a circle, and when the diameter of the nozzle row 100 is Dh and the width of the recording paper in the main scanning direction is Lm, the relationship between the lengths is Dh>Lm in the present invention. The nozzles are scanned while drawing a loop path along the shape of the circle of the nozzle array 100, and the processing operation and the nozzle cleaning are alternately performed by continuously rotating the head 1 in the main scanning direction.

Print Head Maintenance Mechanism

As a method of cleaning the nozzles of the head 1 and the surface where the head faces the recording surface 2, a known method may be used. Wiping using a rubber blade may be used, or a sponge-like roller may be used for cleaning. As shown in FIG. 1A, the cleaning unit 3 includes a cleaning element 30. Here, the cleaning element 30 is a component such as a rubber blade or a sponge-like roller which is consumed by the cleaning operation of the nozzle. The cleaning method and cleaning elements are in accordance with known methods. Nozzle cleaning is performed by, for example, wiping with a rubber blade in the case of an inkjet nozzle. However, in a nozzle having a larger diameter of a portion to be ejected than that of an inkjet nozzle used for FDM or the like, in addition to wiping of a nozzle ejection portion, a material may be changed and remain in a flow path inside the nozzle to cause nozzle omission. With the nozzle of FDM, the path of the discharge part of a nozzle can poke and clean a flow path with wire etc. through a thin wire, and it may use the cleaning mechanism using the wire in preparation for the case where a discharge part deposits on the cleaning part 3, and material also accumulates or deposits the present invention on a flow path largely, etc. (In a case where the changed accumulation of the molten resin, the gaseous material, or the vapor deposition vapor is discharged from the flow path through the nozzle A material deposited inside the flow path or the nozzle or in the vicinity of the nozzle may be removed by a cleaning element such as a wire. The cleaning unit 3 may include a mechanism for collecting a material or the like discharged as a result of cleaning.

Number and Replacement of Cleaning Unit and Cleaning Element

Two or more cleaning elements 30 may be provided in the cleaning portion 3. As shown in FIGS. 2A and 2AA, two or more cleaning units 3 may be provided in the printer. The cleaning element 30 may be provided with a mechanism to be replaced while the printhead 1 is in operation (a replacement mechanism that allows the element to be withdrawn from under or near the head 1 and replaced by a human or machine). In the case of performing business printing or 3D printing, it is preferable to provide the replacement mechanism when it is desired to periodically replace the cleaning element 30 when operating for a long period of time.

Cleaning Operation Time

The cleaning of the nozzles may be constantly performed when the nozzle row (for example, the nozzle row 100) is circularly main-scanned, or may be performed at a certain interval. Although cleaning of nozzles, such as an ink jet element, may also always be satisfactory with the nozzle of the FDM system which was able to be done by brass and copper in which a possibility of becoming a problem also has the durability by wear of a nozzle surface, etc., and it has a big nozzle diameter, or resin ceramics, In the ink jet nozzle, it may be difficult to continuously clean the surface of the ink jet nozzle by the cleaning element at all times. In this case, according to the intention of the present invention, a certain interval at which the nozzle omission does not occur is determined by actual machine development, and It is also possible to adopt a mode in which the nozzle cleaning element 30 is moved up and down at the above-described interval, is pressed against a part of the nozzle rows 100 of the head 1 for a certain interval time, and is subjected to main scanning to clean all of the nozzle rows 100.

Notes

Nozzles are provided in the circumferential direction of a circular head 1 and are cleaned by a cleaning part 3, but the central part of the head 1 is not cleaned by the cleaning part 3 because there are no nozzles. However, there is a possibility that a misty ink or the like adheres to the central portion of the head 1 during a long operation. When the ink of mist shape occurs near the center of the head 1, it may have an antistatic mechanism and a trap mechanism recoverable at the time of the scheduled maintenance which absorbs mist and does not have a print job.

Material Discharge and Observation in Cleaning Portion

In addition to the nozzle cleaning by the cleaning unit 3, the ink may be discharged from the nozzle by the cleaning unit 3 so that the ink in the nozzle can be always kept the same as the ink in the ink tank. For example, since the ink in the nozzle may change due to precipitation or drying of the material during printing, a discharge operation for discarding a small amount of ink may be performed in a preventive manner during the printing operation. Known methods corresponding to material precipitation, drying, etc. of the ink may be used. The state of the discharged ink may be observed by a nozzle observation camera provided in the cleaning unit 3 to observe the state of nozzle missing or ink flying.

CAP

When the print head 1 is not used for a long period of time, it is necessary to cap the nozzles of the head. The present invention caps the mounted portion of the head. Preferably, a sealing mechanism is provided in the printer housing including the head or head portion. In a known method, even when printing is not performed and a capped state or a long-term stop is expected, the printer may perform ink ejection or cleaning in an unmanned manner under the control of the controller.

The cleaning part 3 of the head may be provided with a camera for observing the ink discharge state of the head.

In order to check the ink discharge state of the head, an image sensor may be provided in the ink jet head 1 to operate as a camera, and a printing state as a two dimensional printer or a forming state of a three dimensional printer may be photographed. The printed matter fed from the recording surface 2 in the sub-scanning direction after printing and processing may be photographed by a camera. The camera may be used to confirming the completion of the printed matter when replacing the head element of the head.

Medium Supply/Conveyance/Discharge Mechanism

In a two dimensional printing application, a carriage including the recording head of the present invention always rotates in one direction, and when the rotation direction is set as a main scanning direction, a medium is transported in a sub-scanning direction. For conveyance, a known conveyance method (roller, belt, drum) is used. In an inkjet printer system using a known recording sheet, a recording sheet of A4 size or the like may be conveyed as a medium through a straight path or a U-turn path. Rolled media found in ink jet form printing machines may also be used.

The printer including the head 1 may include a camera in order to check the print content or quality of the print surface when the printed medium is discharged.

The medium may be a weather-resistant film used for a signboard or a fiber such as cloth. Printing may be performed on known materials such as a base material of a semiconductor component, a metal, a silicon substrate, a crystal substrate, a ceramic substrate, a glass substrate, wood, and a surface of a food, and a known transport method and media may be used.

In the 3D printer, when powder of a material is adhered and cured by ink to be three dimensionally laminated, powder serving as a medium may be supplied by a known method and leveled by a roller or the like to be laminated. When an ultraviolet curable ink is used in the 3D printer, the print head 1 may be provided with an ultraviolet source (an ultraviolet LED or an ultraviolet laser is preferably used, but a lamp that emits ultraviolet rays may also be used) for ultraviolet curing (of the output).

Figure 3A:
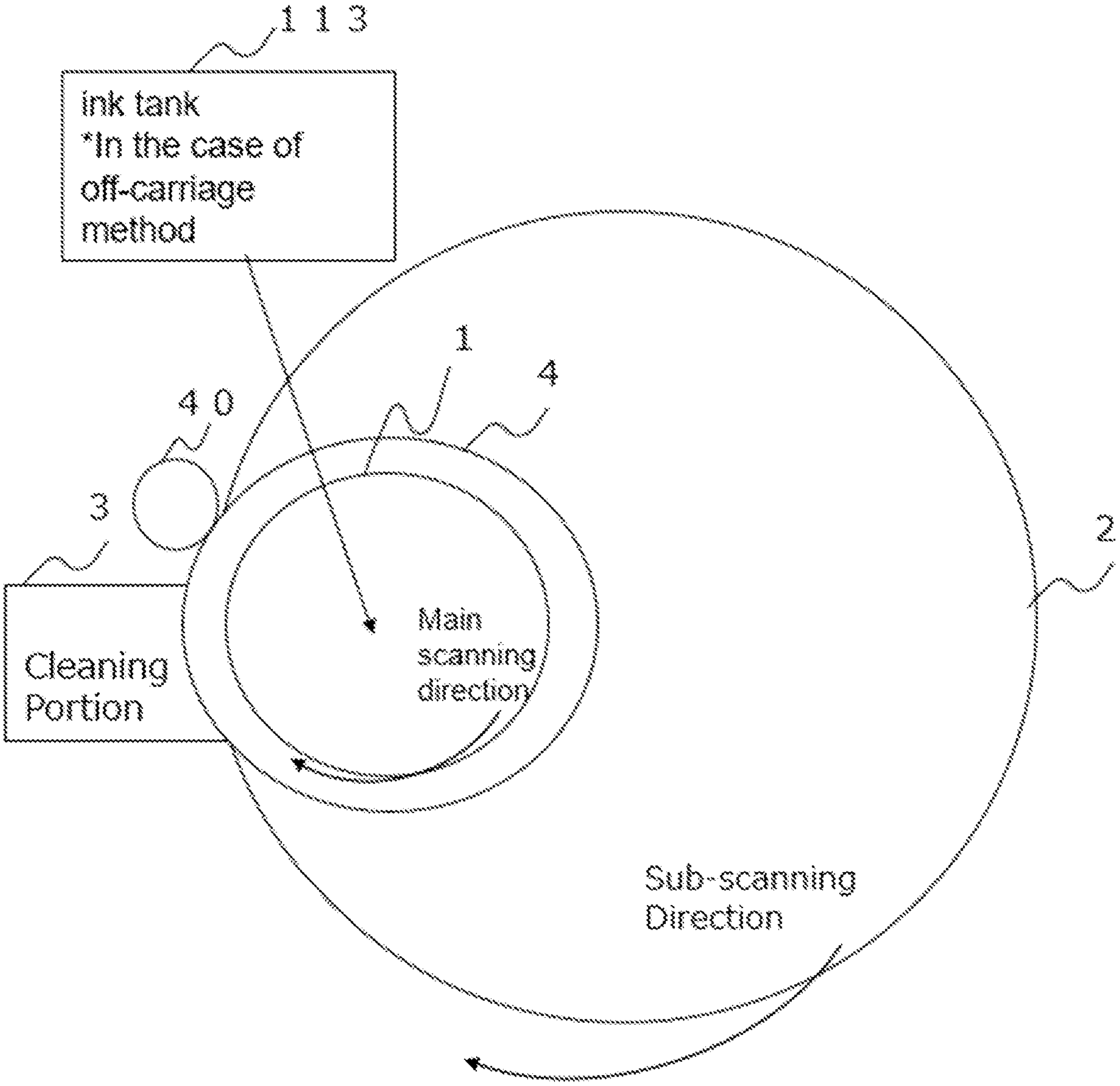
FIG. 3A is an explanatory view (plan view) when a turntable type recording surface 2 is used in a three dimensional printer.
Figure 3B:
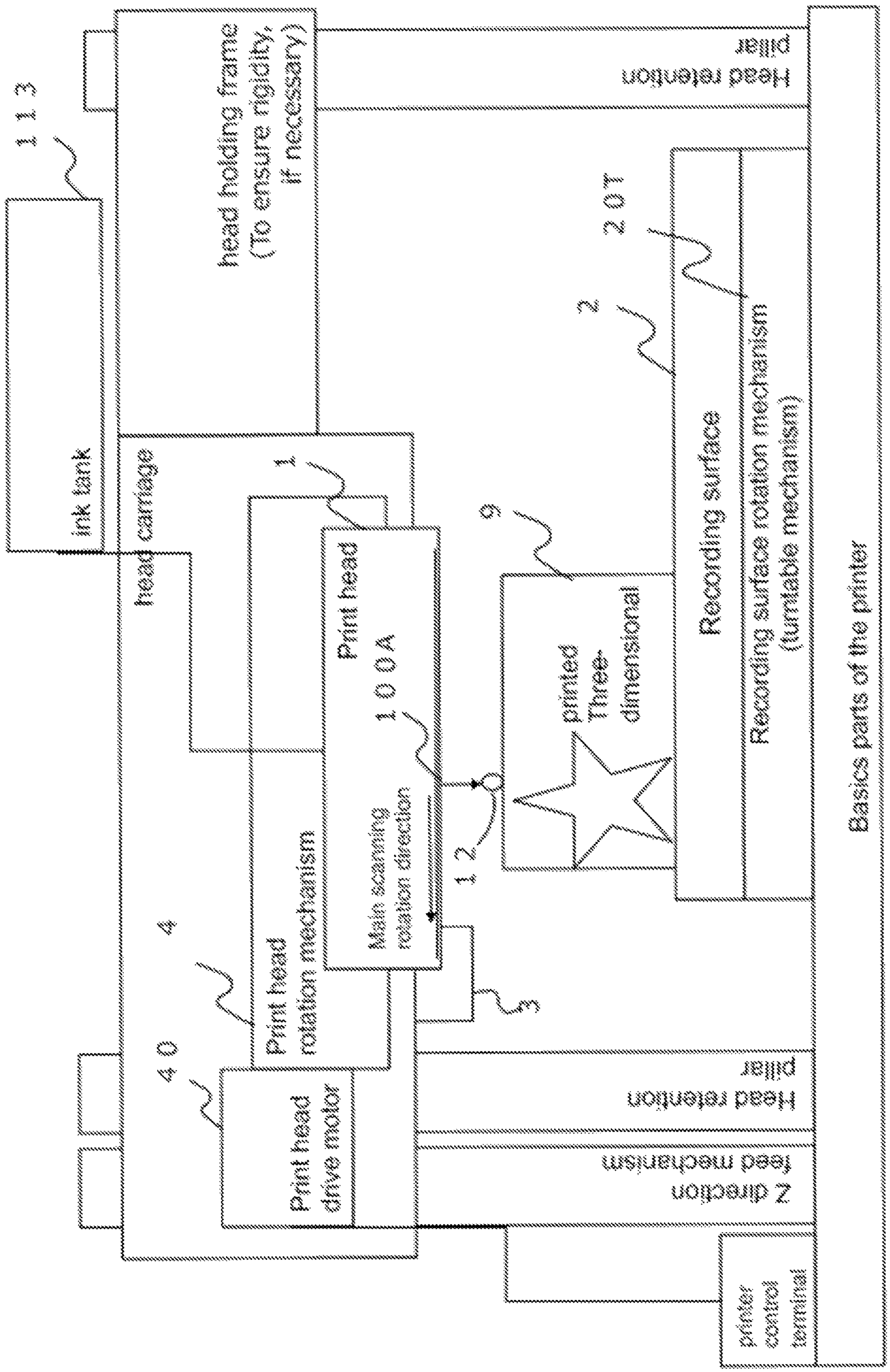
FIG. 3B is an explanatory view (printer front view) of an inkjet type three dimensional printer.
Figure 3C:
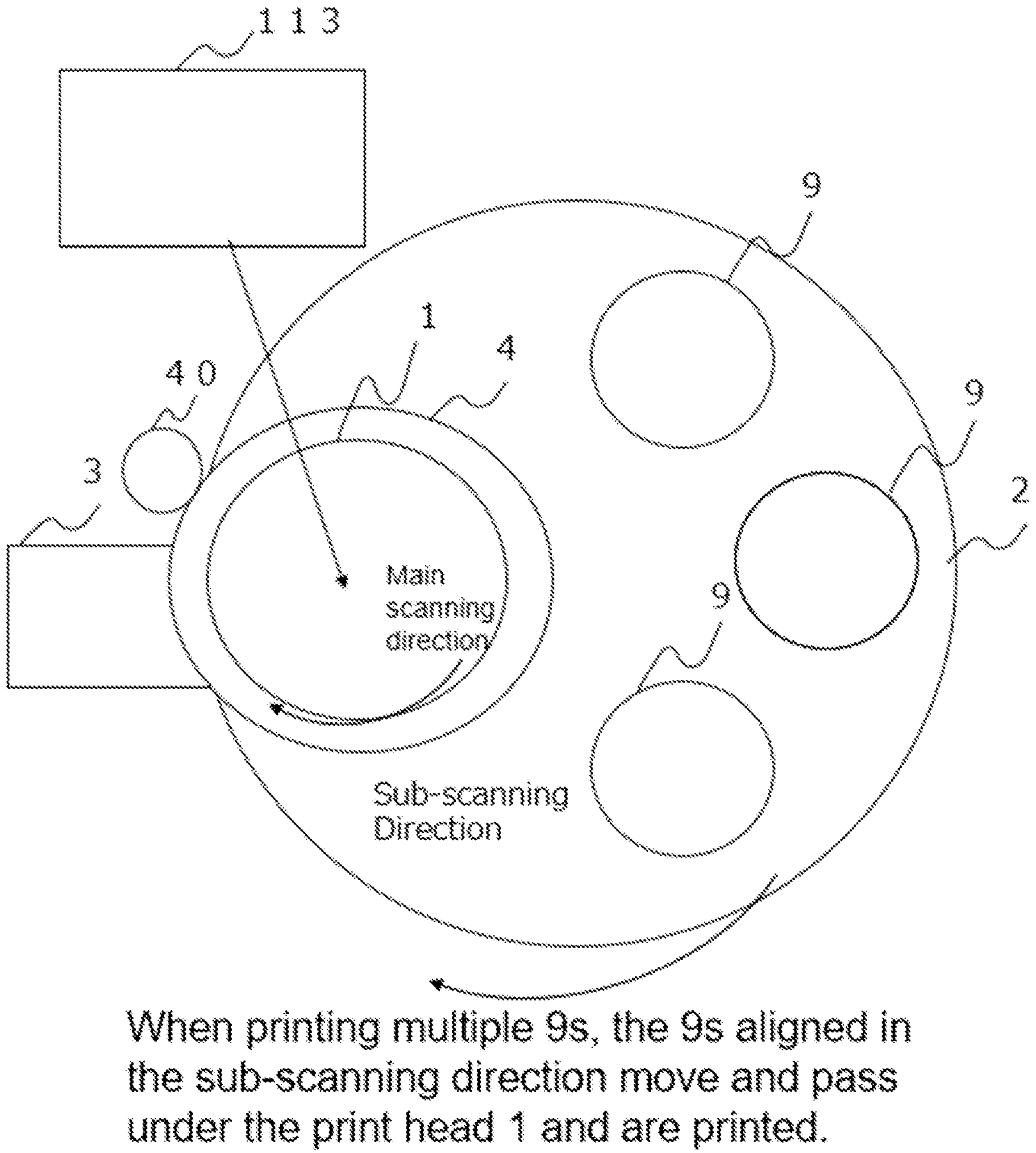
FIG. 3 C The explanatory view which is attached two or more pages and modeled on a turntable with a three-dimensional printer.
FIG. 3D is an explanatory view (printer front view) of a three dimensional printer in the FDM system.
FIG. 3E is an explanatory view (printer front view) when used as a two dimensional printer.
FIG. 3F is an explanatory diagram of a case where two single-color print heads of different materials are provided and 3D printing is performed (an explanatory diagram of a case where a plurality of single-color heads are provided on a recording surface and 3D printing is performed on a plurality of types of materials).
Figure 3D:
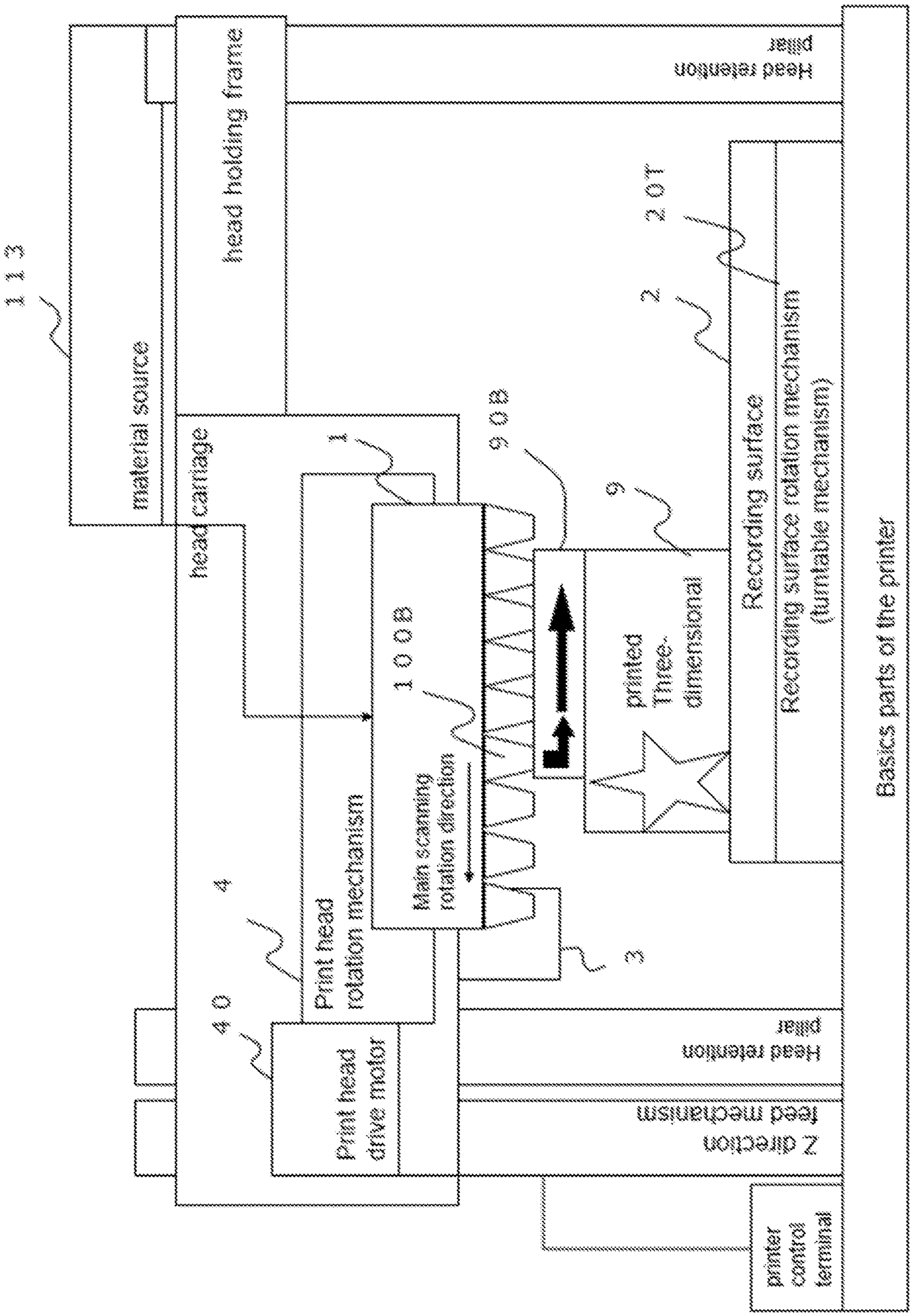

The present invention may be used in the manufacture of displays, ink jet devices, electronic components, and semiconductor devices in the field of printed electronics, and may transport substrates such as flat glass or films, electronic circuit boards, and silicon wafers, which are base materials of the electronic products. The ink may contain genetic information substances or biological materials and be used to output three dimensional objects by 3D printing or to produce foods, pharmaceuticals, biological tissues, artificial bones, or artificial teeth. In the printer of FIG. 3B, the liquid material applied to the recording surface 2 by the print head 1 may be formed into a film by a spin coating method in which the turntable type recording surface 2 is rotated at a high speed like a spin coater. It may use for film formation of the resist of semiconductor manufacture, an inorganic thin film, and an organic thin film.

Conveyance Method and Forming Method of Forming Stage 2 in 3D Printer

In order to improve the forming speed at the time of forming by the 3D printer, it is necessary to increase the printing speed of the print head and also increase the speed of the conveyance mechanism of the forming stage 2 (forming bed 2). In the 3D printer system, in the FDM system, the laminated film thickness after one scanning is on the order of 100 micrometers. In an inkjet system, one layer is micrometer order more than ten, and although lamination thickness of an inkjet system is more thinly [than a FDM system] highly minute, there are the characteristics to which scanning frequency and the number of times of lamination are needed for making the solid of target height rather than a FDM system. In the present invention, a circular turntable type print head 1 can be used in order to realize that the print head crosses the printing surface, and the turntable type shaping stage 2 can also be used as the recording surface 2 in the shaping stage 2 (see FIG. 2B, FIG. 3B, FIG. 3C, and FIG. 3D). The purpose of using the turntable-type recording surface is to rotate the recording surface in one sub-scanning rotation direction and to perform ink deposition and modeling without intermittence (without a break). 3B of FIG. 1 shows the arrangement of a circular turntable type print head 1 and a turntable type shaping stage 2. The turntable-type modeling stage 2 may also be positioned and controlled by an encoder in the same manner as the turntable-type print head 1. When a full-scale model, an automobile, a part thereof, or a house-related member is molded, a turntable for an automobile can be used in the printer 8 (3B in FIG. 1) together with the print head 1 of the present invention as the molding stage 2 and the medium transport mechanism. (In 3D printing of an ultraviolet curable type or an adhesive type, the shaping of the present invention is performed within a range of a speed at which the ink is fixed.) The turntable-type modeling stage 2 may be provided with a motion sensor such as an acceleration sensor in the circumferential direction of the recording surface 2 in the same manner as the turntable-type print head 1, and the inclination of the recording surface of the modeling stage may be detected and informed to a person. In the FDM method, the inclination of the modeling stage may cause an initial printing error at the time of 3D printing (which may be avoided by modeling a raft for absorbing shrinkage at the beginning of 3D printing, but Since the 3D printer is required on the assumption that the stage is horizontal or the like in the initial state, the printer including the head and the stage of the present invention may also include means for detecting the inclination of the head 1 and the stage 2 and informing the user of whether or not there is a problem in 3D printing.

Controller

Figure 4A:
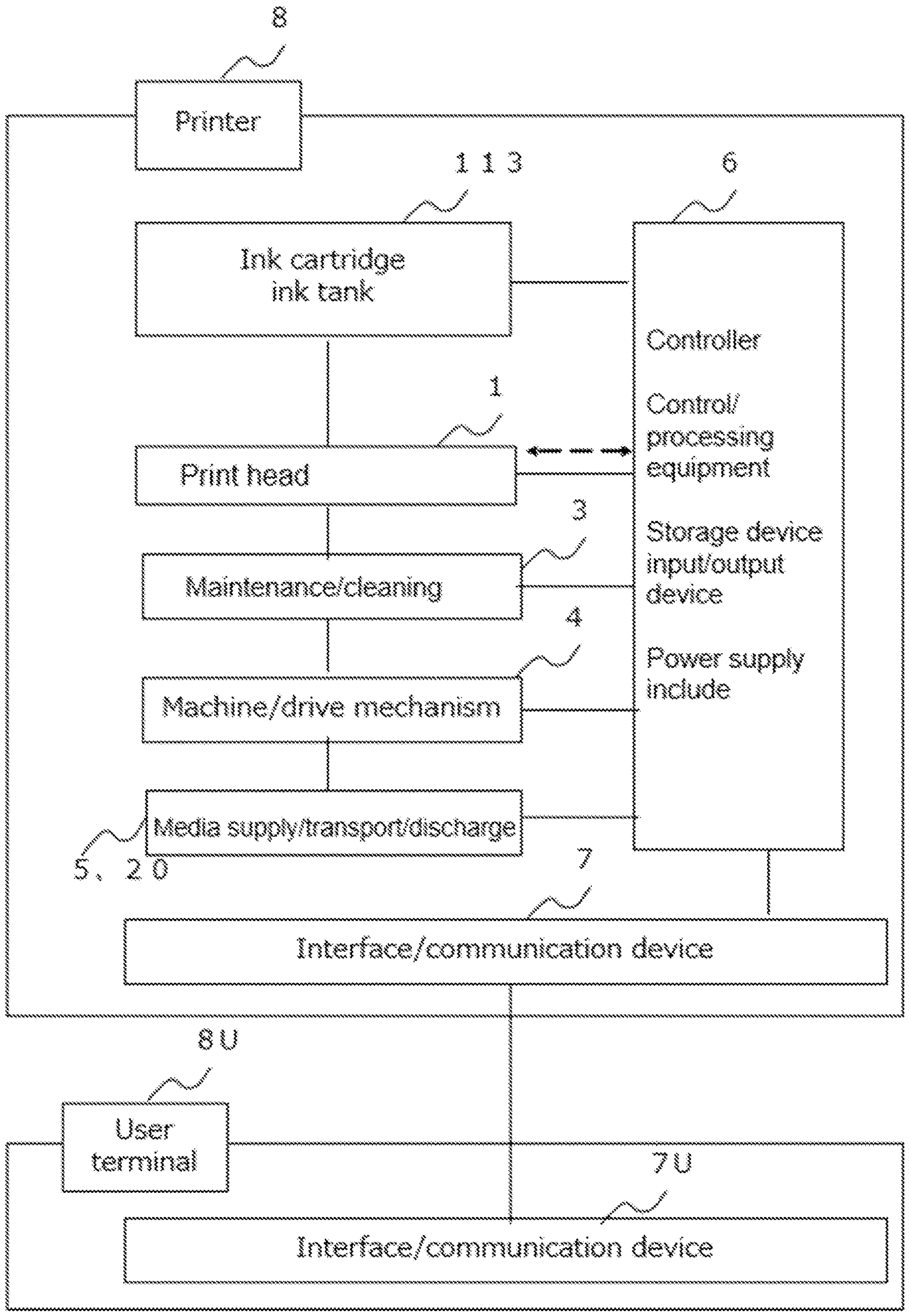
FIG. 4A The composition explanatory view of a printer [FIG. 4B] Explanatory diagrams of printers and printer user terminals.
Figure 4B:
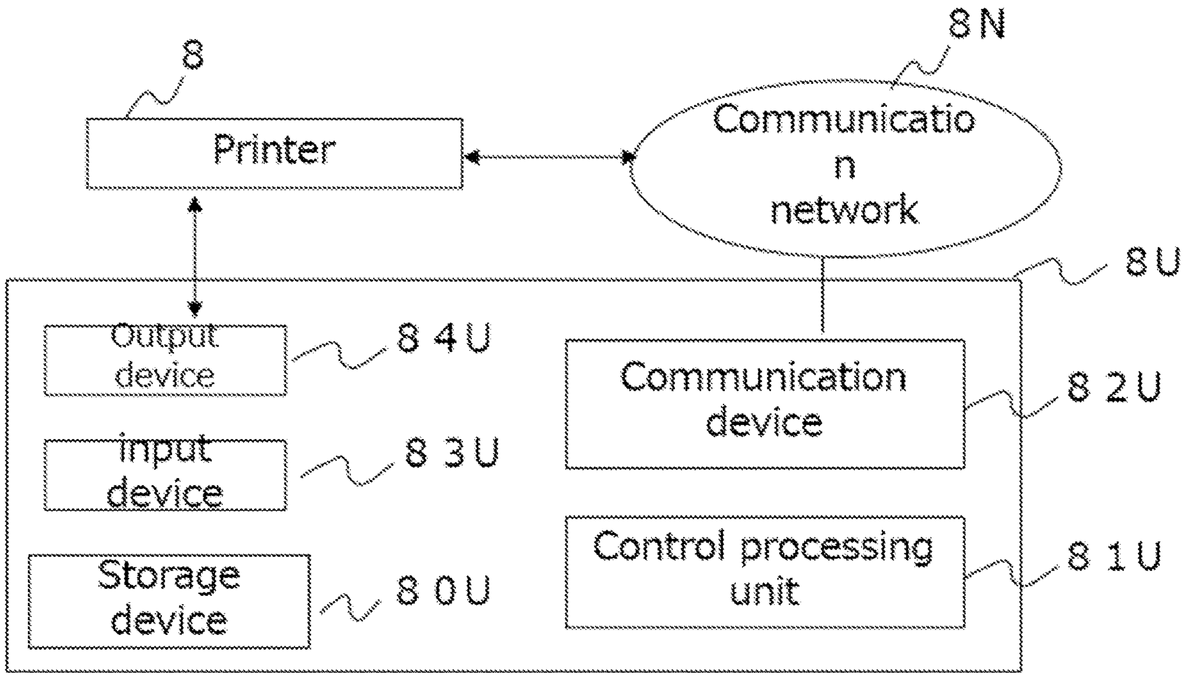

FIG. 4A is a block diagram of the printer. Depending on the amount of data of an image to be processed, a control arithmetic device having a high processing speed, a large-capacity and high-speed memory, and a high-speed communication path are required. As a method of transmitting a signal at the time of printing from the printer to the print head, a wireless communication method or a non-contact communication method may be used. As mentioned above, lamination thickness of an inkjet system is thinner than a FDM system, and since resolution becomes high, the amount of image data also increases (also see FIG. 5 A, FIG. 5 B, and the FIG. 5 C). The ink drop number and dot number of an ink jet which should be discharged according to the amount of image data also increase. The printer is caused to perform printing in accordance with an instruction from the user device via the communication device 7U, the network 82U, or the outputting device 8N of the user device 84U inside or outside the printer. (The user terminals 8U may be computer terminals, smartphones, or the like, or may be servers for print services.)

The printer 8 may have a plurality of controllers. Each of the print head 1 and the printer body may be provided with a controller. The signal of the motion sensor 1CS incorporated in the print head 1 may be processed by a head controller 1CU incorporated in the print head 1 and transmitted to the controller 6 of the printer main body via a communication device. As a five large device of a computer, the controller has calculation, control processing unit 81U, storage device 80U, and input device 83U/output device 84U (including a communication device 82U) functions, and includes a power supply and a power storage device.

Interface and Communication Path

In the case of transmission from the user terminals 8U (user computers) to the head 1 via the printer controller 6, the print data transmission method from 8U to 6 may be either wired or wireless. An interface 7 provided in 6 may be used. The printer 8 may be provided with a console 6IOC which is manually input by the user, displays the state of the printer, and generates a warning sound at the time of operation. Preferably, the user terminal and the printer terminal may include a non-contact communication unit.

Communication Between Head and Printer

Figure 5C:
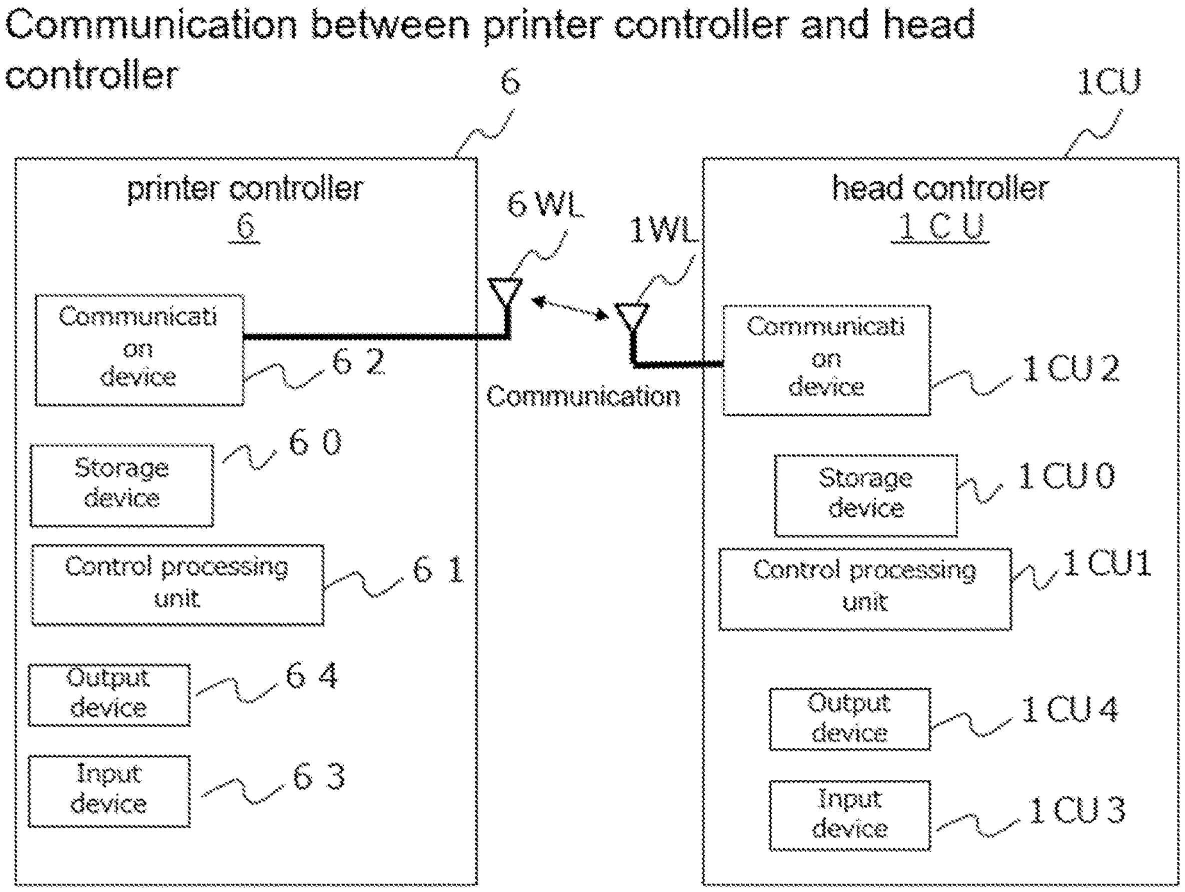
Figure 5D:
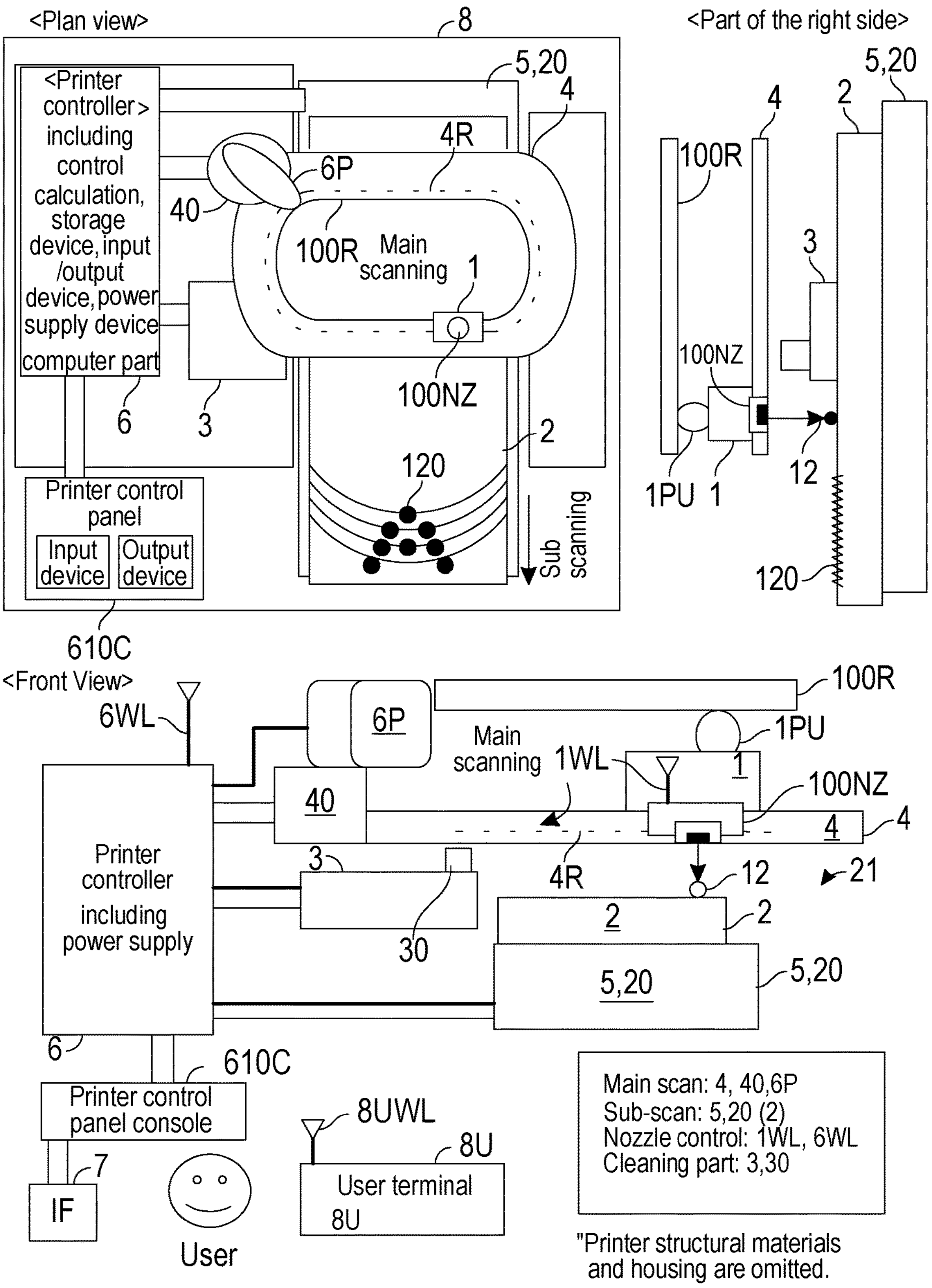

As shown in FIG. 5C, wireless data transmission is preferably used between the printer controller 6 built in the printer main body and the head controller 1CU of the head 1 which is looped and rotated across the recording surface 2. The radio wave band to be used can be a known radio technology. Concretely, 2.4 Ghz Zone, 5 Ghz Zone or 60 Ghz Zone can be used. When it is high frequency, the data volume which the bands which can be used although it is increase in number, and can be transmitted increases, and a possibility that radio may be interrupted is useful for printing of shaping material with high resolution or wide volume. (As the frequency of the electromagnetic wave is increased, the electromagnetic wave gradually approaches from radio waves to visible light from infrared rays. In the present invention, non-contact communication may include wireless communication by radio waves and optical communication by non-contact transmission and reception of light by infrared rays or visible light.)

The Reason with preferable using radio for the print-data transmission system to the head 1 by the present invention is that it will be necessary to use a signal *** collector ring etc. in a contact process in the case of a cable. On the other hand, in the case of wireless communication, non-contact communication can be performed between the printer and the print head even without a slip ring. (The present invention can be carried out even if it is not a noncontact method, when it is inexpensive and there is a means which transmits a signal to rotating bodies, such as a collector ring with high-reliability and durability.) Communication which used the photon other than radio may be performed, Specifically, it is sufficient that information can be transmitted and received in a non-contact manner between the head and the printer (between the head controller and the printer controller) by using a light-emitting diode or a laser of ultraviolet light, the above-described visible light, or infrared light and a photodetector.

The head 1 may receive power from the printer 8 (printer controller 6). Alternatively, the head 1 may include a power supply and a power storage device 1PUC such as a cell or a capacitor, and may receive power supply from the printer store the power in the cell or the capacitor to consume the power for information process, control, and printing process. It is preferable that the head 1 of the present invention includes a power storage device (1PUC). It is necessary to operate a logical circuit and drive circuits, such as a temperature-control circuit, and a shift register, etc. which move an ink jet element and an element to the head 1, and to perform communication between the print head 1 and a printer (between the printer controllers 6), a data storage, etc. Therefore, in order to stably perform the operation of the head 1 even when the power supply is temporarily stopped, a power storage circuit 1PUC may be provided which is capable of charging and storing power using a secondary battery or storing power in a capacitor. The power storage device 1PUC has a function of smoothing power supply. The head 1 may be provided with a motor 40, and the motor 40 may be driven by the power storage device 1PUC. When power is supplied to the head 1, a power line may be provided in a track that loops across the recording surface 2 and rotates to supply the power. The head 1 may be supplied with power and charged in a contact manner. (For example, in FIG. 5D, the head is regarded as a train, and the 100R is regarded as an overhead line and a track. A 4R is regarded as a belt-type driving mechanism for towing a train, and a state in which power is supplied from an overhead line and driving is performed is described.) A device that performs non-contact power supply (non-contact charging) between the head 1 and the printer controller may be provided to perform power supply. The head 1 may be provided with a power storage device 1PUC such as a secondary cell or a capacitor, and the print head support and drive mechanism 4 that drives the head 1 may be provided with the power storage device SL. The head 1 may include calculation, control, storage, and input/output devices which are five large devices of a computer, store print image data in a storage device such as a RAM or a ROM by non-contact communication to accumulate the data, read the data at the time of printing, and perform ejection according to the data. Since the head 1 performs non-contact communication, it is preferable that printing can be performed in accordance with data stored in a storage device even when communication cannot be performed due to a communication failure or an instantaneous failure of a device in some cases. It is preferable that the head 1 is provided with a power storage device also from the viewpoint of data processing and recording. In addition to the power storage device 1PUC, print date to be printed may be received and stored in advance in the storage device 1CU0 of the print head 1 through communication.

Conveyance Mechanism of Head and Carriage

When the head 1 moves on a track which is looped and rotated across the recording surface 2, a motor 40 for moving on the track may be provided in the head 1. A trajectory or a head housing may be moved with the transmitting power element of gear Bert Chan moved by the motor 40 with which the printer was equipped, or 40, and movement, rotation, and a loop may carry out the head 1 with the driving device 4. The track may be a rail, a pipe, a mechanical element for transmission such as a chain or a belt, or a head drive mechanism (the print head support mechanism and the drive mechanism 4, and the print head rotation mechanism 4). In the present invention, there are a case where the print head 1 is rotated in a circle by using the mechanism 4 (a case where the head supporting the nozzles is moved without moving the nozzles) and a case where the nozzles arranged in an oval or elliptical shape of the print head 1 are moved in an orbit direction by using the mechanism 4 (a case where the head is fixed and the nozzles in the head are circulated and moved). The looped and rotating track is a ring or annular track in which a certain nozzle of the head 1 passes through the recording surface 2 and the head cleaning unit 3 from a start point and returns to the start point again.

Control Circuit

The controller 6 that performs control may have a wired or wireless communication device as a communication device. The controller 6 includes means for communicating with the print head 1 and the user terminals 8U. The print head 1 may receive the print image from the controller 6 by wireless communication. It may be received in a wired manner. The present invention preferably provides contactless communication.

Printing by Multiple Heads

Printing may be performed by arranging a plurality of print heads 1 for discharging a material from a nozzle while drawing a track which loops across a recording surface used in the present invention and rotates. Specifically, when color printing using four color inks is performed, four print heads 1 corresponding to four colors of cyan, magenta, yellow, and black may be arranged in the conveyance direction (sub-scanning direction) of the recording paper 2 and used for printing. As shown in FIG. 1BE, a plurality of colors of ink may be mounted on the print head 1 and color printing may be performed by one print head, or color printing may be performed by using four colors of the monochrome print head 1 shown in FIG. 1BB or 1CA. The head of the present invention may be used in combination with other manufacturing processes to produce printed and processed products. In addition to two dimensional printing, when the recording surface 2 is of a turntable type in a 3D printer, for example, as shown in FIG. 3F, one head 1 may perform 3D printing with a resinous material (main material) and the other head 1 may perform well printing with an easily removable support material (sub-material).

Safeguard

Since the head used in the present invention can use a high torque motor 40 and move in a rotating orbit that loops across the recording surface, it is particularly desirable to provide a safety device to prevent the user from being caught in the rotating printer. In order to prevent a person from being caught in the print head 1, it is particularly preferable to prevent the person from being caught in the machine by, for example, wrapping the operating print head portion in a housing. The print head unit 1 may be provided with a computer, an accelerometer, and a motion sensor 1CS, and these sensors can be used to measure the horizontal position of the head and to detect an external force when the head comes into contact with an external object such as a medium on a recording surface or a human.

Example 1

1A to 1E are illustrations of a print head that describes an orbit that loops and rotates across a recording surface. FIG. 2A to FIG. 2B are diagrams showing the rotation direction of the head and the landing of ink when the print head is driven. (About the figure, the premise of speed which is made small and which can be disregarded describes a centrifugal force.) FIG. 3 A to FIG. 3 D is a turntable type print head of a round form, and an explanatory view of 3D printer which used that of the stage for turntable type modeling.

As shown in FIG. 1AA, the nozzle arrays 100 (nozzle arrays 100A) of the print head 1 are arranged in a circular shape. Printing is performed at a position from 100A1 to 100A3 by moving so as to cross a recording surface 2 from an origin 100A2, a nozzle of a printing head is cleaned by a cleaning part 3 at a 100A4 point after crossing the recording surface 2, and a loop orbit is formed so as to pass through a point from 100A5 to 100A6 and return to the origin 100A1. Moving again from the origin 100A1 so as to cross between 100A2 and 100A3 on the recording surface 2 to perform printing; When the print head passes through the 100A4 point after crossing the recording surface 2, the nozzle of the print head is cleaned by the cleaning part 3 and returns to the origin 100A5,100A6 point through the 100A1, which is repeated to perform printing.

Installation Location of Cleaning Unit 3

As described in other paragraphs, the cleaning unit 3 may be provided in the vicinity of the 100A1 in addition to the 100A4. Since the 100A4 and the 100A1 are outside the recording surface and on a circular orbit, the cleaning unit 3 can be installed.

Portion where Main Scanning for Printing or Processing is Performed

As shown in FIG. 1AA, the nozzle of the head 1 is moved so as to cross between 100A2 and 100A3 on the recording surface 2 to perform printing and processing, and nozzle cleaning is performed when the nozzle passes through the cleaning unit 3. In addition, it is possible to perform printing and processing by moving so as to cross between 100A5 and 100A6 on the recording surface 2. Further, after printing and processing are performed between 100A5 and 100A6, the recording surface can be fed in the sub-scanning direction and moved to cross between 100A2 and 100A3 to perform printing and processing. By using two nozzle rows (two circular arcs) between 100A2 and 100A3 and between 100A5 and 100A6 for printing and processing, the number of carriage scans Cr can be reduced and the printing speed can be doubled. Although the print head 1 having a circular shape has been described with reference to FIG. 1AA, even when the trajectory of the movement of the nozzle is a circular shape, an oval shape, an elliptical shape, or an oval track shape, the following effects can be obtained. When the nozzles move on the recording surface 2, the number of carriage scans Cr can be reduced and the printing speed can be doubled by using two nozzle rows in such a manner that printing is performed when a forward path portion moving in the positive direction of the main scanning direction and a backward path portion moving in the opposite direction pass on the recording surface. In the present invention, as shown in FIG. 1AA, or two upper and lower nozzle rows as described above can be used (at least two or more nozzle rows can be used over two circular arcs).

Example 2

Figure 3E:
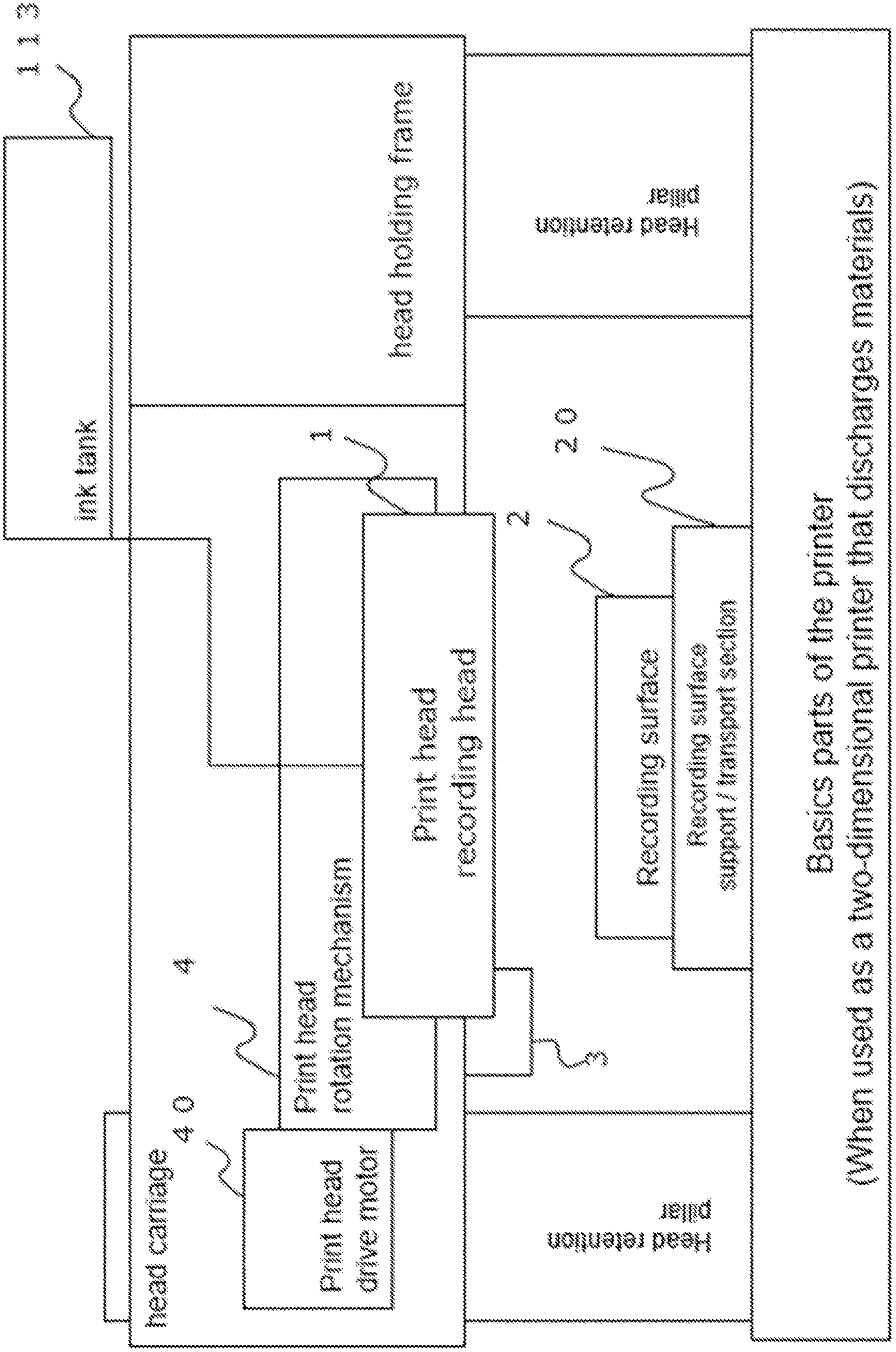
Figure 3F:
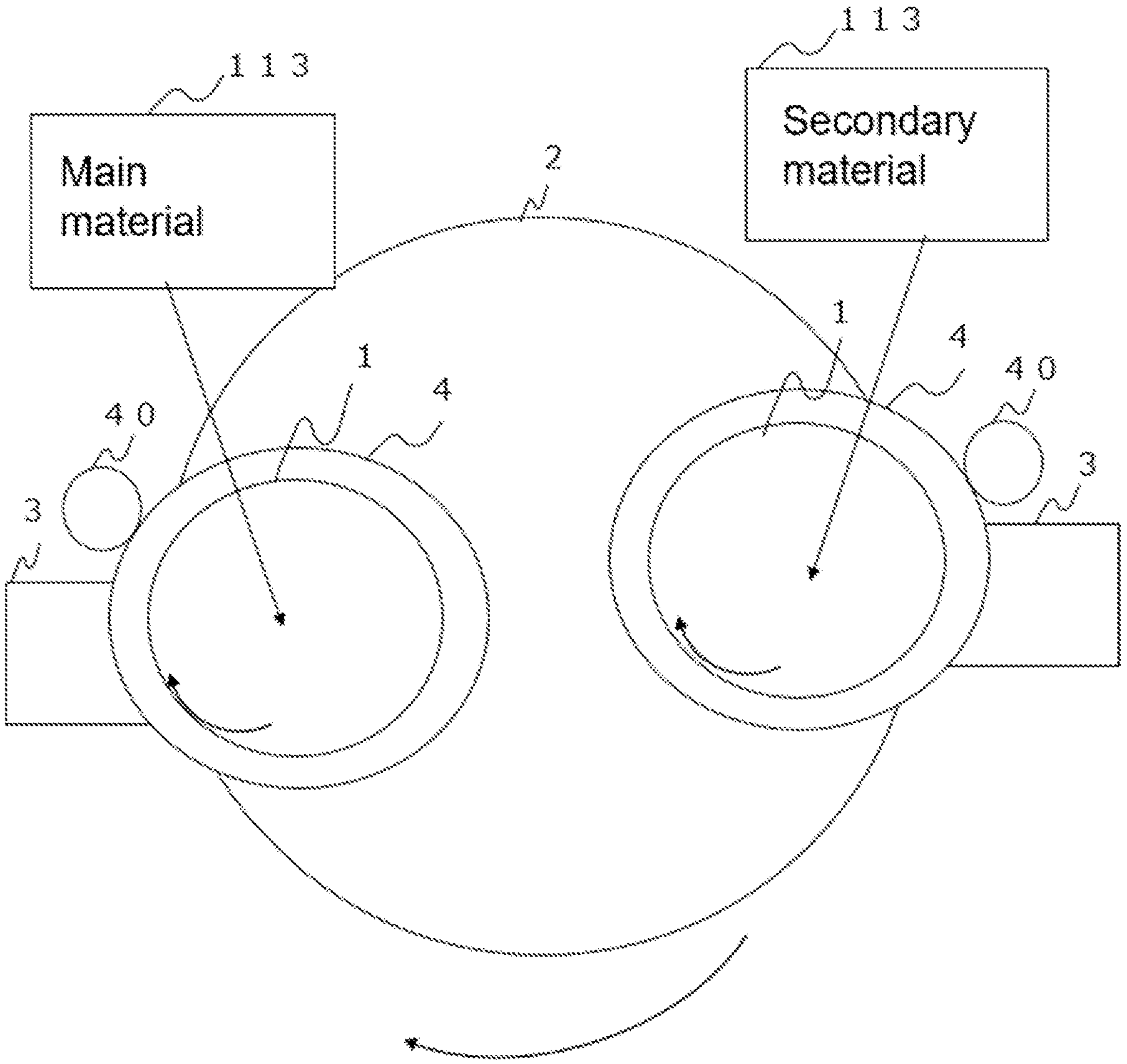

FIGS. 3B and 3E are illustrative examples of printers for three dimensional and two dimensional printing applications, respectively. FIG. 3B is an example of a 3D printer application, and FIG. 3E is an example of a two dimensional printing application. The printer shown in FIG. 3E has a structure similar to that of a portal machining center, and a Z-axis scanning mechanism may be added to the printer shown in FIG. 3E for use as a 3D printer. The printer of the description to FIG. 3 E puts printing objects, such as paper, a film, a substrate, and an object, on a recording surface, sends out a printing object to a vertical scanning direction, and prints by making the surface of a printing object into the recording surface 2. The above description is an example, and there is no problem even if the printer itself moves in the sub-scanning direction along two or more rails with wheels like a portal car washing machine or a train, and performs printing on a region portion corresponding to the recording surface 2 interposed between the rails (mechanism for sub-scanning).

A roller is attached to an on-carriage type head on which a printing head 1 and an ink tank are mounted, and a bar code or an image can be printed by tracing with a human hand, as in a handy ink jet printer, in relation to the explanation of a portal type car washing machine in 3E. The printer of the present invention may be provided with wheels or rollers on the head-holding support in the 3E of the drawing, so that printing can be performed only by passing the printer through the surfaces of outdoor and indoor objects, excluding the base portion. In the printer, a wheel or a roller is provided on a head holding support in the FIG. 3E, and a base part is eliminated. The printer may be a two dimensional printer capable of printing or printing only by passing through a surface to which a material is to be discharged, and the printer may be similar to a line car (line drawing) on which line powder of a sports field such as an athletic field is mounted, and include an ink cartridge, the print head of the present invention, a drive mechanism for main scanning of the head A wheel such as a line car may be attached to a housing in which the cleaning unit, the motion sensor unit, and the recording surface imaging sensor before and after printing are housed, and a person may simply pull a line to perform printing while cleaning the ink jet head.

In FIGS. 3B and 3E, the head 1 is horizontal with respect to the recording surface 2 and the ground. However, there may be a case where the head 1 and the recording surface 2 (recording portion 2) are perpendicular to the ground for the purpose of space saving or the like. In space, it is assumed that there is no gravity, but on the ground, gravity is applied to an object having a mass on the ground toward the center of the earth. Gravity affects the ink, materials, printer mechanics, structural materials, and drive mechanisms. In the case of the printer for two dimensional use in FIG. 3E, the nozzle surface of the head 1 may not be horizontal to the ground. In a printing machine for two dimensional use in which the nozzle surface of the head 1 is perpendicular to the ground, space saving can be expected. In the case of the three dimensional printer shown in FIGS. 3B and 3C, when a turntable type recording surface 2 (recording bed) on which a heavy object such as an automobile part or an automobile body is placed and rotated is used, it is preferable that the nozzle surface of the head 1 is horizontal to the recording surface and the ground. For the shaping, a method of a known three dimensional printer, use of a support material or a holding structure, a rolling roller for lamination, or the like may be used. (In a case where the recording surface 2 is vertical for use in a three dimensional printer, a holding structure by a chuck device, a support material, or a raft may be required on the recording surface 2 in order to vertically hold a heavy object being shaped on the recording surface 2 while receiving gravity on the ground.)

Example 3

FIG. 1AC, FIG. 5A, FIG. 5B, FIG. 5C, and FIG. 5D are examples of a printer or an outputting apparatus which satisfies the method of the present invention and uses the method, and are one of the simplest configurations, in which only one nozzle is mounted on the print head 1 The nozzle scans along a circular or other looped trajectory that traverses the recording surface and passes through the cleaning unit 3, and a solenoid valve is used as an actuator to discharge ink that has been pressure-fed by a pump. Note that FIG. 5A is an example, and when a solenoid valve is not used in FIG. 5A, the ink tank is kept at a negative pressure, and an actuating device 100VA such as a piezo-actuator or a heating device is used. Ink is transported from the ink tank to the sub-ink tank by a pump, and ink droplets are ejected from the nozzles by a known inkjet method. When the nozzle 100NZ is an inkjet type, the apparatus is used for printing, and when the nozzle 100NZ discharges a paste-like material extruded by an extrusion pump 110PP, the apparatus is an AM type or FDM type 3D printer or coating apparatus. (Note) The reason why the solenoid valve is shown as an example of the actuators 100VA is that the inkjet head elements 10 provided with a plurality of nozzles when used for trial production are expensive and difficult to purchase for personal use. On the other hand, in the present invention, a solenoid valve pressurized by a pump or a diaphragm-type piezo-actuator plate is used to eject ink because it is inexpensive and can be prototyped by the inventor while understanding 100NZ and 100VA. For a prototype, a diaphragm-type piezoactuator used in an electronic buzzer or the like can also be used as a test for the purpose of forming a 100VA and a 100NZ of a single nozzle. Originally, it is preferable to use the head element 10 (print head element) having a high driving frequency f and a large number of nozzles Nz. As described in the other paragraphs, since it is only necessary to provide one or more nozzles necessary for realizing the present invention, the method and apparatus can be carried out even by a head of a single nozzle such as a solenoid valve.

Example 4

Figure 5E:
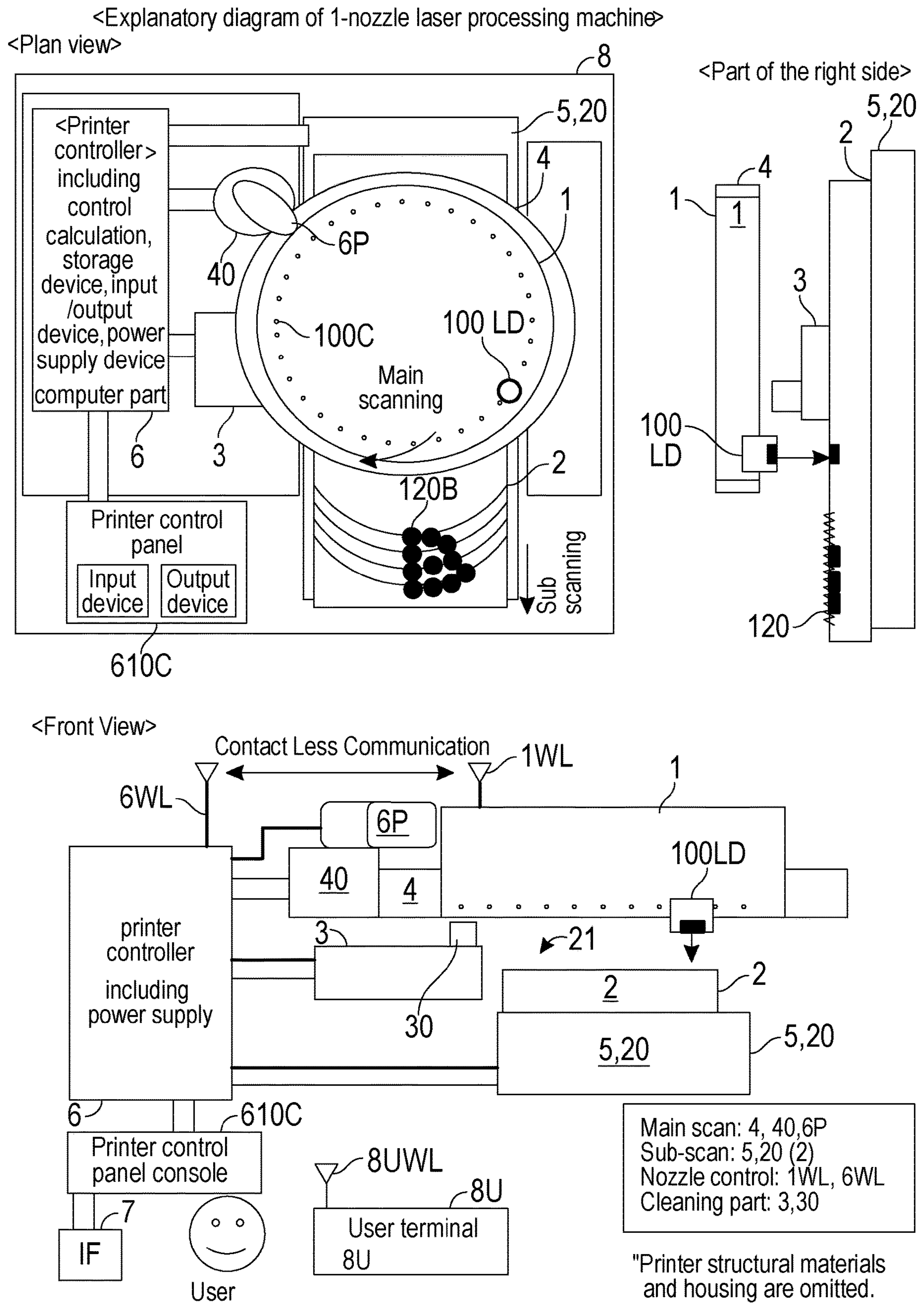
Figure 5F:
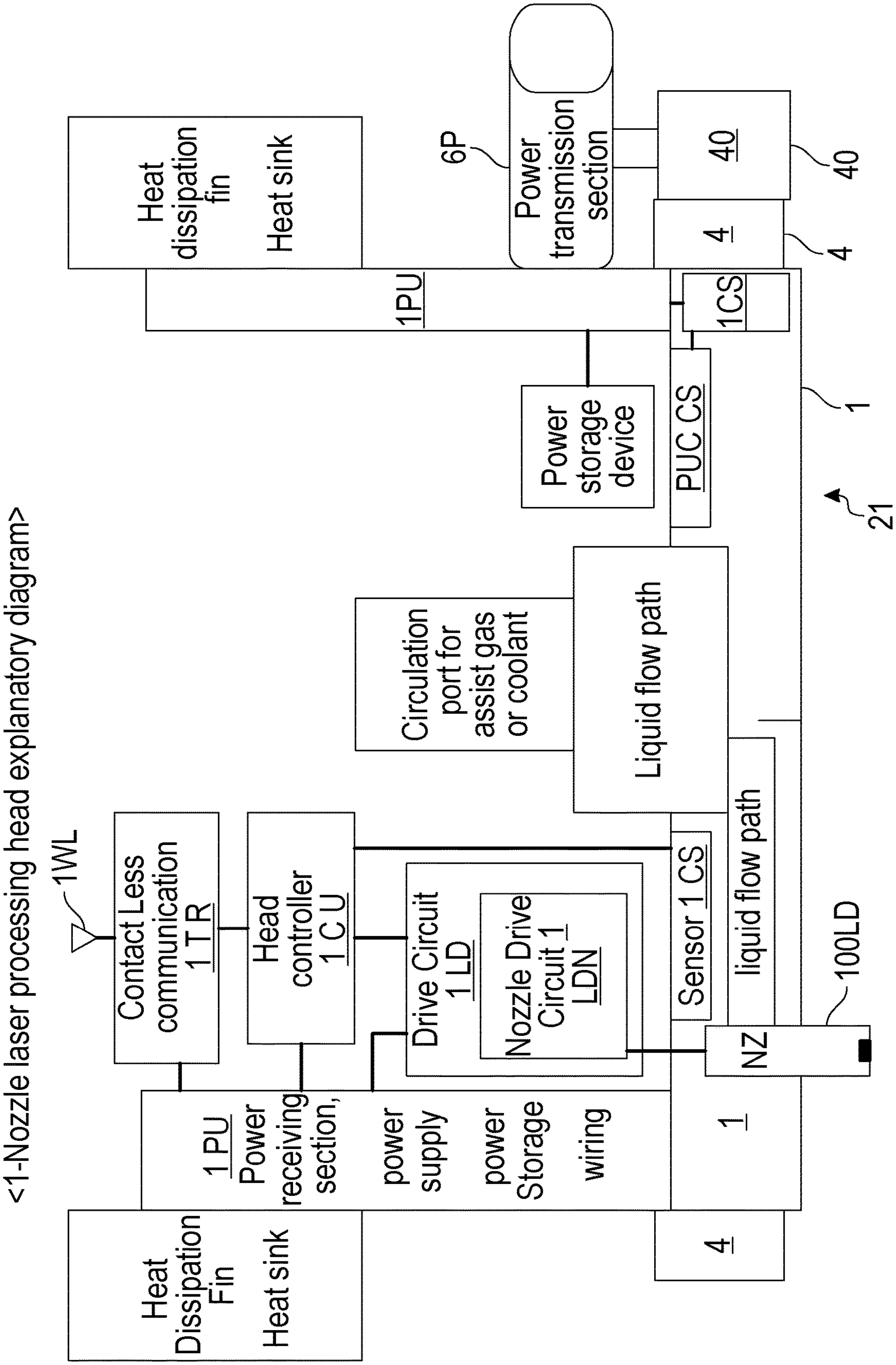

FIG. 5F is an explanatory view when there is one head provided with a nozzle moving on an oval track-like rail in an on-carriage system. This example is the same as Example 3 except that the car on which the nozzle is mounted moves on the rail.

Example 5

FIG. 5E and FIG. 5F are explanatory views of a processing apparatus or an outputting apparatus having a configuration in which a material is not discharged from a nozzle but a laser is irradiated to a portion to be processed of a recording surface, FIG. 5E is an explanatory view of a laser processing machine having one nozzle in a head, and FIG. 5F is an explanatory view of a head 1 of FIG. 5E. When the present invention is used in a laser processing machine, processing is performed by irradiating a recording surface 2 with a laser from a nozzle of a head 1 based on a raster image. The present invention does not contemplate a laser plotter with a stage that scans in the X and Y axes based on a vector image.

Example 6

In FIG. 5 E which is an example of an output unit which can be used for FIG. 5 A, FIG. 5 D, or the removal-processing method which is an example of an output unit by an addition manufacturing method, there is 21 between a recording surface and heads, and the above 21 may be under atmospheric pressure or a vacuum, and may use for 21 the bottom of the vacuum with which space is provided. In a case where a vacuum process is required for manufacturing an electronic component such as a solar cell under a vacuum in space, a semiconductor material or a transparent electrode material is provided on a semiconductor substrate such as a film substrate, glass, or silicon. A patterning material such as a metal electrode material or a resist may be discharged from an on-demand printing apparatus (output apparatus) for manufacturing a solar cell by a discharge printing method, or coating, exposure, and patterning of a resist material on a substrate by a spin coater may be performed as a method and an apparatus performed in existing solar cell manufacturing. Laser processing may be performed using the scanning method of the present invention for patterning and partial removal of a formed functional film or electrode film.

Semiconductor manufacturing processes and apparatuses such as vapor deposition on one surface of a substrate using a vacuum provided in outer space, formation of a semiconductor film using a CVD method, a sputtering method, a sublimation method, or a proximity sublimation method, doping by implantation of impurities, formation of a functional film other than a semiconductor, and formation of a transparent electrode/metal electrode pattern may be performed under a vacuum provided in outer space.

An output device 8 (printer 8) is provided in an atmospheric facility (a facility under an atmospheric pressure condition in which there is no human) in a space such as a space station, and after patterning is performed on a substrate by a process such as an inkjet printing method including a component such as water or a solvent which evaporates under vacuum The substrate on which printing such as patterning has been completed may be transported from the space station to the space, and a semiconductor layer or an electrode layer may be formed on the substrate by vapor deposition, sputtering, sublimation, CVD, or the like.

For example, as for the material of the solar cell manufacture from the cost of the mass at the time of a rocket launch, when it is going to carry out manufacturing in space the organic thin film solar cell of all the film types of composition that an inventor knows, it is preferable as a premise that mass can manufacture with saving resources few, The following (1) and (2) are described on the premise of manufacturing a solar cell using a direct transition type compound semiconductor or organic semiconductor (or dye) on the assumption that a film-type substrate is used, the thickness of a semiconductor layer having a high absorption coefficient and absorbing light is reduced, the amount of a semiconductor layer material is reduced, and the launch cost is reduced. Here, an example in which an electronic component is manufactured by manufacturing a solar cell using a vacuum provided in outer space is described. The present invention is also applied to the manufacture of semiconductor devices, processors, memories, and ICs, the manufacture of secondary batteries, the manufacture of capacitors such as film capacitors, multilayer ceramic capacitors, and electrolytic capacitors, the manufacture of resistors, and the manufacture of circuits on electronic substrates, as in the manufacture of solar cells.

(1) In the case of an organic-film solar cell or an organic-inorganic hybrid solar cell 1. Prepare a film substrate. 2A. ITO, which is a material for transparent electrodes, is deposited on a film substrate by vapor deposition, sputtering, or the like under vacuum by evacuating the vacuum tank of the vapor deposition apparatus or the portion 21 of the apparatus of the present invention using the vacuum of the vacuum portion in outer space. 2B. An ink in which a doped conductive polymer is dispersed on a film substrate is applied, dried, and formed into a film without using 2A. For the application, a spin coater, a printing method, or an inkjet method may be used.

3. The formed conductive electrodes of the 2A and the 2B are pre-treated. A conductive polymer such as poly-3-hexylthiophene 4A and a fullerene-based PCBM ([6,6]-Phenyl-P3HT-C61) are mixed with and dissolved in organic solvents such as chlorobenzene at an optimized mass ratio to form conductive electrodes of butyric Acid Methyl Ester. 3. The power generation layer is printed, dried, and formed by a spin coater or a printing method, or by offset printing or an inkjet method using a printing unit or a print head that can withstand an organic solvent. When a printing process is performed using a solvent in the atmosphere in one room of a space structure, it is expected that a process of recovering the solvent evaporated in the atmosphere is required. In a case where the vacuum of the vacuum portion of the outer space is used to evacuate the vapor deposition apparatus or the portion 21 of the apparatus of the present application, a solar cell of a type in which a dry process is frequently used may be suitable for the method. To solve the problem that a solvent used in a printing method cannot be easily supplied and utilized as a solvent for an ink or a paste as on the ground, and when a solvent having a mass is used in the same manner as on the ground The cost which launches a solvent in the universe starts, and if wet process is used abundantly in space, the necessity of adding and launching a solvent in addition to the substrate, the material, and the manufacturing installation (a manufacturing installation is the output unit 8 of this application) of a solar cell will come out. Repeating recovery of solvent use and a solvent and circulation of a solvent by the indoor closed system under the atmospheric pressure of space may be expected, and it may also be necessary to equip one room of the space structure which performs a manufacturing installation and solar cell manufacture with the mechanism in which solvents are collected. As described above, there is a possibility that the wet process such as printing using a solvent is difficult to be used in outer space. In view of the above, in order to produce a solar cell in outer space, it may be necessary to produce a solar cell of a system in which a dry process using a vacuum provided in outer space is frequently used. (As already reported, solar cells (including film-type solar cells) produced on the ground by a printing method are also included.) Since it launches and transports to terrestrial plant and universe and a film is not produced by the way which uses wet process, such as print processes, in including in the spot to generate making a vacuum on the ground, manufacture may be easy. Also in this case, the printer 8 of the present invention is used, and digital control is performed by the controller 6 according to an instruction of the 8U to perform printing and patterning. On the conductive electrodes of 4B. 3, monomolecular organic semiconductors (fullerene C60 semiconductors as known n-type, and zincphthalocyanine ZnPc as an example of p-type) are deposited on the substrate by vapor deposition or sublimation to form a power generation layer. The above compounds are examples, and a material capable of forming an organic semiconductor layer capable of absorbing sunlight, separating charges, and transporting carriers as a power generation layer may be used. (Even in the case of using organic semiconductors or dyes, organic solvents are used in 4A, whereas 4B is a dry process, and thus there is no generation of vapor of solvents in an indoor environment of outer space or a space structure, which may be easy to use.) 4C. 3 conductive electrodes with organic-inorganic hybrid semiconducting films (as a known example: The inorganic perovskite is used for the power generation layer, and Spiro-OMeTAD is used as the hole transport material. The vacuum chamber of the vapor deposition apparatus or the portion 21 of the apparatus of the present application is evacuated by using the vacuum of the vacuum portion of the outer space, and a film is formed by vapor deposition or the like under vacuum. (Like the 4B, the 4C can also be performed by a dry process.)

5. In a case where it is necessary to dry the substrate after the film formation of the power generation layer described in 4A to 4C, the substrate is dried by heating, vacuuming, or the like. After 6.5, the substrate on which the power generation layer is formed is heated and annealed at a predetermined temperature. A metal electrode is formed on a substrate 7.6 by depositing an electrode material in a vacuum environment using a vacuum provided in the universe. In order to re-anneal the substrate 8.7 or test its performance, a power generation test is performed in the inspection apparatus.

9. The device is completed.

(2) in the case of a CIGS solar cell

1. Substrate Preparation
2. Film formation and patterning of metal electrode under vacuum
3. Deposition of a CuGa layer under vacuum
4. Deposition of Indium Layer under Vacuum
5. Selenization under vacuum
6. Cds Buffer Layer Deposition by Wet Process
7. Formation of a ZnO window layer under vacuum, patterning, and formation of a transparent electrode
8. After inspection, the device is completed. It becomes. The production of the CIGS solar cell described as an example herein often includes a vacuum process, but partially includes a wet process, and when a vacuum provided in space is used in the present invention, it is necessary to transfer the substrate from the space to an indoor space under atmospheric pressure such as a space structure and perform the wet process. In the present invention, it is preferable that the solar cell can be manufactured only under vacuum by using the vacuum provided in the vacuum portion of the outer space, but the solar cell may be manufactured by using both pressure environments of the vacuum in the outer space and the atmospheric pressure in the outer space structure depending on the system of the solar cell. The solar cell may be used for space photovoltaic power generation.

The method and the printer 8 of the present invention may be capable of controlling the atmospheric pressure and the environment of the space 21 between the nozzles on the recording surface so as to be under the atmospheric pressure on the ground or under the pressure of the vacuum provided in the vacuum portion of the outer space (including the vacuum drawn by the vacuum pump on the ground) as in (1) and (2) of Embodiment 6. The printer 8 can be used for a dry process and a wet process, creates a patterned recording surface on demand controlled by a computer, and uses a limited material and a limited amount of ink. To provide an output device capable of cleaning a nozzle during operation by cleaning the nozzle in a limited space such as a space structure, and having high speed of a line printer. To provide an output device which operates at a high speed without intermittent nozzle cleaning even in a limited space.

Cleaning of Nozzle for Discharging Evaporated Particles by Vapor Deposition in Vacuum Vapor Deposition When particles of atoms and molecules generated by heating a material are discharged and released from a nozzle of a head 1 of a printer 8 and a substrate is irradiated with the particles at the time of vapor deposition and sublimation under vacuum. Even in the case of the printer 8 during printing, vapor deposition, sublimation, or laser processing, there is a possibility that a film is deposited or formed by particles due to vapor deposition hitting a nozzle for ejecting a material or an actuator in the nozzle. It may be desirable to clean the film formed on the nozzle by a mechanical device in the cleaning unit 3 so as not to stop the film forming operation for nozzle cleaning. In this case, the cleaning unit 3 may be capable of cleaning the nozzle and an actuator for opening/closing a bubble in the nozzle and performing a nozzle operation. It is also possible to provide a mechanism for consistently cleaning the nozzle, the valve, and the flow path in which the material is easily accumulated, among the flow paths to the nozzle, the valve, and the ink tank. For example, in a printer of an FDM system, when nozzle maintenance is performed by a human hand, a portion between a nozzle and an extruder can be pushed with a thin wire or the like to remove a defective portion or a material accumulated in a flow path between the nozzle and the extruder. When material is accumulated between a nozzle actuator and a flow path from a nozzle also in the nozzle which performs vacuum deposition in a vacuum, a wire type or the shape of a rod, A deposition material is poked, or it writes and may perform nozzle cleaning so that a nozzle figure ball may be eliminated by the thread-like cleaning element used for a broom etc. As the cleaning element 30 for cleaning the nozzle (FDM nozzle, additive manufacturing (AM) nozzle, evaporated particle discharge nozzle for vacuum deposition) of the printer 8 of the present application in the atmosphere and in a vacuum, a thread-like, bar-like, or rod-like element such as a wire may be used to clean the nozzle.

Also in the processing machine 8 for performing laser processing in a vacuum, if a laser nozzle is covered with dust or the like generated when a part of the processing surface 2 is cut off by a laser during processing, a photon as a particle cannot be irradiated from the nozzle by the laser, so that a cleaning mechanism is required.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

INDUSTRIAL APPLICABILITY

To contribute to speed-up of a printer for two dimensional image printing and a 3D printer.

The printer of the present invention is intended to perform two dimensional and three dimensional printing or laminating of materials more quickly according to digital data. In the two dimensional field, it contributes to known large-area printing fields such as paper books and newspapers, printing on the surface of products, industrial fields, and electronic component manufacturing, and in the three dimensional field, it contributes to applications to robots, automobiles, prototyping, and medical fields. The present invention may be used for manufacturing electronic components and electronic and semiconductor circuits on the ground and in outer space.

The ink composition can be applied to outdoor signboards and posters using a solvent ink, printing on industrial products using an ultraviolet curable resin ink, applications for textile printing and coloring on textile products, manufacturing processes in electronic components, and known applications for discharging an ink material.

EXPLANATION OF LETTERS OR NUMERALS

1. Print Head

10 recording head nozzle 100 nozzle array 100A ink jet nozzle arranged in a circle 100B FDM nozzle arranged in a circle by AM method nozzle 100NZ only one nozzle 100C circular track in a case where only one fixed nozzle rotates 100R loop track on which a movable nozzle moves (may include power supply overhead line)

11. Ink Sub-Tank

111 joint (rotary joint) 112 ink supply path in off-carriage type 113 ink tank

12. Ejected Ink

120: recording surface after ink landing

2. Recording sheet, recording surface 20 Recording surface conveyance mechanism (including sub-scanning motor as in 5)

3. Cleaning Portion (Maintenance Portion)

30 Cleaning Element

4. Drive Mechanism (Print Head Drive Unit and Support Unit) 40 Motor of Drive Mechanism (Print Head Drive Motor for Main Scanning)

5. Media Supply Transport Discharge Unit

6 Controller

7. Interface

8 printer main body 8U user terminals 8N network

9. Printed material, output image, or layer discharged from nozzle 100B when laminating by three dimensional 90B FDM Symbols and the Like of FIG. 5A, FIG. 5*b*, FIG. 5*c*, FIG. 5*d*, FIG. 5*e*, and FIG. 5*f*

1. Print Head.

100VA nozzle driving or opening/closing actuators 100NZ nozzle, only one nozzle for head 1 100NZP nozzle flow path 110 sub ink tank 110PP material extrusion pump (may be provided with ink feed port) 113 material tank 100LD laser nozzle Power receiving portion and power supply unit of laser irradiating device 1PU head, power storage unit, wire power storage device provided in 1PUC head 100C circular orbit when only one fixed nozzle rotates 100R loop orbit on which movable nozzle moves (which may include power feeding overhead line) 1CU head controller 1CU0 1CU storage device (RAM ROM, control arithmetic processing unit (MPU, microcomputer) of 1CU1 1CU, communication device of 1CU2 1CU, non-contact communication unit of 1TR head, wireless communication unit (included in 1CU2), wireless communication device of 1WL head (included in 1CU2), input device of kb, head inclination detection sensor, 1CU 1CS 1CU3 Accelerator sensor, motion sensor (included in 1CU3) 1LVM ink tank residual amount meter, material tank residual amount meter (optional) 1CU4 1CU outputting device 1FD head flow path driving circuit (nozzle driving, pump driving) 1FDN nozzle driving circuit 1FDP pump driving circuit, material extrusion driving circuit (extruder driving circuit).

12. Discharged material, ink droplets, and particles that evaporate, are discharged, and fly during vapor deposition 120 Recording surface after ink landing (recording surface after material discharge) Recording surface after 120B laser irradiation.

2. recording surface, recording paper 20 or 5 recording surface conveyance mechanism/supply mechanism, sub-scanning mechanism.

21. Environment in the atmosphere or vacuum between the recording head and the recording surface 4 Driving mechanism main scanning mechanism.

40. Motor of drive mechanism Mechanism for moving nozzle-equipped vehicle by rail system in 4R drive mechanism.

6. Printer Controller.

60 storage device (RAM, ROM) of 6.

61 control arithmetic processing unit (MPU, microcomputer) 62 communication device 6WL printer controller non-contact communication device (included in 62).

63 input devices.

64 output device 6IOC printer control panel console power transmission portion to 6P head power supply portion.

7. Printer Interface.

8 printers (printer terminals) 8U user terminals.

What is claimed is:

1. A scanning method for an output device, the output device including a nozzle, a recording surface, and a cleaning part configured to clean the nozzle and presenting a cleaning portion surface, comprising the steps of:

moving the nozzle along a main scanning path that defines a continuous, closed loop circulation trajectory extending across the recording surface and the cleaning portion surface; and while continuously moving the nozzle along the main scanning path, performing in sequence:

recording on the recording surface by discharging a material from the nozzle onto the recording surface as the nozzle traverses the recording surface;

cleaning the nozzle by the cleaning part as the nozzle passes the cleaning portion surface; and subsequently recording on the recording surface by discharging the material from the nozzle onto the recording surface as the nozzle subsequently traverses the recording surface, such that the nozzle completes a continuous scanning loop in which the recording, the cleaning, and the subsequent recording are performed by movement of the nozzle along the main scanning path.

2. The scanning method of claim 1 further comprising: discharging the material from the nozzle when the nozzle passes the cleaning portion surface.

3. The scanning method of claim 2, wherein:

the output device comprises a recording head, and the nozzle is one of one or more nozzles provided in the recording head and configured to eject the material;

the recording surface is conveyed in a sub-scanning direction that crosses the main scanning path; and the cleaning part is arranged on the closed loop circulation trajectory at a position outside the recording surface.

4. The scanning method of claim 3, wherein the recording surface is placed in a vacuum environment that is a vacuum of outer space, and the discharging of the material onto the recording surface is performed under the vacuum environment such that the material is deposited onto the recording surface.

* * * * *